US009477718B2

(12) United States Patent
Zhou et al.

(10) Patent No.: US 9,477,718 B2
(45) Date of Patent: Oct. 25, 2016

(54) APPLICATION IDENTIFICATION METHOD, AND DATA MINING METHOD, APPARATUS, AND SYSTEM

(71) Applicant: Huawei Technologies Co., Ltd., Shenzhen (CN)

(72) Inventors: Wei Zhou, Shenzhen (CN); Dong Tang, Hangzhou (CN); Hongding Zhang, Guangzhou (CN)

(73) Assignee: Huawei Technologies Co., LTD, Shenzhen (CN)

( * ) Notice: Subject to any disclaimer, the term of this patent is extended or adjusted under 35 U.S.C. 154(b) by 515 days.

(21) Appl. No.: 14/107,949

(22) Filed: Dec. 16, 2013

(65) Prior Publication Data
US 2014/0188837 A1 Jul. 3, 2014

Related U.S. Application Data

(63) Continuation of application No. PCT/CN2013/080312, filed on Jul. 29, 2013.

(30) Foreign Application Priority Data

Dec. 31, 2012 (CN) .......................... 2012 1 0592203

(51) Int. Cl.
G06F 17/30 (2006.01)
G06F 7/00 (2006.01)
(52) U.S. Cl.
CPC .............................. *G06F 17/30539* (2013.01)
(58) Field of Classification Search
CPC .................... G06F 17/30386; G06F 17/30867
See application file for complete search history.

(56) References Cited

U.S. PATENT DOCUMENTS

| 2008/0065759 | A1* | 3/2008 | Gassewitz | G06Q 30/02 709/224 |
| 2010/0250918 | A1 | 9/2010 | Tremblay et al. | |
| 2010/0268524 | A1* | 10/2010 | Nath | H04L 67/306 703/23 |
| 2010/0269044 | A1* | 10/2010 | Ivanyi | G06Q 30/02 715/736 |
| 2011/0150002 | A1* | 6/2011 | Kim | H04L 63/0407 370/474 |

(Continued)

FOREIGN PATENT DOCUMENTS

| CN | 102075404 A | 5/2011 |
| CN | 102523274 A | 6/2012 |
| CN | 102726026 A | 10/2012 |
| CN | 103051725 A | 4/2013 |

(Continued)

Primary Examiner — Jeffrey A Burke
(74) Attorney, Agent, or Firm — Huawei Technologies Co., Ltd.

(57) ABSTRACT

A data mining method, apparatus, and system are provided. The method includes: obtaining to-be-processed data, where the to-be-processed data includes records, and each record includes application information and remote end triplet information; performing clustering processing on records with same remote end triplet information and same application information, and according to the records with the same remote end triplet information and the same application information, calculating a service load amount corresponding to the remote end triplet information and the application information to obtain a clustering result including the remote end triplet information, the application information, and the service load amount; according to the service load amount or a proportion of the service load amount, selecting remote end triplet information and application information that have high reliability from the clustering result; and sending the remote end triplet information and application information that have high reliability to a deep packet inspection (DPI) subsystem.

37 Claims, 15 Drawing Sheets

(56) References Cited

U.S. PATENT DOCUMENTS

2012/0099597 A1 4/2012 Dong et al.
2012/0314584 A1 12/2012 Su

FOREIGN PATENT DOCUMENTS

EP 2393255 A1 12/2011
WO 2006111970 A1 10/2006

* cited by examiner

Protocol bearing relationship

APPLICATION IDENTIFICATION METHOD, AND DATA MINING METHOD, APPARATUS, AND SYSTEM

CROSS-REFERENCE TO RELATED APPLICATIONS

This application is a continuation of International Application No. PCT/CN2013/080312, filed on Jul. 29, 2013, which claims priority to Chinese Patent Application No. 201210592203.5, filed on Dec. 31, 2012, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communications technologies, and in particular, to an application identification method and a data mining method, apparatus, and system.

BACKGROUND

With rapid development of broadband services, operators face opportunities as well as challenges, and the popularization of applications such as peer-to-peer (P2P), network games, Web television (TV), voice over internet protocol (IP) (VoIP), online banking, and network disks incur a series of problems such as bandwidth management, content-based accounting, and information security processing.

The deep packet inspection (DPI) technology is considered as a method for addressing management problems incurred by operation of multiple services in a network, that is, network data can be rapidly parsed by using the DPI technology, so as to enable an operator network to support application-based services, such as blocking of a mail tariff packet, a video tariff packet, a game tariff packet, and specific downloaded software.

As shown in FIG. 1A, which is a hierarchical relationship diagram of protocols; in view of the transport layer, most network applications are borne on the Transmission Control Protocol (TCP) and the User Datagram Protocol (UDP); in view of Layer 7 (L7) bearing, main bearing protocols include the Hypertext Transfer Protocol (HTTP)/Hypertext Transfer Protocol Secure (HTTPS), Secure Sockets Layer (SSL), Real-time Transport Protocol (RTP), Session Initiation Protocol (SIP), Secure Socket 5 (SOCKS5), and Secure Socket 4 (SOCKS4). Bearing manners of applications generally include: stream-based bearing (a bearing protocol appears in only the first few packets, and the following packets are pure application data, as shown in FIG. 1B); and packet-based bearing (each packet has a bearing protocol and application data, as shown in FIG. 1C).

For application identification of bearing protocols, currently, the DPI adopts a L7 protocol scanning manner to perform protocol matching. In other words, feature string matching is performed from button to top sequentially for identification. Using the HTTP protocol as an example, the HTTP protocol is identified through an HTTP request method and a Uniform Resource Identifier (URI) format on a first line of the HTTP, then an application is identified through feature string matching of the content of a header field (such as HOST, REFERER, and USER-AGENT), and finally a second packet is expected for performing content checking (this step is optional).

In addition, an update rate of an Internet application is far greater than that of a DPI signature database, and may applications, for the sake of security, increasingly perform data transmission by using encryption manners such as SSL and HTTPS, thereby resulting in low performance of packet identification using DPI. However, for application identification of an encryption protocol, only L7 protocol information can be identified, and an application running on the L7 still cannot be identified, for example, for data encrypted through the HTTPS, an application cannot be identified, thereby causing the DPI-based identification to fail.

SUMMARY

Embodiments of the present invention provide an application identification method, and a data mining method, apparatus, and system, so as to improve DPI-based identification performance and an application identification rate.

In a first aspect, an embodiment of the present invention provides a user behavior analysis (UBA)-based data mining method, which includes: obtaining to-be-processed data, where the to-be-processed data includes multiple records, each record includes application information and remote end triplet information having a correspondence relationship therebetween, and the remote end triplet information includes a transmission protocol, a server IP address, and a server port, performing clustering processing on records with same remote end triplet information and same application information in the to-be-processed data, and according to the records with the same remote end triplet information and the same application information in the to-be-processed data, calculating a service load amount corresponding to the remote end triplet information and the application information to obtain a clustering result including the remote end triplet information, the application information, and the service load amount that have a correspondence relationship therebetween, according to the service load amount or a proportion of the service load amount, selecting remote end triplet information and application information that have high reliability and have correspondence relationship therebetween from the clustering result, and sending the remote end triplet information and application information that have high reliability and have correspondence relationship therebetween to a DPI subsystem.

With reference to the first aspect, in a first implementation manner, the obtaining to-be-processed data includes: for each type of application, according to domain name information corresponding to the application, crawling IP address information corresponding to the domain name information to obtain a crawling result including the application information, the domain name information, and the IP address information that have a correspondence relationship therebetween; obtaining a first protocol identification result output by the DPI subsystem, where the first protocol identification result includes the remote end triplet information; and according to the crawling result and the first protocol identification result, by using a same IP address in the crawling result and in the first protocol identification result as an association condition, associatedly generating the to-be-processed data, where the to-be-processed data includes multiple records, and each record includes application information and remote end triplet information having a correspondence relationship therebetween.

With reference to the first aspect, in a second implementation manner, the obtaining to-be-processed data includes: obtaining a first protocol identification result output by the DPI subsystem and a crawling result output by a crawling subsystem, where the first protocol identification result includes the remote end triplet information, and the crawling result includes application information, domain name information, and IP address information having a correspondence relationship therebetween; and according to the crawling result and the first protocol identification result, by using a same IP address in the crawling result and in the first protocol identification result as an association condition, associatedly generating the to-be-processed data, where the to-be-processed data includes multiple records, and each record includes application information and remote end triplet information having a correspondence relationship therebetween.

With reference to the first aspect, in a third implementation manner, each record further includes a client IP address, a client port, and traffic that corresponds to the application information and quintuple information, and the client IP address, the client port, and the remote end triplet information form the quintuple information; and the obtaining to-be-processed data includes: receiving first network data, where the first network data includes one or more data streams, and each of the data streams includes one or more data packets; for each type of application, according to domain name information corresponding to the application, crawling IP address information corresponding to the domain name information to obtain a crawling result including the application information, the domain name information, and the IP address information that have a correspondence relationship therebetween; obtaining a first protocol identification result, output by the DPI subsystem, for the first network data, where the first protocol identification result includes quintuple information; and according to the crawling result, the first protocol identification result, and the first network data, by using a same IP address in the crawling result and in the first protocol identification result as an association condition, associatedly generating the to-be-processed data, where the to-be-processed data includes multiple records, each record includes the application information, the quintuple information, and the traffic having a correspondence relationship therebetween, and the traffic corresponding to the quintuple information is an accumulated value of load lengths of one or more data packets in the first network data that include the quintuple information.

With reference to the first aspect, in a fourth implementation manner, each record further includes a client IP address, a client port, and traffic that corresponds to the application information and quintuple information, and the client IP address, the client port, and the remote end triplet information form the quintuple information; and the obtaining to-be-processed data includes: receiving first network data, where the first network data includes one or more data streams, and each of the data streams includes one or more data packets; obtaining a crawling result output by a crawling subsystem and a first protocol identification result that is output by the DPI subsystem for the first network data, where the first protocol identification result includes quintuple information, and the crawling result includes application information, domain name information, and IP address information having a correspondence relationship therebetween; and according to the crawling result, the first protocol identification result, and the first network data, by using a same IP address in the crawling result and in the first protocol identification result as an association condition, associatedly generating the to-be-processed data, where the to-be-processed data includes multiple records, each record includes the application information, the quintuple information, and the traffic having a correspondence relationship therebetween, and the traffic corresponding to the quintuple information is an accumulated value of load lengths of one or more data packets in the first network data that include the quintuple information.

With reference to the first aspect or the first implementation manner of the first aspect or the second implementation manner of the first aspect, in a fifth implementation manner, the performing clustering processing on records with same remote end triplet information and same application information in the to-be-processed data, and according to the records with the same remote end triplet information and the same application information in the to-be-processed data, calculating a service load amount corresponding to the remote end triplet information and the application information to obtain a clustering result including the remote end triplet information, the application information, and the service load amount that have a correspondence relationship therebetween includes: performing clustering processing on records with same remote end triplet information and same application information in the to-be-processed data, and accumulating the number of the records with the same remote end triplet information and the same application information in the to-be-processed data, where the number of the records is used as the number of connections corresponding to the remote end triplet information and the application information, to obtain a clustering result including the remote end triplet information, the application information, and the number of connections having a correspondence relationship therebetween; and the according to the service load amount or a proportion of the service load amount, selecting remote end triplet information and application information that have high reliability and have correspondence relationship therebetween from the clustering result includes: according to a result of comparing the number of the connections with a first connection number threshold, selecting remote end triplet information and application information having a correspondence relationship therebetween from the clustering result, where the number of connections corresponding to the selected remote end triplet information and application information is greater than or equal to the first connection number threshold; or according to a result of comparing a proportion of the number of connections to the number of all connections with a second connection number proportion threshold, selecting remote end triplet information and application information having a correspondence relationship therebetween from the clustering result, where the proportion of the number of connections corresponding to the remote end triplet information and application information to the number of all connections is greater than or equal to the second connection number proportion threshold.

With reference to the third implementation manner of the first aspect or the fourth implementation manner of the first aspect, in a sixth implementation manner, the performing clustering processing on records with same remote end triplet information and same application information in the to-be-processed data, and according to the records with the same remote end triplet information and the same application information in the to-be-processed data, calculating a service load amount corresponding to the remote end triplet information and the application information to obtain a clustering result including the remote end triplet information, the application information, and the service load amount that have a correspondence relationship therebetween includes: performing clustering processing on records with same remote end triplet information and same application information but with different client IP addresses and different client ports in the to-be-processed data, and obtaining a traffic aggregate amount corresponding to the remote end triplet information and the application information by accumulating traffic in records with same remote end triplet information and same application information in the to-be-processed data, to obtain a clustering result including the remote end triplet information, the application information, and the traffic aggregate amount having a correspondence relationship therebetween; and the according to the service load amount or a proportion of the service load amount, selecting remote end triplet information and application information that have high reliability and have correspondence relationship therebetween from the clustering result includes: according to a result of comparing the traffic aggregate amount with a first traffic threshold, selecting remote end triplet information and application information having a correspondence relationship therebetween from the clustering result, where the traffic aggregate amount corresponding to the selected remote end triplet information and application information is greater than or equal to the first traffic threshold; or according to a result of comparing a proportion of the traffic aggregate amount to all traffic with a second traffic proportion threshold, selecting remote end triplet information and application information having a correspondence relationship therebetween from the clustering result, where the proportion of the traffic aggregate amount corresponding to the selected remote end triplet information and application information to all traffic is greater than or equal to the second traffic proportion threshold.

With reference to the first aspect or the first, second, third, and fourth implementation manners of the first aspect, in a sixth implementation manner, the according to the service load amount or a proportion of the service load amount, selecting remote end triplet information and application information that have high reliability and have correspondence relationship therebetween from the clustering result includes: according to a result of comparing the service load amount with a first threshold, selecting remote end triplet information and application information having a correspondence relationship therebetween from the clustering result, where the service load amount corresponding to the selected remote end triplet information and application information is greater than or equal to the first threshold; or according to a result of comparing the proportion of the service load amount with a second threshold, selecting remote end triplet information and application information having a correspondence relationship therebetween from the clustering result, where the proportion of the service load amount corresponding to the selected remote end triplet information and application information is greater than or equal to the second threshold.

In a second aspect, an embodiment of the present invention provides an application identification method, which includes: receiving application information and remote end triplet information that are sent by a UBA subsystem and have correspondence relationship therebetween, and second network data, where the remote end triplet information includes a transmission protocol, a server IP address, and a server port, according to remote end triplet information contained in the second network data, searching correspondence relationship between application information and remote end triplet information that is maintained by a DPI subsystem for application information matching the remote end triplet information contained in the second network data to identify an application type of the second network data, where the correspondence relationship between application information and remote end triplet information that is maintained by the DPI subsystem is established or updated based on the application information and the remote end triplet information that are sent by the UBA subsystem and have correspondence relationship therebetween.

With reference to the second aspect, in a first implementation manner, the method further includes: performing protocol identification processing on received first network data, and outputting a first protocol identification result to the UBA subsystem, where the first protocol identification result includes the remote end triplet information, or the first protocol identification result includes quintuple information.

With reference to the second aspect or the first implementation manner of the second aspect, in a second implementation manner, when the searching fails, the method further includes: performing Layer 7 (L7) feature matching on the second network data to obtain a second protocol identification result, and outputting the second protocol identification result to the UBA subsystem, where the second protocol identification result includes remote end triplet information and application information having a correspondence relationship therebetween or quintuple information and application information having a correspondence relationship therebetween; or, the second protocol identification result includes remote end triplet information and Layer 7 (L7) protocol information having a correspondence relationship therebetween or quintuple information and Layer 7 (L7) protocol information having a correspondence relationship therebetween.

With reference to the second aspect or the first implementation manner of the second aspect or the second implementation manner of the second aspect, in a third implementation manner, the method further includes: according to the remote end triplet information and the application information that are sent by the UBA subsystem and have correspondence relationship therebetween, establishing or updating the correspondence relationship between the application information and the remote end triplet information that is maintained by the DPI subsystem, and storing the established or updated correspondence between the application information and the remote end triplet information; or storing the remote end triplet information and the application information that are sent by the UBA subsystem and have correspondence relationship therebetween.

In a third aspect, an embodiment of the present invention provides a UBA-based data mining apparatus, which includes: a content obtaining module, configured to obtain to-be-processed data, where the to-be-processed data includes multiple records, each record includes application information and remote end triplet information having a correspondence relationship therebetween, and the remote end triplet information includes a transmission protocol, a server IP address, and a server port, a clustering module, connected to the content obtaining module, and configured to perform clustering processing on records with same remote end triplet information and same application information in the to-be-processed data, and according to the records with the same remote end triplet information and the same application information in the to-be-processed data, calculate a service load amount corresponding to the remote end triplet information and the application information to obtain a clustering result including the remote end triplet information, the application information, and the service load amount that have a correspondence relationship therebetween, a converging module, connected to the clustering module, and configured to, according to the service load amount or a proportion of the service load amount, select remote end triplet information and application information that have high reliability and have correspondence relationship therebetween from the clustering result, and a synchronization module, connected to the converging module, and configured to send the remote end triplet information and application information that have high reliability and have correspondence relationship therebetween to a DPI subsystem.

With reference to the third aspect, in a first implementation manner, the content obtaining module is specifically configured to: for each type of application, according to domain name information corresponding to the application, crawl IP address information corresponding to the domain name information to obtain a crawling result including the application information, the domain name information, and the IP address information that have a correspondence relationship therebetween; obtain a first protocol identification result output by the DPI subsystem, where the first protocol identification result includes the remote end triplet information; according to the crawling result and the first protocol identification result, by using a same IP address in the crawling result and in the first protocol identification result as an association condition, associatedly generate the to-be-processed data, where the to-be-processed data includes multiple records, and each record includes application information and remote end triplet information having a correspondence relationship therebetween; or the content obtaining module is specifically configured to: obtain a first protocol identification result output by the DPI subsystem and a crawling result output by a crawling subsystem, where the first protocol identification result includes the remote end triplet information, the crawling result includes application information, domain name information, and IP address information having a correspondence relationship therebetween; according to the crawling result and the first protocol identification result, by using a same IP address in the crawling result and in the first protocol identification result as an association condition, associatedly generate the to-be-processed data, where the to-be-processed data includes multiple records, and each record includes application information and remote end triplet information having a correspondence relationship therebetween.

With reference to the third aspect or the first implementation manner of the third aspect, in a second implementation manner, the clustering module is specifically configured to perform clustering processing on records with same remote end triplet information and same application information in the to-be-processed data, and accumulate the number of the records with the same remote end triplet information and the same application information in the to-be-processed data, where the number of the records is used as the number of connections corresponding to the remote end triplet information and the application information, to obtain a clustering result including the remote end triplet information, the application information, and the number of connections having a correspondence relationship therebetween; and the converging module is specifically configured to, according to a result of comparing the number of the connections with a first connection number threshold, select remote end triplet information and application information having a correspondence relationship therebetween from the clustering result, where the number of connections corresponding to the selected remote end triplet information and application information is greater than or equal to the first connection number threshold; or, according to a result of comparing a proportion of the number of connections to the number of all connections with a second connection number proportion threshold, select remote end triplet information and application information having a correspondence relationship therebetween from the clustering result, where the proportion of the number of connections corresponding to the remote end triplet information and application information to the number of all connections is greater than or equal to the second connection number proportion threshold.

With reference to the third aspect, in a third implementation manner, each record further includes a client IP address, a client port, and traffic that corresponds to the application information and quintuple information, and the client IP address, the client port, and the remote end triplet information form the quintuple information; and the content obtaining module is specifically configured to: receive first network data, where the first network data includes one or more data streams, and each of the data streams includes one or more data packets; for each type of application, according to domain name information corresponding to the application, crawl IP address information corresponding to the domain name information to obtain a crawling result including the application information, the domain name information, and the IP address information that have a correspondence relationship therebetween; obtain a first protocol identification result, output by the DPI subsystem, for the first network data, where the first protocol identification result includes quintuple information; according to the crawling result, the first protocol identification result, and the first network data, by using a same IP address in the crawling result and in the first protocol identification result as an association condition, associatedly generate the to-be-processed data, where the to-be-processed data includes multiple records, each record includes the application information, the quintuple information, and the traffic having a correspondence relationship therebetween, and the traffic corresponding to the quintuple information is an accumulated value of load lengths of one or more data packets in the first network data that include the quintuple information; or the content obtaining module is specifically configured to: receive first network data, where the first network data includes one or more data streams, and each of the data streams includes one or more data packets; obtain a crawling result output by a crawling subsystem and a first protocol identification result that is output by the DPI subsystem for the first network data, where the first protocol identification result includes quintuple information, and the crawling result includes application information, domain name information, and IP address information having a correspondence relationship therebetween; according to the crawling result, the first protocol identification result, and the first network data, by using a same IP address in the crawling result and in the first protocol identification result as an association condition, associatedly generate the associatedly generate, where the to-be-processed data includes multiple records, each record includes the application information, the quintuple information, and the traffic having a correspondence relationship therebetween, and the traffic corresponding to the quintuple information is an accumulated value of load lengths of one or more data packets in the first network data that include the quintuple information.

With reference to the third implementation manner of the third aspect, in a fourth implementation manner, the clustering module is specifically configured to perform clustering processing on records with same remote end triplet information and same application information but with different client IP addresses and different client ports in the to-be-processed data, and obtain a traffic aggregate amount corresponding to the remote end triplet information and the application information by accumulating traffic in records with same remote end triplet information and same application information in the to-be-processed data, to obtain a clustering result including the remote end triplet information, the application information, and the traffic aggregate amount having a correspondence relationship therebetween; and the converging module is specifically configured to, according to a result of comparing the traffic aggregate amount with a first traffic threshold, select remote end triplet information and application information having a correspondence relationship therebetween from the clustering result, where the traffic aggregate amount corresponding to the selected remote end triplet information and application information is greater than or equal to the first traffic threshold; or, according to a result of comparing a proportion of the traffic aggregate amount to all traffic with a second traffic proportion threshold, select remote end triplet information and application information having a correspondence relationship therebetween from the clustering result, where the proportion of the traffic aggregate amount corresponding to the selected remote end triplet information and application information to all traffic is greater than or equal to the second traffic proportion threshold.

With reference to the third aspect or the first implementation manner of the third aspect or the third implementation manner of the third aspect, in a fifth implementation manner, the converging module is specifically configured to, according to a result of comparing the service load amount with a first threshold, select remote end triplet information and application information having a correspondence relationship therebetween from the clustering result, where the service load amount corresponding to the selected remote end triplet information and application information is greater than or equal to the first threshold; or, according to a result of comparing the proportion of the service load amount with a second threshold, select remote end triplet information and application information having a correspondence relationship therebetween from the clustering result, where the proportion of the service load amount corresponding to the selected remote end triplet information and application information is greater than or equal to the second threshold.

In a fourth aspect, an embodiment of the present invention provides an application identification apparatus, which includes: a communication interface module, configured to receive application information and remote end triplet information that are sent by a UBA subsystem and have correspondence relationship therebetween, and second network data, where the remote end triplet information includes a transmission protocol, a server IP address, and a server port and a rapid identification module, connected to the communication interface module, and configured to, according to remote end triplet information contained in the second network data, search correspondence relationship between the application information and the remote end triplet information that is maintained by the application identification apparatus for application information matching the remote end triplet information contained in the second network data to identify an application type of the second network data, where the correspondence relationship between the application information and the remote end triplet information that is maintained by a DPI subsystem is established or updated based on the application information and the remote end triplet information that are sent by the UBA subsystem and have correspondence relationship therebetween.

With reference to the fourth aspect, in a first implementation manner, the communication interface module is further configured to receive first network data; and the rapid identification module is further configured to perform protocol identification processing on the received first network data, and output a first protocol identification result to the UBA subsystem, where the first protocol identification result includes the remote end triplet information, or the first protocol identification result includes quintuple information.

With reference to the fourth aspect or the first implementation manner of the fourth aspect, in a second implementation manner, the application identification apparatus further includes a deep identification module, where the rapid identification module is further configured to, when application information matching the remote end triplet information contained in the second network data cannot be found, transfer the second network data to the deep identification module; and the deep identification module is configured to perform Layer 7 (L7) feature matching on the second network data to obtain a second protocol identification result, and output the second protocol identification result to the UBA subsystem, where the second protocol identification result includes remote end triplet information and application information having a correspondence relationship therebetween or quintuple information and application information having a correspondence relationship therebetween; or, the second protocol identification result includes remote end triplet information and Layer 7 (L7) protocol information having a correspondence relationship therebetween or quintuple information and Layer 7 (L7) protocol information having a correspondence relationship therebetween.

With reference to the fourth aspect or the first implementation manner of the fourth aspect or the second implementation manner of the fourth aspect, in a third implementation manner, the application identification apparatus further includes: an application feature relationship management module, configured to, according to the remote end triplet information and the application information that are sent by the UBA subsystem and have correspondence relationship therebetween, establish or update the correspondence between the application information and the remote end triplet information; and a storage module, configured to store the established or updated correspondence between the application information and the remote end triplet information; or, configured to store the remote end triplet information and the application information that are sent by the UBA subsystem and have correspondence relationship therebetween.

In a fifth aspect, an embodiment of the present invention provides a UBA server, the UBA server includes: a UBA content parsing engine, configured to execute user behavior analysis or user interest analysis; and a UBA-based data mining engine coupled to the UBA content parsing engine; and the UBA-based data mining engine is a UBA-based data mining apparatus in a six possible implementation manner with reference to the third aspect or with reference to the third aspect and any one or more implementation manners among first to fifth possible implementation manners formed based on the third aspect.

In a sixth aspect, an embodiment of the present invention provides a DPI server, the DPI server includes: a receiver, configured to receive network data or a mirror of the network data; a DPI engine, coupled to the receiver; and a sender, configured to send application information that is output by the DPI engine or the network data; the DPI engine is an application identification apparatus in a fourth possible implementation manner with reference to the fourth aspect or with reference to the fourth aspect and any one or more implementation manners among first to third possible implementation manners formed based on the fourth aspect.

In a seventh aspect, an embodiment of the present invention provides a communications device, which includes a transceiver and a processor that is coupled to the transceiver and is configured to perform network communication, where the communications device further includes a DPI engine coupled to the transceiver, and the DPI engine is an application identification apparatus in a fourth possible implementation manner with reference to the fourth aspect or with reference to the fourth aspect and any one or more implementation manners among first to third possible implementation manners formed based on the fourth aspect.

In an eighth aspect, an embodiment of the present invention provides a communications system, which includes a DPI subsystem and a UBA subsystem, where the UBA subsystem is configured to obtain to-be-processed data, where the to-be-processed data includes multiple records, and each record includes application information and remote end triplet information having a correspondence relationship therebetween; perform clustering processing on the records with same remote end triplet information and same application information in the to-be-processed data, and calculate, according to the records with the same remote end triplet information and the same application information, a service load amount corresponding to the remote end triplet information and the application information to obtain a clustering result including the remote end triplet information, the application information, and the service load amount that have a correspondence relationship therebetween; according to the service load amount or a proportion of the service load amount, select remote end triplet information and application information that have high reliability and have correspondence relationship therebetween from the clustering result, and send the remote end triplet information and the application information that have high reliability and have correspondence relationship therebetween to the DPI subsystem, where the remote end triplet information includes: a server IP address, a server port, and a transmission protocol, and the DPI subsystem is configured to: when receiving second network data, search, according to remote end triplet information contained in the second network data, correspondence relationship between application information and remote end triplet information that is maintained by the DPI subsystem for application information matching the remote end triplet information contained in the second network data to identify an application type of the second network data, where the correspondence relationship between the application information and the remote end triplet information that is maintained by the DPI subsystem is established or updated based on the remote end triplet information and application information that are sent by the UBA subsystem and have correspondence relationship therebetween.

With reference to the eighth aspect, in a first implementation manner, the DPI subsystem is further configured to perform protocol identification processing on received first network data, and output a first protocol identification result to the UBA subsystem, where the first protocol identification result includes the remote end triplet information; and the UBA subsystem is specifically configured to: for each type of application, according to domain name information corresponding to the application, crawl IP address information corresponding to the domain name information to obtain a crawling result including application information, the domain name information, and the IP address information having a correspondence relationship therebetween; obtain the first protocol identification result output by the DPI subsystem; according to the crawling result and the first protocol identification result, by using a same IP address in the crawling result and in the first protocol identification result as an association condition, associatedly generate the to-be-processed data, where the to-be-processed data includes multiple records, and each record includes application information and remote end triplet information having a correspondence relationship therebetween; perform clustering processing on records with same remote end triplet information and same application information in the to-be-processed data; accumulating the number of records with same remote end triplet information and same application information in the to-be-processed data, wherein the number of the records is used as the number of connections corresponding to the remote end triplet information and the application information, to obtain a clustering result including the remote end triplet information, the application information, and the number of connections having a correspondence relationship therebetween; according to a result of comparing the number of the connections with a first connection number threshold, select the remote end triplet information and application information having a correspondence relationship therebetween from the clustering result, where the number of connections corresponding to the selected remote end triplet information and application information is greater than or equal to the first connection number threshold; or, according to a result of comparing a proportion of the number of connections to the number of all connections with a second connection number proportion threshold, select remote end triplet information and application information having a correspondence relationship therebetween from the clustering result, where the proportion of the number of connections corresponding to the selected remote end triplet information and application information to the number of all connections is greater than or equal to the second connection number proportion threshold, and send the selected remote end triplet information and application information having a correspondence relationship therebetween to the DPI subsystem.

With reference to the eighth aspect, in a second implementation manner, the system further includes a crawling subsystem, configured to, for each type of application, according to domain name information corresponding to the application, crawl IP address information corresponding to the domain name information to obtain a crawling result including the application information, the domain name information, and the IP address information that have a correspondence relationship therebetween;

the DPI subsystem is further configured to perform protocol identification processing on received first network data, and output a first protocol identification result to the UBA subsystem, where the first protocol identification result includes the remote end triplet information; and the UBA subsystem is specifically configured to: obtain the first protocol identification result output by the DPI subsystem; according to the crawling result and the first protocol identification result, by using a same IP address in the crawling result and in the first protocol identification result as an association condition, associatedly generate the to-be-processed data, where the to-be-processed data includes multiple records, and each record includes application information and remote end triplet information having a correspondence relationship therebetween; perform clustering processing on records with same remote end triplet information and same application information in the to-be-processed data; accumulate the number of records with same remote end triplet information and same application information in the to-be-processed data, wherein the number of the records is used as the number of connections corresponding to the remote end triplet information and the application information, to obtain a clustering result including the remote end triplet information, the application information, and the number of connections having a correspondence relationship therebetween; according to a result of comparing the number of the connections with a first connection number threshold, select the remote end triplet information and application information having a correspondence relationship therebetween from the clustering result, where the number of connections corresponding to the selected remote end triplet information and application information is greater than or equal to the first connection number threshold; or, according to a result of comparing a proportion of the number of connections to the number of all connections with a second connection number proportion threshold, select remote end triplet information and application information having a correspondence relationship therebetween from the clustering result, where the proportion of the number of connections corresponding to the selected remote end triplet information and application information to the number of all connections is greater than or equal to the second connection number proportion threshold, and send the selected remote end triplet information and application information having a correspondence relationship therebetween to the DPI subsystem.

With reference to the eighth aspect, in a third implementation manner, in the system, each record further includes a client IP address, a client port, and traffic that corresponds to the application information and quintuple information, and the client IP address, the client port, and the remote end triplet information form the quintuple information;

the DPI subsystem is further configured to perform protocol identification processing on received first network data, and output a first protocol identification result to the UBA subsystem, where the first protocol identification result includes quintuple information; and the UBA subsystem is specifically configured to: receive first network data, where the first network data includes one or more data streams, and each of the data streams includes one or more data packets; for each type of application, according to domain name information corresponding to the application, crawl IP address information corresponding to the domain name information to obtain a crawling result including application information, the domain name information, and the IP address information having a correspondence relationship therebetween; obtain a first protocol identification result output by the DPI subsystem; according to the crawling result, the first protocol identification result, and the first network data, by using a same IP address in the crawling result and in the first protocol identification result as an association condition, associatedly generate the to-be-processed data, where the to-be-processed data includes multiple records, each record includes: the application information, the quintuple information, and the traffic having a correspondence relationship therebetween, the traffic corresponding to the quintuple information is an accumulated value of load lengths of one or more data packets in the first network data that include the quintuple information; perform clustering processing on records with same remote end triplet information and same application information but with different client IP addresses and different client ports in the to-be-processed data, and obtain a traffic aggregate amount corresponding to the remote end triplet information and the application information by accumulating traffic in records with same remote end triplet information and same application information in the to-be-processed data, to obtain a clustering result including the remote end triplet information, the application information, and the traffic aggregate amount having a correspondence relationship therebetween; according to a result of comparing the traffic aggregate amount with a first traffic threshold, select remote end triplet information and application information having a correspondence relationship therebetween from the clustering result, where the traffic aggregate amount corresponding to the selected remote end triplet information and application information is greater than or equal to the first traffic threshold; or, according to a result of comparing a proportion of the traffic aggregate amount to all traffic with a second traffic proportion threshold, select remote end triplet information and application information having a correspondence relationship therebetween from the clustering result, where the proportion of the traffic aggregate amount corresponding to the selected remote end triplet information and application information to all traffic is greater than or equal to the second traffic proportion threshold, and send the selected remote end triplet information and application information having a correspondence relationship therebetween to the DPI subsystem.

With reference to the eighth aspect, in a fourth implementation manner, in the system, each record further includes a client IP address, a client port, and traffic that corresponds to the application information and quintuple information, and the client IP address, the client port, and the remote end triplet information form the quintuple information;

the system further includes a crawling subsystem, configured to, for each type of application, according to domain name information corresponding to the application, crawl IP address information corresponding to the domain name information to obtain a crawling result including the application information, the domain name information, and the IP address information that have a correspondence relationship therebetween;

the DPI subsystem is further configured to perform protocol identification processing on received first network data, and output a first protocol identification result to the UBA subsystem, where the first protocol identification result includes quintuple information; and the UBA subsystem is specifically configured to: receive first network data, where the first network data includes one or more data streams, and each of the data streams includes one or more data packets; obtain the first protocol identification result output by the DPI subsystem and a crawling result output by the crawling subsystem; according to the crawling result, the first protocol identification result, and the first network data, by using a same IP address in the crawling result and in the first protocol identification result as an association condition, associatedly generate the to-beprocessed data, where the to-be-processed data includes multiple records, each record includes: the application information, the quintuple information, and the traffic having a correspondence relationship therebetween, the traffic corresponding to the quintuple information is an accumulated value of load lengths of one or more data packets in the first network data that include the quintuple information; perform clustering processing on records with same remote end triplet information and same application information but with different client IP addresses and different client ports in the to-be-processed data, and obtain a traffic aggregate amount corresponding to the remote end triplet information and the application information by accumulating traffic in records with same remote end triplet information and same application information in the to-be-processed data, to obtain a clustering result including the remote end triplet information, the application information, and the traffic aggregate amount having a correspondence relationship therebetween; according to a result of comparing the traffic aggregate amount with a first traffic threshold, select remote end triplet information and application information having a correspondence relationship therebetween from the clustering result, where the traffic aggregate amount corresponding to the selected remote end triplet information and application information is greater than or equal to the first traffic threshold; or, according to a result of comparing a proportion of the traffic aggregate amount to all traffic with a second traffic proportion threshold, select remote end triplet information and application information having a correspondence relationship therebetween from the clustering result, where the proportion of the traffic aggregate amount corresponding to the selected remote end triplet information and application information to all traffic is greater than or equal to the second traffic proportion threshold, and send the selected remote end triplet information and application information having a correspondence relationship therebetween to the DPI subsystem.

With reference to the eighth aspect or the first, second, third or fourth implementation manner of the eighth aspect, in a fifth implementation manner, the system further includes a service control subsystem the DPI subsystem is further configured to provide the application information for the service control subsystem; and the service control subsystem is configured to, according to the application information provided by the DPI subsystem, provide application-based services, where the services include accounting, blocking, traffic limiting, redirection, or service optimization.

It can be seen that, in the embodiment of the present invention, a UBA subsystem obtains to-be-processed data, where the to-be-processed data includes multiple records, and each record includes application information and remote end triplet information having a correspondence relationship therebetween; performs clustering processing on records with same remote end triplet information and same application information in the to-be-processed data, and according to the records with the same remote end triplet information and the same application information in the to-be-processed data, calculates a service load amount corresponding to the remote end triplet information and the application information to obtain a clustering result including the remote end triplet information, the application information, and the service load amount that have a correspondence relationship therebetween; according to the service load amount or a proportion of the service load amount, selects remote end triplet information and application information that have high reliability and have correspondence relationship therebetween from the clustering result, and sends the remote end triplet information and application information that have high reliability and have correspondence relationship therebetween to a DPI subsystem, so that a data mining analysis result of the UBA subsystem is synchronously transmitted to the DPI subsystem, in other words, the UBA subsystem feeds back the data mining analysis result of the UBA subsystem to the DPI subsystem, that is, the correspondence relationship between the application information and the remote end triplet information that is maintained by the DPI subsystem is established or updated based on the application information and the remote end triplet information that are sent by the UBA subsystem; therefore, when receiving second network data, the DPI subsystem may rapidly, according to remote end triplet information contained in the second network data, search the correspondence between the application information and the remote end triplet information for the application information matching the remote end triplet information contained in the second network data, so as to greatly improve DPI-based identification performance and an application identification rate, especially dramatically improve an application identification rate of an encryption protocol, and dramatically improve an application identification rate of bearing protocols.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAIL DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

To make it convenient to understand the embodiments of the present invention, elements introduced in the description of the embodiments of the present invention are described herein first.

Quintuple information: a source IP address, a source port, a destination IP address, a destination port, and a transmission protocol. It should be noted that, the embodiments of the present invention are applied in a client/server (C/S) networking mode, so that in the embodiments of the present invention, the source IP address and the source port shall be understood as a client IP address and a client port, respectively; the destination IP address and the destination port shall be understood as a server IP address and a server port, respectively; and for ease of description in the following, concepts are unified herein first, that is, a local end is a client, a remote end is a server, and remote end triplet information is used to indicate a server IP address, a server port, and a transmission protocol.

Remote end triplet information: a server IP address, a server port, and a transmission protocol; it should be noted that, if network data is sent from a client to a server, the remote end triplet information may also be used to indicate a destination IP address, a destination port, and a transmission protocol. In the embodiments of the present invention, examples are provided mainly in this scenario to illustrate the solutions of the present invention.

Figure 1A:
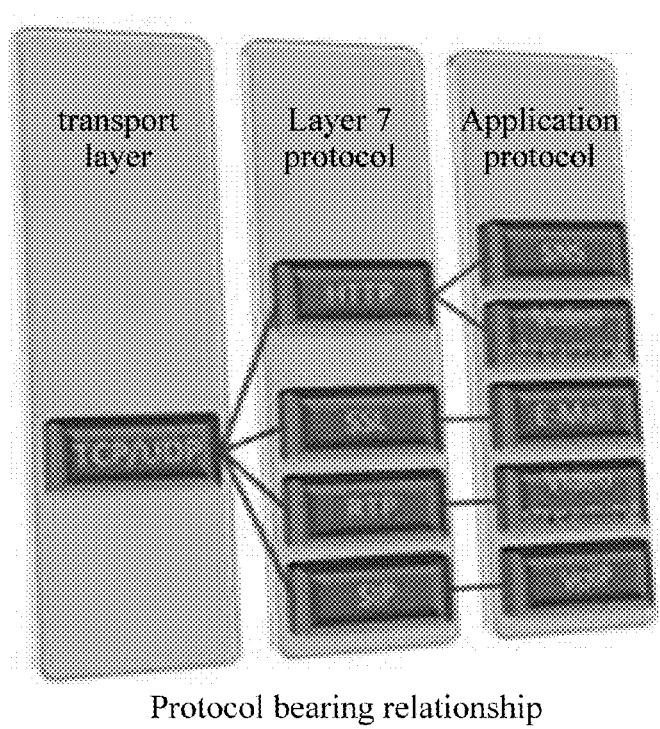
FIG. 1A is a schematic structural diagram of a conventional hierarchical relationship diagram of protocols.
Figure 1B:
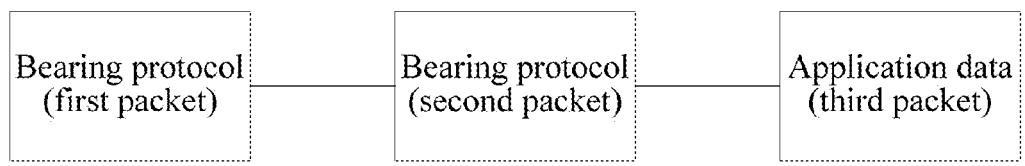
FIG. 1B is a schematic diagram of conventional stream-based bearing.
Figure 1C:
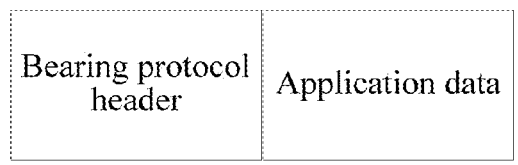
FIG. 1C is a schematic diagram of conventional packet-based bearing.

Application information: information used to indicate an application, for example, an application name or an application identifier or an application type. For example, referring to FIG. 1A, the application can be social network service (SNS), electronic mail (E-mail), GMAIL_SSL, Skype, KuGoo, and PPLive.

Figure 2:
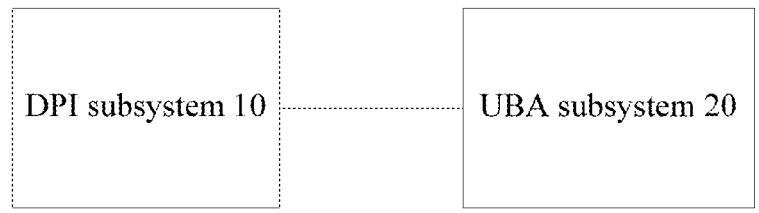
FIG. 2 is a schematic diagram of a logical structure of a communications system according to an embodiment of the present invention.

Referring to FIG. 2, FIG. 2 is a schematic diagram of a logical structure of a communications system according to an embodiment of the present invention. As shown in FIG. 2, the communications system according to the embodiment of the present invention includes: a DPI subsystem 10 and a UBA subsystem 20.

The UBA subsystem 20 is configured to obtain to-be-processed data, where the to-be-processed data includes multiple records, and each record includes application information and remote end triplet information having a correspondence relationship therebetween; perform clustering processing on records with same remote end triplet information and same application information in the to-be-processed data, and calculate, according to the records with the same remote end triplet information and the same application information, a service load amount corresponding to the remote end triplet information and the application information to obtain a clustering result including the remote end triplet information, the application information, and the service load amount that have a correspondence relationship therebetween; according to the service load amount or a proportion of the service load amount, select remote end triplet information and application information that have high reliability and have correspondence relationship therebetween from the clustering result, and send the remote end triplet information and the application information that have high reliability and have correspondence relationship therebetween to the DPI subsystem 10, where the remote end triplet information includes: a server IP address, a server port, and a transmission protocol.

The DPI subsystem 10 is configured to, when receiving second network data, search, according to remote end triplet information contained in the second network data, correspondence relationship between application information and remote end triplet information that is maintained by the DPI subsystem 10 for application information matching the remote end triplet information contained in the second network data to identify an application type of the second network data, where the correspondence relationship between the application information and the remote end triplet information that is maintained by the DPI subsystem 10 is established or updated based on the remote end triplet information and application information that are sent by the UBA subsystem and have correspondence relationship therebetween. It should be understood that, after the application information is determined, application-based services, such as blocking of a mail tariff packet, a video tariff packet, a game tariff packet, and specific downloaded software, may be supported.

The service load amount mentioned in the embodiment of the present invention includes, but is not limited to, a traffic aggregate amount or the number of connections.

In a situation in which the service load amount is the traffic aggregate amount, in an implementation manner, in the communications system of the embodiment of the present invention, the DPI subsystem 10 is further configured to perform protocol identification processing on received first network data, and output a first protocol identification result to the UBA subsystem 20, where the first protocol identification result includes the remote end triplet information. Preferably, the first protocol identification result includes quintuple information and L7 protocol information.

Correspondingly, the UBA subsystem 20 is specifically configured to: for each type of application, according to domain name information corresponding to the application, crawl IP address information corresponding to the domain name information to obtain a crawling result including application information, the domain name information, and the IP address information having a correspondence relationship therebetween; obtain the first protocol identification result output by the DPI subsystem 10; according to the crawling result and the first protocol identification result, by using a same IP address in the crawling result and in the first protocol identification result as an association condition, associatedly generate the to-be-processed data, where the to-be-processed data includes multiple records, and each record includes application information and remote end triplet information having a correspondence relationship therebetween; perform clustering processing on the records with the same remote end triplet information and the same application information in the to-be-processed data; accumulate the number of the records with the same remote end triplet information and the same application information in the to-be-processed data, where the number of the records is used as the number of connections corresponding to the remote end triplet information and the application information, to obtain a clustering result including the remote end triplet information, the application information, and the number of the connections having a correspondence relationship therebetween; according to a result of comparing the number of the connections with a first connection number threshold, select remote end triplet information and application information having a correspondence relationship therebetween from the clustering result, where the number of connections corresponding to the selected remote end triplet information and application information is greater than or equal to the first connection number threshold; or, according to a result of comparing a proportion of the number of the connections to the number of all connections with a second connection number proportion threshold, select remote end triplet information and application information having a correspondence relationship therebetween from the clustering result, where the proportion of the number of connections corresponding to the selected remote end triplet information and application information to the number of all connections is greater than or equal to the second connection number proportion threshold, and send the selected remote end triplet information and application information having a correspondence relationship therebetween to the DPI subsystem 10.

It should be noted that, that the DPI subsystem 10 outputs the first protocol identification result to the UBA subsystem 20 may be that: the DPI subsystem 10 directly outputs the first protocol identification result to the UBA subsystem 20, and the DPI subsystem 10 may also indirectly output the first protocol identification result to the UBA subsystem 20. For example, the DPI subsystem 10 sends the first protocol identification result to a database for storage, so that the UBA subsystem 20 obtains the first protocol identification result from the database in real time or regularly.

Figure 3:
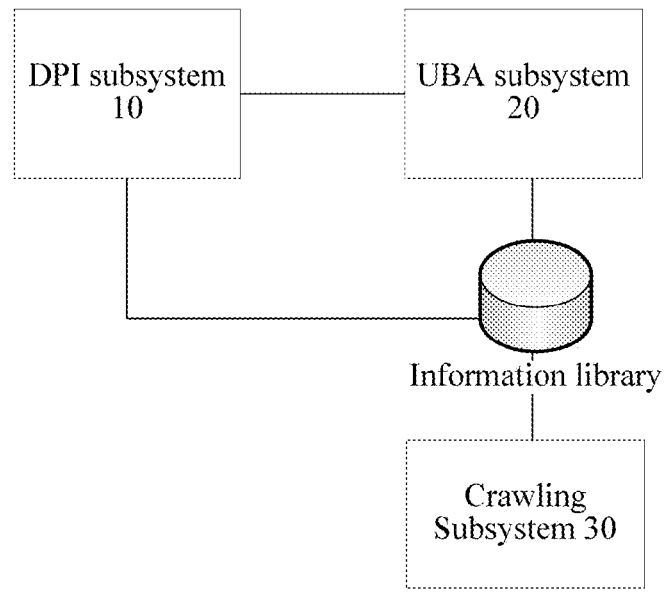
FIG. 3 is a schematic diagram of a logical structure of another communications system according to an embodiment of the present invention.

In another implementation manner, as shown in FIG. 3, the system of the embodiment of the present invention further includes: a crawling subsystem 30, configured to, for each type of application, according to domain name information corresponding to the application, crawl IP address information corresponding to the domain name information to obtain a crawling result including application information, the domain name information, and the IP address information having a correspondence relationship therebetween. The crawling result herein may be directly or indirectly transferred to the UBA subsystem 20. For the latter situation, for example, the crawling subsystem 30 stores the crawling result in a database, and the database has communication connections to both the UBA subsystem 20 and the crawling subsystem 30.

The DPI subsystem 10 is further configured to perform protocol identification processing on received first network data, and output a first protocol identification result to the UBA subsystem. The first protocol identification result includes the remote end triplet information; preferably, the first protocol identification result includes quintuple information and L7 protocol information.

Correspondingly, the UBA subsystem 20 is specifically configured to: obtain the first protocol identification result output by the DPI subsystem 10; according to the crawling result and the first protocol identification result, by using a same IP address in the crawling result and in the first protocol identification result as an association condition, generate the to-be-processed data, where the to-be-processed data includes multiple records, and each record includes application information and remote end triplet information having a correspondence relationship therebetween; perform clustering processing on records with same remote end triplet information and same application information in the to-be-processed data; accumulate the number of the records with the same remote end triplet information and the same application information in the to-be-processed data, where the number of the records is used as the number of connections corresponding to the remote end triplet information and the application information, to obtain a clustering result including the remote end triplet information, the application information, and the number of the connections having a correspondence relationship therebetween; according to a result of comparing the number of the connections with a first connection number threshold, select remote end triplet information and application information having a correspondence relationship therebetween from the clustering result, where the number of connections corresponding to the selected remote end triplet information and application information is greater than or equal to the first connection number threshold; or, according to a result of comparing a proportion of the number of the connections to the number of all connections with a second connection number proportion threshold, select remote end triplet information and application information having a correspondence relationship therebetween from the clustering result, where the proportion of the number of connections corresponding to the selected remote end triplet information and application information to the number of all connections is greater than or equal to the second connection number proportion threshold, and send the selected remote end triplet information and application information having a correspondence relationship therebetween to the DPI subsystem 10.

In a situation in which the service load amount is the number of connections, in an implementation manner, in the communications system of the embodiment of the present invention, each record in the to-be-processed data further includes: a client IP address, a client port, and traffic corresponding to the application information and the quintuple information. The client IP address, the client port and the remote end triplet information form the quintuple information.

The DPI subsystem 10 is further configured to perform protocol identification processing on the received first network data, and output a first protocol identification result to the UBA subsystem 20, where the first protocol identification result includes quintuple information. Preferably, the first protocol identification result includes quintuple information and L7 protocol information.

Correspondingly, the UBA subsystem 20 is specifically configured to: receive first network data, where the first network data includes one or more data streams, and each of the data streams includes one or more data packets; for each type of application, according to domain name information corresponding to the application, crawl IP address information corresponding to the domain name information to obtain a crawling result including application information, the domain name information, and the IP address information having a correspondence relationship therebetween; obtain a first protocol identification result output by the DPI subsystem 10; according to the crawling result, the first protocol identification result, and the first network data, by using a same IP address in the crawling result and in the first protocol identification result as an association condition, associatedly generate the to-be-processed data, where the to-be-processed data includes multiple records, each record includes: the application information, the quintuple information, and the traffic having a correspondence relationship therebetween, the traffic corresponding to the quintuple information is an accumulated value of load lengths of one or more data packets in the first network data that include the quintuple information; perform clustering processing on records with same remote end triplet information and same application information but with different client IP addresses and different client ports in the to-be-processed data, and obtain a traffic aggregate amount corresponding to the remote end triplet information and the application information by accumulating traffic in records with same remote end triplet information and same application information in the to-be-processed data, to obtain a clustering result including the remote end triplet information, the application information, and the traffic aggregate amount having a correspondence relationship therebetween; according to a result of comparing the traffic aggregate amount with a first traffic threshold, select remote end triplet information and application information having a correspondence relationship therebetween from the clustering result, where the traffic aggregate amount corresponding to the selected remote end triplet information and application information is greater than or equal to the first traffic threshold; or, according to a result of comparing a proportion of the traffic aggregate amount to all traffic with a second traffic proportion threshold, select remote end triplet information and application information having a correspondence relationship therebetween from the clustering result, where the proportion of the traffic aggregate amount corresponding to the selected remote end triplet information and application information to all traffic is greater than or equal to the second traffic proportion threshold, and send the selected remote end triplet information and application information having a correspondence relationship therebetween to the DPI subsystem 10.

In another implementation manner, as shown in FIG. 3, the system of the embodiment of the present invention further includes: a crawling subsystem 30, configured to, for each type of application, according to domain name information corresponding to the application, crawl IP address information corresponding to the domain name information to obtain a crawling result including application information, the domain name information, and the IP address information having a correspondence relationship therebetween. The crawling result herein may be directly or indirectly transferred to the UBA subsystem 20. For the latter situation, for example, the crawling subsystem 30 stores the crawling result in a database, and the database has communication connections to both the UBA subsystem 20 and the crawling subsystem 30.

The DPI subsystem 10 is further configured to perform protocol identification processing on received first network data, and output a first protocol identification result to the UBA subsystem. The first protocol identification result includes quintuple information; preferably, the first protocol identification result includes quintuple information and L7 protocol information.

Correspondingly, the UBA subsystem 20 is specifically configured to: receive first network data, where the first network data includes one or more data streams, and each of the data streams includes one or more data packets; obtain the first protocol identification result output by the DPI subsystem 10 and a crawling result output by the crawling subsystem; according to the crawling result, the first protocol identification result, and the first network data, by using a same IP address in the crawling result and in the first protocol identification result as an association condition, generate the to-be-processed data, where the to-be-processed data includes multiple records, each record includes: the application information, the quintuple information, and the traffic having a correspondence relationship therebetween, the traffic corresponding to the quintuple information is an accumulated value of load lengths of one or more data packets in the first network data that include the quintuple information; perform clustering processing on records with same remote end triplet information and same application information but with different client IP addresses and different client ports in the to-be-processed data, and obtain a traffic aggregate amount corresponding to the remote end triplet information and the application information by accumulating traffic in records with same remote end triplet information and same application information in the to-be-processed data, to obtain a clustering result including the remote end triplet information, the application information, and the traffic aggregate amount having a correspondence relationship therebetween; according to a result of comparing the traffic aggregate amount with a first traffic threshold, select remote end triplet information and application information having a correspondence relationship therebetween from the clustering result, where the traffic aggregate amount corresponding to the selected remote end triplet information and application information is greater than or equal to the first traffic threshold; or, according to a result of comparing a proportion of the traffic aggregate amount to all traffic with a second traffic proportion threshold, select remote end triplet information and application information having a correspondence relationship therebetween from the clustering result, where the proportion of the traffic aggregate amount corresponding to the selected remote end triplet information and application information to all traffic is greater than or equal to the second traffic proportion threshold, and send the selected remote end triplet information and application information having a correspondence relationship therebetween to the DPI subsystem 10.

It should be noted that, a condition or a data source, with which the UBA subsystem 20 generates the to-be-processed data, may be the first network data, the first protocol identification result, and the crawling result that are obtained from a database having a communication connection, and may also receive a first network data sent by a network element device (for example, a router), a first protocol identification result sent by the DPI subsystem 10, and a crawling result sent by the crawling subsystem 30.

It should be noted that, the UBA subsystem 20 in the communications system of the embodiment of the present invention may be in the offline state, change into online state when a working trigger condition is satisfied, perform data mining, and feedback a data mining analysis result (that is, application information and remote end triplet information having a correspondence relationship therebetween) to the DPI subsystem 10.

In an actual application, the UBA subsystem 20 in the communications system of the embodiment of the present invention may be a UBA server.

In an actual application, in an implementation manner, the DPI subsystem 10 in the communications system of the embodiment of the present invention may be an independent DPI server, for example, the DPI server is externally deployed, or, the DPI server is connected in series in a network architecture; in a mobile network, for example, the DPI server is connected in series between an Radio Network Controller (RNC) and a gateway general packet radio service (GPRS) support node (GGSN), or the DPI server is connected in series between a GGSN and a service control gateway; in a fixed network, for example, the DPI server is connected in series between a broadband access server and a service control gateway. In another implementation manner, the DPI subsystem 10 may also be a network element device having a DPI function, and a product form thereof may be a router, a gateway device, an RNC, a GGSN, an Service Continuity Gateway (SCG), or a Packet Data Serving Node (PDSN), and so on. It should be understood that, the DPI subsystem 10 supports independent external disposition, the DPI subsystem 10 may be connected to an existing device, and may also be built in a network element device of an existing network through, for example, plugging or software integration.

In an actual application, the crawling subsystem 30 in the communications system of the embodiment of the present invention may be one or more crawling servers (that is, a crawling server group), such as a Domain Name System (DNS) server, a web server, a mail server and/or a game server.

It should be understood that, the DPI subsystem 10 and the UBA subsystem mentioned in the embodiment of the present invention are both deployed on a single physical node.

The technical solution of the embodiment of the present invention may be applied in various communications systems, such as a global system for mobile communications (GSMsystem), a code division multiple access (CDMA)) system, a wideband code division multiple access (WCDMA) system, a GPRS, a long term evolution (LTE) system, an LTE frequency division duplex (FDD) system, LTE time division duplex (TDD), a universal mobile telecommunication system (UMTS), and a worldwide interoperability for microwave access (WiMAX) communications system.

It can be seen that, in the embodiment of the present invention, a UBA subsystem obtains to-be-processed data, where the to-be-processed data includes multiple records, and each record includes application information and remote end triplet information having a correspondence relationship therebetween; performs clustering processing on records with same remote end triplet information and same application information in the to-be-processed data, and according to the records with the same remote end triplet information and the same application information in the to-be-processed data, calculates a service load amount corresponding to the remote end triplet information and the application information to obtain a clustering result including the remote end triplet information, the application information, and the service load amount that have a correspondence relationship therebetween; according to the service load amount or a proportion of the service load amount, selects remote end triplet information and application information that have high reliability and have correspondence relationship therebetween from the clustering result, and sends the remote end triplet information and application information that have high reliability and have correspondence relationship therebetween to a DPI subsystem, so that a data mining analysis result of the UBA subsystem is synchronously transmitted to the DPI subsystem, in other words, the UBA subsystem feeds back the data mining analysis result of the UBA subsystem to the DPI subsystem, that is, the correspondence relationship between the application information and the remote end triplet information that is maintained by the DPI subsystem is established or updated based on the application information and the remote end triplet information that are sent by the UBA subsystem; therefore, when receiving second network data, the DPI subsystem may rapidly, according to remote end triplet information contained in the second network data, search the correspondence between the application information and the remote end triplet information for the application information matching the remote end triplet information contained in the second network data, so as to greatly improve DPI-based identification performance and an application identification rate, especially dramatically improve an application identification rate of an encryption protocol, and dramatically improve an application identification rate of bearing protocols.

Further, the DPI subsystem performs protocol identification processing on the received first network data, and directly or indirectly outputs a first protocol identification result to the UBA subsystem; the UBA subsystem obtains to-be-processed data, where the to-be-processed data includes multiple records, each record at least includes application information and remote end triplet information having a correspondence relationship therebetween, and the to-be-processed data is generated according to a data source at least including the first protocol identification result; so that the input or output of the DPI subsystem and the input or output of the UBA subsystem can be transformed into each other to some extent.

Further, in the communications system provided by the embodiment of the present invention, the UBA subsystem feeds back the data mining analysis result of the UBA subsystem to the DPI subsystem, that is, the correspondence relationship between the application information and the remote end triplet information that is maintained by the DPI subsystem is established or updated based on the application information and the remote end triplet information that are sent by the UBA subsystem and have correspondence relationship therebetween, so as to solve the problems in the prior art that fixed configurations incur maintenance costs and cannot adapt to changes, thereby realizing adaptive update or maintenance of the correspondence between the application information and the remote end triplet information, resulting in reduction in maintenance work.

Figure 4:
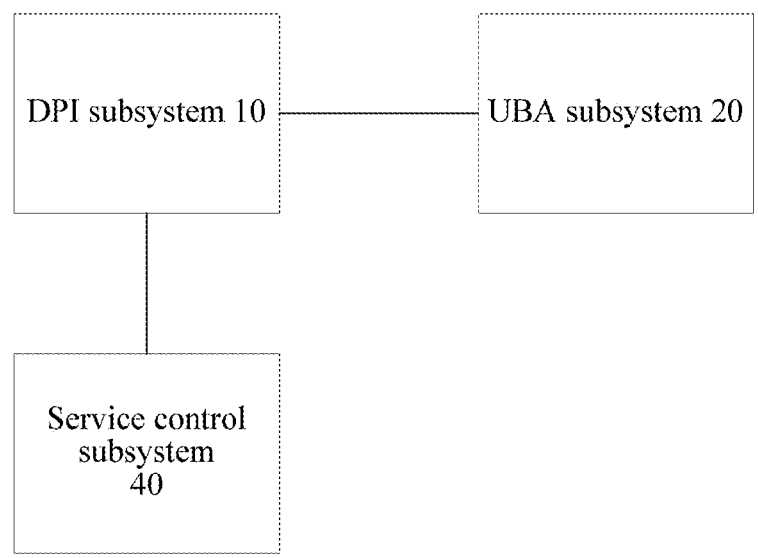
FIG. 4 is a schematic diagram of a logical structure of another communications system according to an embodiment of the present invention.

Referring to FIG. 4, FIG. 4 is a schematic diagram of a logical structure of another communications system according to an embodiment of the present invention. As shown in FIG. 4, the communications system of the embodiment of the present invention includes: a DPI subsystem 10, a UBA subsystem 20, and a service control subsystem 40. For functions of the DPI subsystem 10 and the UBA subsystem 20, reference may be made to the description of the embodiment of the aforementioned communications system.

The DPI subsystem 10 is further configured to provide the application information for the service control subsystem 40.

The service control subsystem 40 is configured to, according to the application information provided by the DPI subsystem 10, provide application-based services, where the services include accounting, blocking, traffic limiting, redirection, or service optimization.

An application-based service providing network of the embodiment of the present invention can provide application-based services, and the services herein include, but not limited to, accounting, blocking, traffic limiting, redirection, or service optimization. In other words, identify and analyze various application layer protocols in the network, and apply various policies to the various application layer protocols, such as accounting, blocking, traffic limiting, redirection, or service optimization, for example, blocking of a mail tariff packet, a video tariff packet, a game tariff packet, and specific downloaded software.

It can be seen that, in the embodiment of the present invention, a UBA subsystem obtains to-be-processed data, where the to-be-processed data includes multiple records, and each record includes application information and remote end triplet information having a correspondence relationship therebetween; performs clustering processing on records with same remote end triplet information and same application information in the to-be-processed data, and according to the records with the same remote end triplet information and the same application information in the to-be-processed data, calculates a service load amount corresponding to the remote end triplet information and the application information to obtain a clustering result including the remote end triplet information, the application information, and the service load amount that have a correspondence relationship therebetween; according to the service load amount or a proportion of the service load amount, selects remote end triplet information and application information that have high reliability and have correspondence relationship therebetween from the clustering result, and sends the remote end triplet information and application information that have high reliability and have correspondence relationship therebetween to a DPI subsystem, so that a data mining analysis result of the UBA subsystem is synchronously transmitted to the DPI subsystem, in other words, the UBA subsystem feeds back the data mining analysis result of the UBA subsystem to the DPI subsystem, that is, the correspondence relationship between the application information and the remote end triplet information that is maintained by the DPI subsystem is established or updated based on the application information and the remote end triplet information that are sent by the UBA subsystem; therefore, when receiving second network data, the DPI subsystem may rapidly, according to remote end triplet information contained in the second network data, search the correspondence between the application information and the remote end triplet information for the application information matching the remote end triplet information contained in the second network data, so as to greatly improve DPI-based identification performance and an application identification rate, especially dramatically improve an application identification rate of an encryption protocol, and dramatically improve an application identification rate of bearing protocols, thereby realizing support of application-based services.

Further, the DPI subsystem performs protocol identification processing on the received first network data, and directly or indirectly outputs a first protocol identification result to the UBA subsystem; the UBA subsystem obtains to-be-processed data, where the to-be-processed data includes multiple records, each record at least includes application information and remote end triplet information having a correspondence relationship therebetween, and the to-be-processed data is generated according to a data source at least including the first protocol identification result; so that the input or output of the DPI subsystem and the input or output of the UBA subsystem can be transformed into each other to some extent.

Further, in the communications system provided by the embodiment of the present invention, the UBA subsystem feeds back the data mining analysis result of the UBA subsystem to the DPI subsystem, that is, the correspondence relationship between the application information and the remote end triplet information that is maintained by the DPI subsystem is established or updated based on the application information and the remote end triplet information that are sent by the UBA subsystem and have correspondence relationship therebetween, so as to solve the problems in the prior art that fixed configurations incur maintenance costs and cannot adapt to changes, thereby realizing adaptive update or maintenance of the correspondence between the application information and the remote end triplet information, resulting in reduction in maintenance work.

Figure 5:
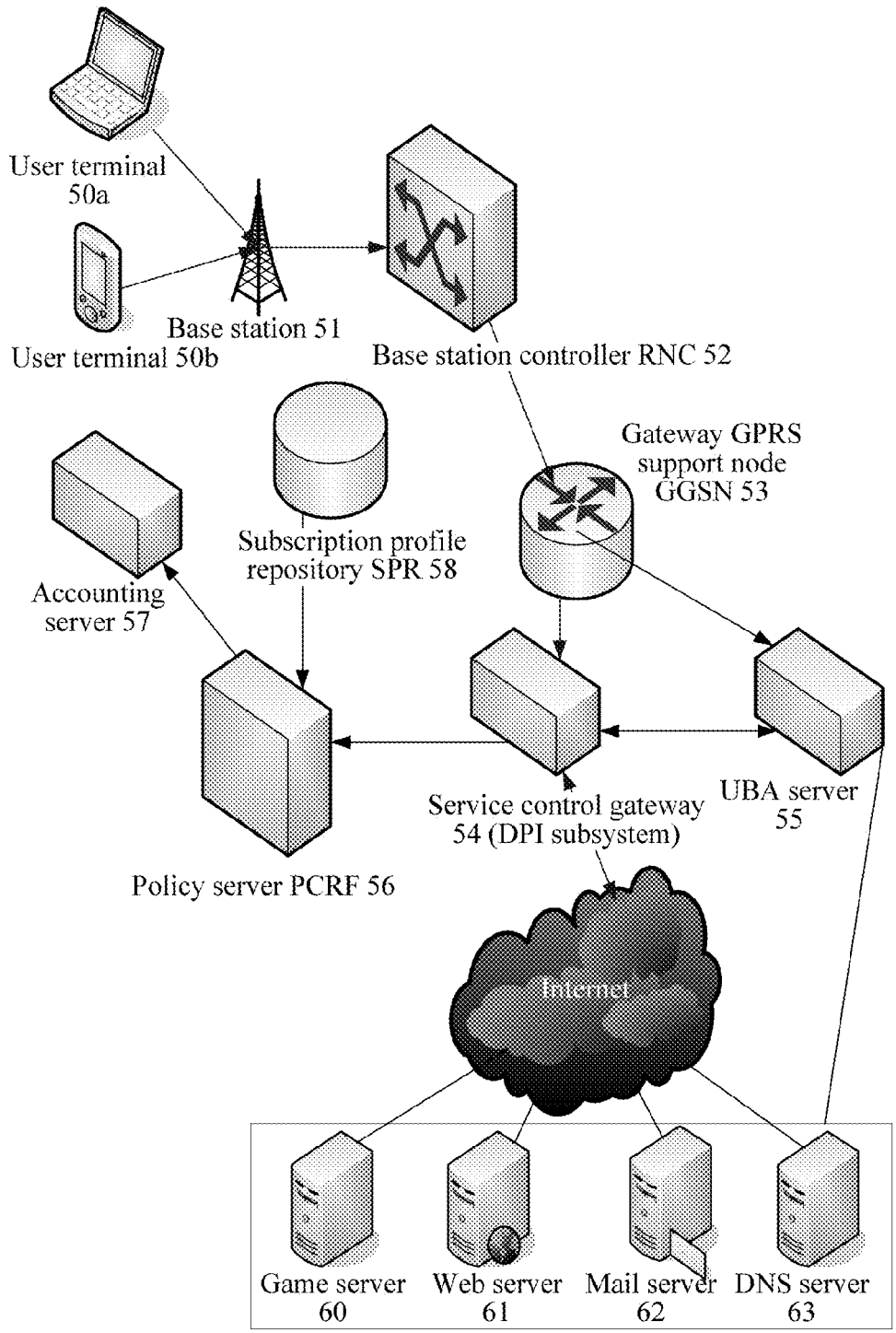
FIG. 5 is a schematic diagram of physical deployment of a communications system according to an embodiment of the present invention.

An embodiment of the present invention is mainly applied to a client/server C/S networking mode, and referring to FIG. 5, FIG. 5 is a schematic diagram of physical deployment of a communications system according to an embodiment of the present invention, providing an accounting service for an operator network. As shown in FIG. 5, the communications system includes: user terminals 50a-50b, a base station 51, a RNC 52, a GGSN 53, a SCG 54, a UBA server 55, a policy server (PCRF) 56, an accounting server 57, a subscription profile repository (SPR) database 58, and a crawling server group (a game server 60, a web server 61, a mail server 62, and a DNS server 63). The SCG 54 is connected to the Internet.

Figure 6A:
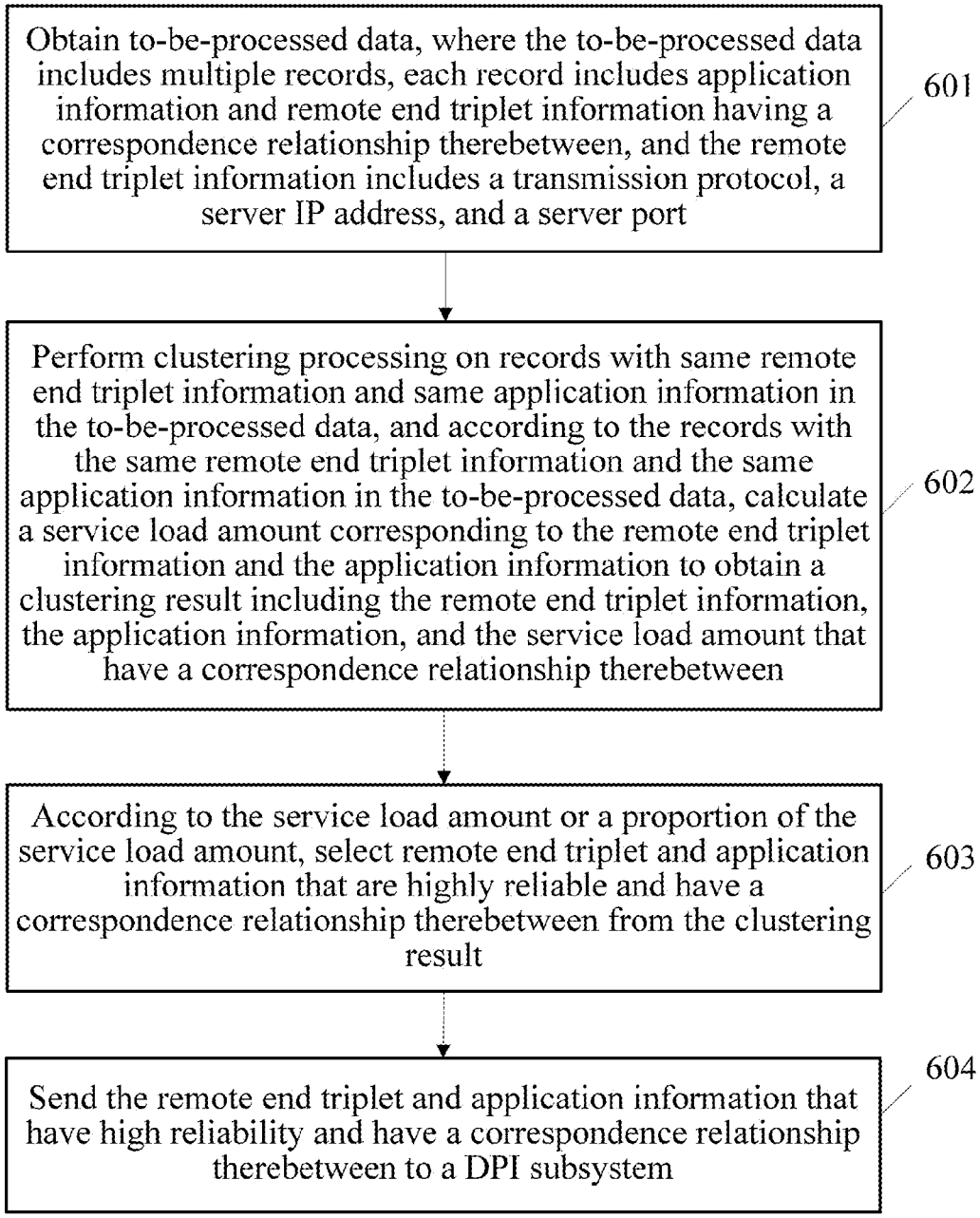
FIG. 6A is a schematic flow chart of a UBA-based data mining method provided by an embodiment of the present invention.

Referring to FIG. 6A, FIG. 6A is a schematic flow chart of a UBA-based data mining method provided by an embodiment of the present invention, the method may be applied to the UBA subsystem shown in FIG. 2 or 3 (that is, a UBA server), and as shown in FIG. 6A, the method may include the following steps.

S601: Obtain to-be-processed data, where the to-be-processed data includes multiple records, each record includes application information and remote end triplet information having a correspondence relationship therebetween, and the remote end triplet information includes a transmission protocol, a server IP address, and a server port.

Preferably, each record includes: application information and quintuple information having a correspondence relationship therebetween, where the quintuple information herein includes a client IP address, a client port, a transmission protocol, a server IP address, and a server port.

S602: Perform clustering processing on records with same remote end triplet information and same application information in the to-be-processed data, and according to the records with the same remote end triplet information and the same application information in the to-be-processed data, calculate a service load amount corresponding to the remote end triplet information and the application information to obtain a clustering result including the remote end triplet information, the application information, and the service load amount that have a correspondence relationship therebetween.

The service load amount in the embodiment of the present invention includes, but not limited to, any one or combination of a traffic aggregate amount and the number of connections. The traffic aggregate amount herein refers to an aggregate amount of traffic of network data transmitted on each connection of the connections, and in other words, the quintuple information can uniquely identify a connection. The number of the connections herein in the present invention indicates the number of connections with same remote end triplet information in the quintuple information.

S603: According to the service load amount or a proportion of the service load amount, select remote end triplet information and application information that have high reliability and have correspondence relationship therebetween from the clustering result.

It should be understood that, the clustering result in step S602 includes remote end triplet information and application information that are false and have correspondence relationship therebetween. For example, more and more proxy servers exist in a current network environment, convergence processing is performed in step S603 on the clustering result obtained in S602, to remove a false application feature.

In an implementation manner, according to the service load amount or a proportion of the service load amount, selecting remote end triplet information and application information that have high reliability and have correspondence relationship therebetween from the clustering result may include: according to a result of comparing the service load amount with a first threshold, selecting remote end triplet information and application information having a correspondence relationship therebetween from the clustering result, where the service load amount corresponding to the selected remote end triplet information and application information is greater than or equal to the first threshold, or according to a result of comparing the proportion of the service load amount with a second threshold, selecting remote end triplet information and application information having a correspondence relationship therebetween from the clustering result, where the proportion of the service load amount corresponding to the selected remote end triplet information and application information is greater than or equal to the second threshold.

It should be noted that, the first threshold and the second threshold herein may be flexibly set according to an actual application or an empirical value, which is not limited in the embodiment of the present invention.

S604: Send the remote end triplet information and application information that have high reliability and have a correspondence relationship therebetween to a DPI subsystem.

It can be seen that, in the UBA-based data mining method provided by the embodiment of the present invention, a UBA subsystem (a UBA server) obtains to-be-processed data, where the to-be-processed data includes multiple records, and each record includes application information and remote end triplet information having a correspondence relationship therebetween; performs clustering processing on records with same remote end triplet information and same application information in the to-be-processed data, and according to the records with the same remote end triplet information and the same application information in the to-be-processed data, calculates a service load amount corresponding to the remote end triplet information and the application information to obtain a clustering result including the remote end triplet information, the application information, and the service load amount that have a correspondence relationship therebetween; according to the service load amount or a proportion of the service load amount, selects remote end triplet information and application information that have high reliability and have correspondence relationship therebetween from the clustering result, and sends the remote end triplet information and application information that have high reliability and have correspondence relationship therebetween to a DPI subsystem, so that a data mining analysis result of the UBA subsystem is synchronously transmitted to the DPI subsystem, in other words, the UBA subsystem feeds back the data mining analysis result of the UBA subsystem to the DPI subsystem, that is, the correspondence relationship between the application information and the remote end triplet information that is maintained by the DPI subsystem is established or updated based on the application information and the remote end triplet information that are sent by the UBA subsystem; therefore, when receiving second network data, the DPI subsystem may rapidly, according to remote end triplet information contained in the second network data, search the correspondence between the application information and the remote end triplet information for the application information matching the remote end triplet information contained in the second network data, so as to greatly improve DPI-based identification performance and an application identification rate, especially dramatically improve an application identification rate of an encryption protocol, and dramatically improve an application identification rate of bearing protocols.

Further, the DPI subsystem performs protocol identification processing on the received first network data, and directly or indirectly outputs a first protocol identification result to the UBA subsystem; the UBA subsystem obtains to-be-processed data, where the to-be-processed data includes multiple records, each record at least includes application information and remote end triplet information having a correspondence relationship therebetween, and the to-be-processed data is generated according to a data source at least including the first protocol identification result; so that the input or output of the DPI subsystem and the input or output of the UBA subsystem can be transformed into each other to some extent.

Further, in the communications system provided by the embodiment of the present invention, the UBA subsystem feeds back the data mining analysis result of the UBA subsystem to the DPI subsystem, that is, the correspondence relationship between the application information and the remote end triplet information that is maintained by the DPI subsystem is established or updated based on the application information and the remote end triplet information that are sent by the UBA subsystem and have correspondence relationship therebetween, so as to solve the problems in the prior art that fixed configurations incur maintenance costs and cannot adapt to changes, thereby realizing adaptive update or maintenance of the correspondence between the application information and the remote end triplet information, resulting in reduction in maintenance work.

Figure 6B:
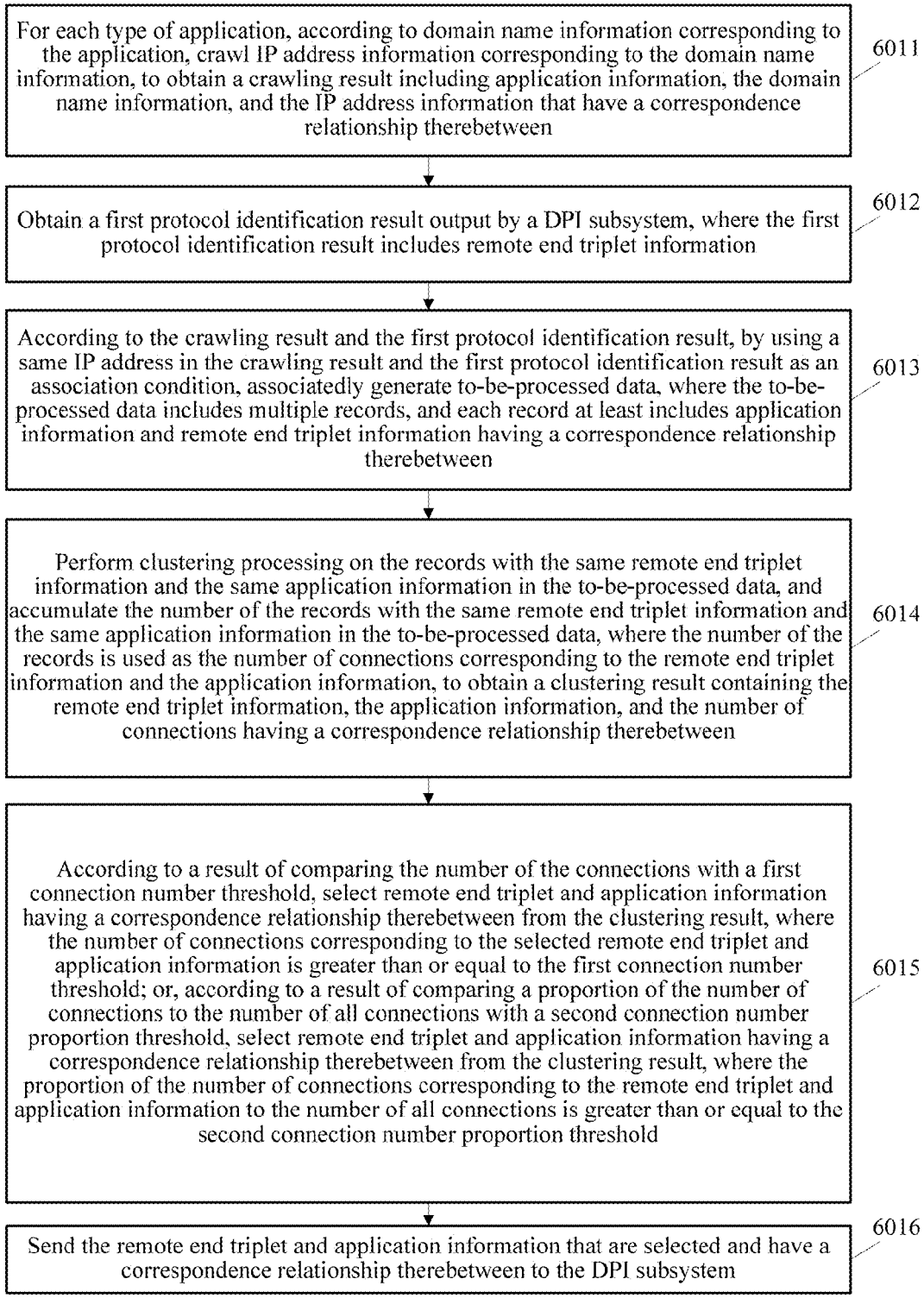
FIG. 6B is a schematic flow chart of another UBA-based data mining method provided by an embodiment of the present invention.

Referring to FIG. 6B, FIG. 6B is a schematic flow chart of another UBA-based data mining method provided by an embodiment of the present invention, the method may be applied to the UBA subsystem shown in FIG. 2 or 3 (that is, a UBA server), and as shown in FIG. 6B, the method may include the following steps.

S6011: For each type of application, according to domain name information corresponding to the application, crawl IP address information corresponding to the domain name information to obtain a crawling result including the application information, the domain name information, and the IP address information that have a correspondence relationship therebetween.

A crawling technology belongs to the prior art, and is not repeated herein.

S6012: Obtain a first protocol identification result output by a DPI subsystem, where the first protocol identification result includes the remote end triplet information.

Preferably, the first protocol identification result includes quintuple information and L7 protocol information.

It should be noted that, no execution order exists between S6011 and S6012.

S6013: According to the crawling result and the first protocol identification result, by using a same IP address in the crawling result and in the first protocol identification result as an association condition, associatedly generate to-be-processed data, where the to-be-processed data includes multiple records, and each record at least includes application information and remote end triplet information having a correspondence relationship therebetween.

Preferably, each record includes: a stream identifier, quintuple information, and application information that have a correspondence relationship therebetween.

S6014: Perform clustering processing on the records with the same remote end triplet information and the same application information in the to-be-processed data, and accumulate the number of the records with the same remote end triplet information and the same application information in the to-be-processed data, where the number of the records is used as the number of connections corresponding to the remote end triplet information and the application information, to obtain a clustering result including the remote end triplet information, the application information, and the number of connections having a correspondence relationship therebetween.

It should be understood that, if the first protocol identification result including the quintuple information is obtained in S6012, S6014 is specifically that: perform clustering processing on records with same remote end triplet information and same application information but with different client IP addresses and different client ports in the to-be-processed data, accumulate the number of the records with the same remote end triplet information and the same application information but with different client IP addresses and different client ports in the to-be-processed data, where the number of the records is used as the number of connections corresponding to the remote end triplet information and the application information, to obtain a clustering result including the remote end triplet information, the application information, and the number of connections having a correspondence relationship therebetween.

S6015: According to a result of comparing the number of the connections with a first connection number threshold, select remote end triplet information and application information having a correspondence relationship therebetween from the clustering result, where the number of connections corresponding to the selected remote end triplet information and application information is greater than or equal to the first connection number threshold; or, according to a result of comparing a proportion of the number of connections to the number of all connections with a second connection number proportion threshold, select remote end triplet information and application information having a correspondence relationship therebetween from the clustering result, where the proportion of the number of connections corresponding to the remote end triplet information and application information to the number of all connections is greater than or equal to the second connection number proportion threshold.

It should be noted that, the first connection number threshold and the second connection number proportion threshold herein may be flexibly set according to an actual application or an empirical value, for example, the first connection number threshold may be determined according to network size, and the values thereof are not limited herein. The second connection number proportion threshold may be, for example, 90% or in a range of 85%-90%, and in some application scenarios, the second connection number proportion threshold may also be set to more than 30%.

S6016: Send the remote end triplet information and application information that are selected and have a correspondence relationship therebetween to the DPI subsystem.

Figure 6C:
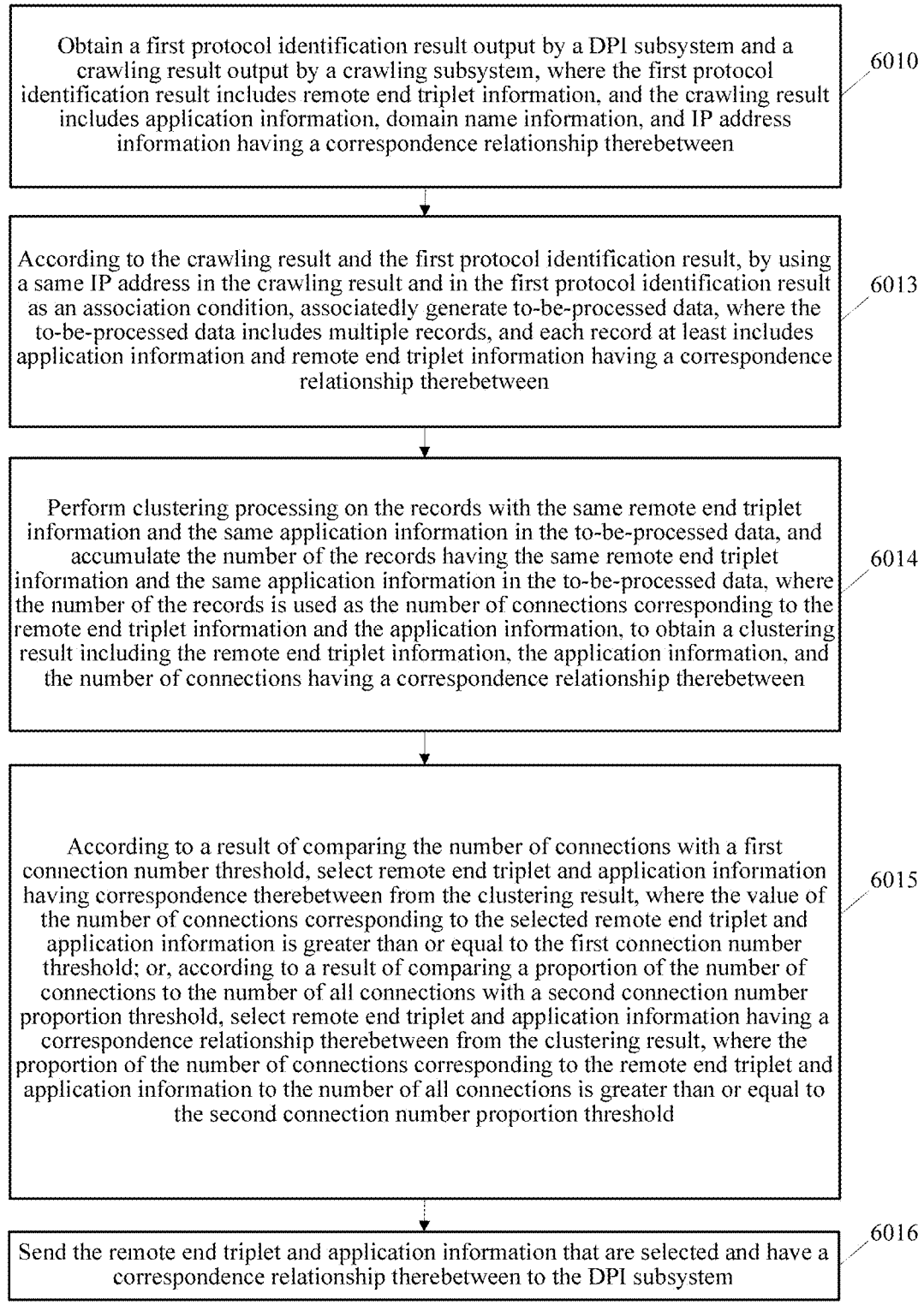
FIG. 6C is a schematic flow chart of another UBA-based data mining method provided by an embodiment of the present invention.

Referring to FIG. 6C, FIG. 6C is a schematic flow chart of another UBA-based data mining method provided by an embodiment of the present invention, the method may be applied to the UBA subsystem shown in FIG. 2 or 3 (that is, a UBA server), and as shown in FIG. 6C, a difference between this embodiment and the embodiment shown in FIG. 6B lies in that:

S6010 is used to replace S6011 and S6012, where at S6010 the UBA-based data mining method obtains a first protocol identification result output by a DPI subsystem and a crawling result output by a crawling subsystem, where the first protocol identification result includes the remote end triplet information, and the crawling result includes application information, the domain name information, and the IP address information having a correspondence relationship therebetween. The other steps are the same, and are therefore not repeated in this embodiment.

It should be noted that, the first protocol identification result and the crawling result herein may be stored by the DPI subsystem and the crawling subsystem, respectively, in a database, and may also be directly sent by the DPI subsystem and the crawling subsystem, respectively, to a UBA subsystem (that is, a UBA server). In other words, the first protocol identification result output by the DPI subsystem may be directly or indirectly transferred to the UBA subsystem, and in an indirect manner, that is, in an implementation manner, the DPI subsystem outputs the first protocol identification result to a database; similarly, the crawling result output by the crawling subsystem may be directly or indirectly transferred to the UBA subsystem, and in an indirect manner, that is, in an implementation manner, the crawling subsystem outputs the crawling result to a database.

Figure 6D:
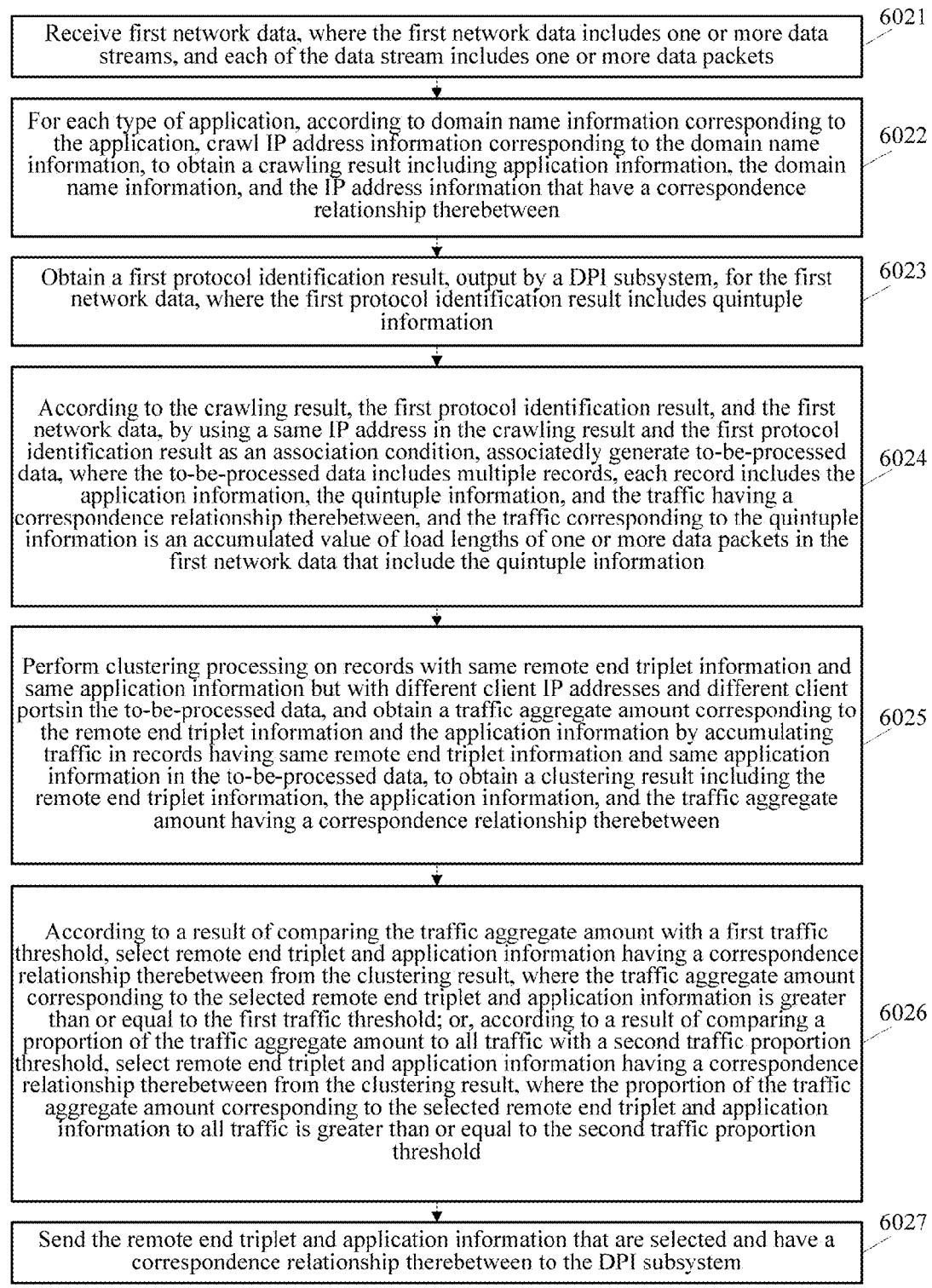
FIG. 6D is a schematic flow chart of another UBA-based data mining method provided by an embodiment of the present invention.

Referring to FIG. 6D, FIG. 6D is a schematic flow chart of another UBA-based data mining method provided by an embodiment of the present invention, the method may be applied to the UBA subsystem shown in FIG. 2 or 3 (that is, a UBA server), and as shown in FIG. 6D, the method may include the following steps.

S6021: Receive first network data, where the first network data includes one or more data streams, and each of the data streams includes one or more data packets.

S6022: For each type of application, according to domain name information corresponding to the application, crawl IP address information corresponding to the domain name information to obtain a crawling result including the application information, the domain name information, and the IP address information that have a correspondence relationship therebetween.

A crawling technology belongs to the prior art, and is not repeated herein.

S6023: Obtain a first protocol identification result, output by a DPI subsystem, for the first network data, where the first protocol identification result includes quintuple information.

Preferably, the first protocol identification result includes quintuple information and L7 protocol information.

It should be noted that, no execution order exists between S6021, S6022 and S6023.

S6024: According to the crawling result, the first protocol identification result, and the first network data, by using a same IP address in the crawling result and in the first protocol identification result as an association condition, associatedly generate to-be-processed data, where the to-be-processed data includes multiple records, each record includes the application information, the quintuple information, and the traffic having a correspondence relationship therebetween, and the traffic corresponding to the quintuple information is an accumulated value of load lengths of one or more data packets in the first network data that include the quintuple information.

Preferably, each record includes: a stream identifier, quintuple information, application information, and traffic that have a correspondence relationship therebetween.

S6025: Perform clustering processing on records with same remote end triplet information and same application information but with different client IP addresses and different client ports in the to-be-processed data, and obtain a traffic aggregate amount corresponding to the remote end triplet information and the application information by accumulating traffic in records with same remote end triplet information and same application information in the to-be-processed data, to obtain a clustering result including the remote end triplet information, the application information, and the traffic aggregate amount having a correspondence relationship therebetween.

S6026: According to a result of comparing the traffic aggregate amount with a first traffic threshold, select remote end triplet information and application information having a correspondence relationship therebetween from the clustering result, where the traffic aggregate amount corresponding to the selected remote end triplet information and application information is greater than or equal to the first traffic threshold; or, according to a result of comparing a proportion of the traffic aggregate amount to all traffic with a second traffic proportion threshold, select remote end triplet information and application information having a correspondence relationship therebetween from the clustering result, where the proportion of the traffic aggregate amount corresponding to the selected remote end triplet information and application information to all traffic is greater than or equal to the second traffic proportion threshold.

It should be noted that, the first traffic threshold and the second traffic proportion threshold herein may be flexibly set according to an actual application or an empirical value. For example, the first traffic threshold may be determined according to a type of an application. Different applications correspond to different first traffic thresholds. For example, the first traffic threshold corresponding to network videos is above G, and the first traffic threshold corresponding to mail is hundreds of megabytes (M), for example, 300M or in a range of 300M-500M. The second traffic proportion threshold may be, for example, 90% or in a range of 80%-90%, which is not limited by the present invention.

S6027: Send the remote end triplet information and application information that are selected and have correspondence relationship therebetween to the DPI subsystem.

Figure 6E:
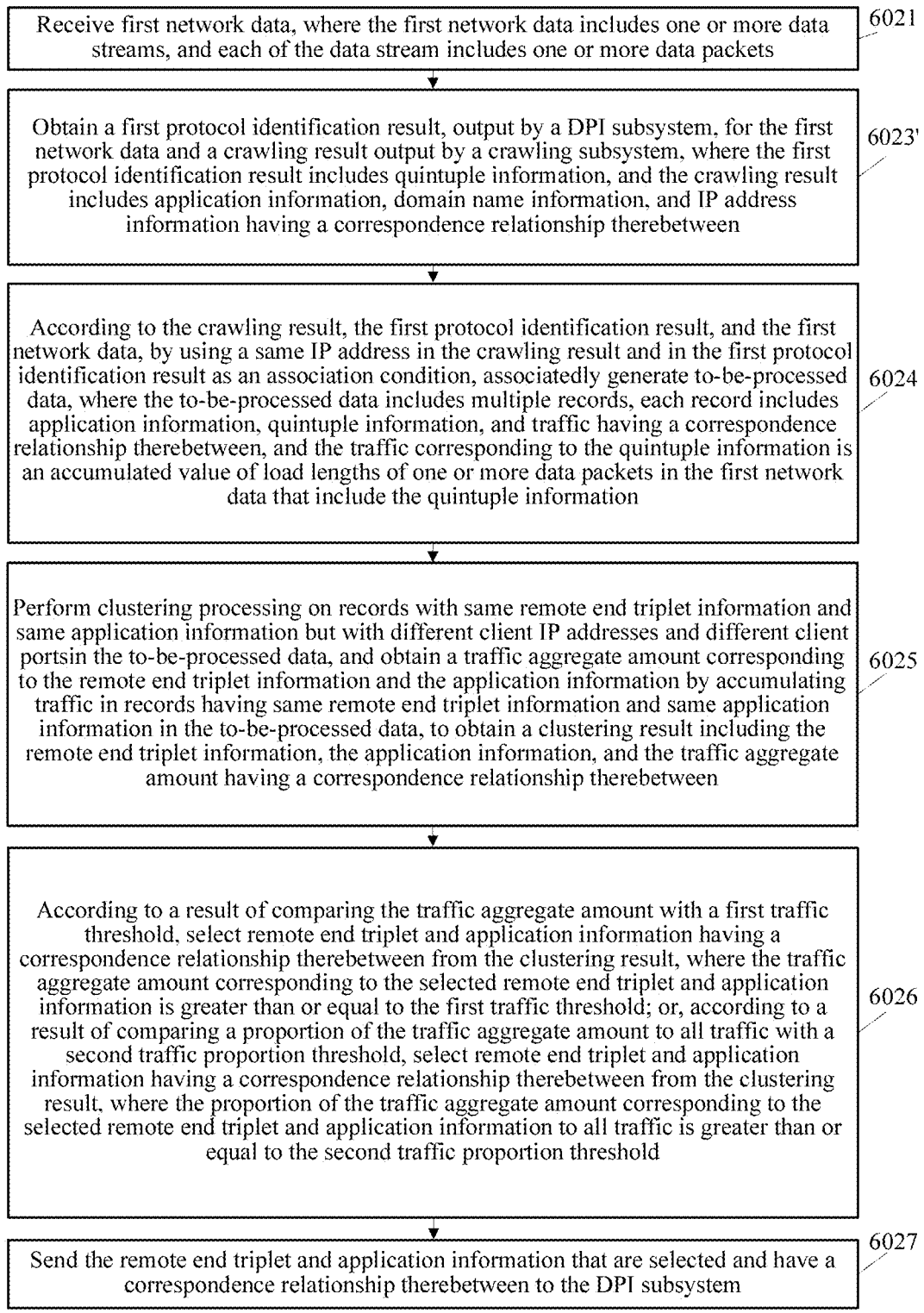
FIG. 6E is a schematic flow chart of another UBA-based data mining method provided by an embodiment of the present invention.

Referring to FIG. 6E, FIG. 6E is a schematic flow chart of another UBA-based data mining method provided by an embodiment of the present invention, the method may be applied to the UBA subsystem shown in FIG. 2 or 3 (that is, a UBA server), and as shown in FIG. 6E, a difference between this embodiment and the embodiment shown in FIG. 6D lies in that:

S6023' is used to replace S6022 and S6023, where:

S6023': Obtain a first protocol identification result, output by a DPI subsystem, for the first network data and a crawling result output by a crawling subsystem, where the first protocol identification result includes quintuple information, and the crawling result includes application information, domain name information, and IP address information having a correspondence relationship therebetween. The other steps are the same, and are therefore not repeated in this embodiment.

It should be noted that, the first protocol identification result and the crawling result herein may be stored by the DPI subsystem and the crawling subsystem respectively in a database, and may also be directly sent by the DPI subsystem and the crawling subsystem respectively to a UBA subsystem (that is, a UBA server). In other words, the first protocol identification result output by the DPI subsystem may be directly or indirectly transferred to the UBA subsystem, and in an indirect manner, that is, in an implementation manner, the DPI subsystem outputs the first protocol identification result to a database; similarly, the crawling result output by the crawling subsystem may be directly or indirectly transferred to the UBA subsystem, and in an indirect manner, that is, in an implementation manner, the crawling subsystem outputs the crawling result to a database.

Figure 7:
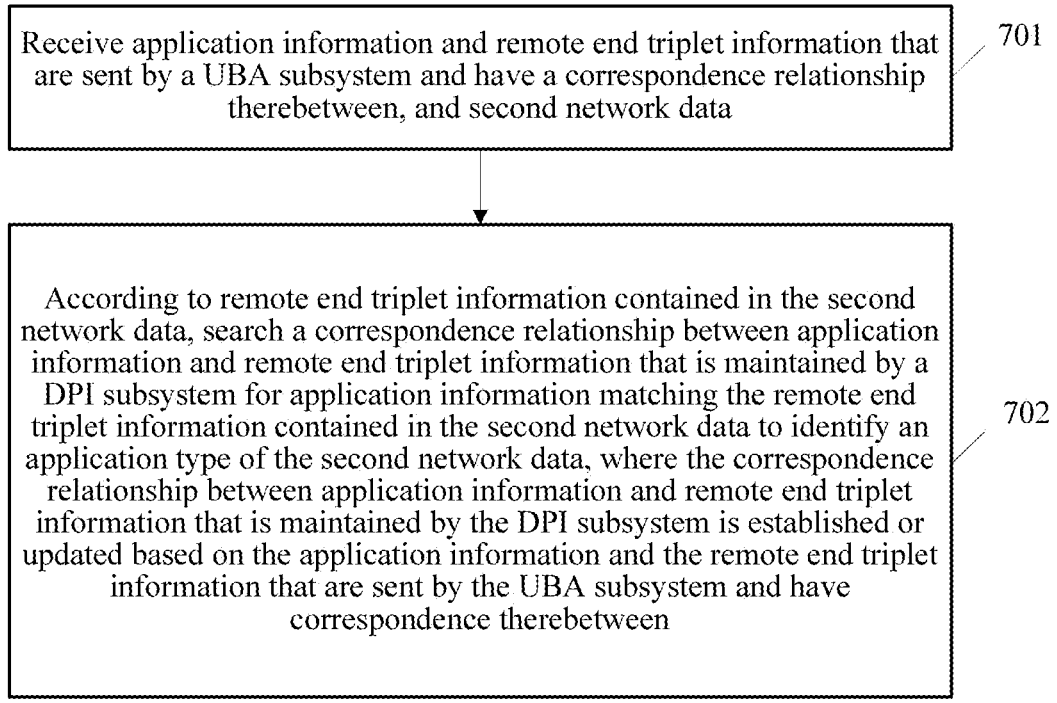
FIG. 7 is a schematic flow chart of an application identification method provided by an embodiment of the present invention.

Referring to FIG. 7, FIG. 7 is a schematic flow chart of an application identification method provided by an embodiment of the present invention. It should be noted that, the method may be applied to the DPI subsystem shown in FIG. 2 or 3. In an actual application, in an implementation manner, a DPI subsystem of the embodiment of the present invention may be an independent DPI server; in another implementation manner, the DPI subsystem may also be a network element device having a DPI function, and a product form thereof may be a router, a gateway device, an RNC, a GGSN, an SCG, or a PDSN, and so on. It should be understood that, the DPI subsystem supports independent external disposition, the DPI subsystem may be connected to an existing device, and may also be built in a network element device of an existing network through plugging or software integration. As shown in FIG. 7, the method may include the following steps:

S701: Receive application information and remote end triplet information that are sent by a UBA subsystem and have a correspondence relationship therebetween, and second network data, where the remote end triplet information includes a transmission protocol, a server IP address, and a server port.

S702: According to remote end triplet information contained in the second network data, search a correspondence relationship between application information and remote end triplet information that is maintained by a DPI subsystem for application information matching the remote end triplet information contained in the second network data to identify an application type of the second network data, where the correspondence relationship between application information and remote end triplet information that is maintained by the DPI subsystem is established or updated based on the application information and the remote end triplet information that are sent by the UBA subsystem and have a correspondence relationship therebetween.

Figure 8:
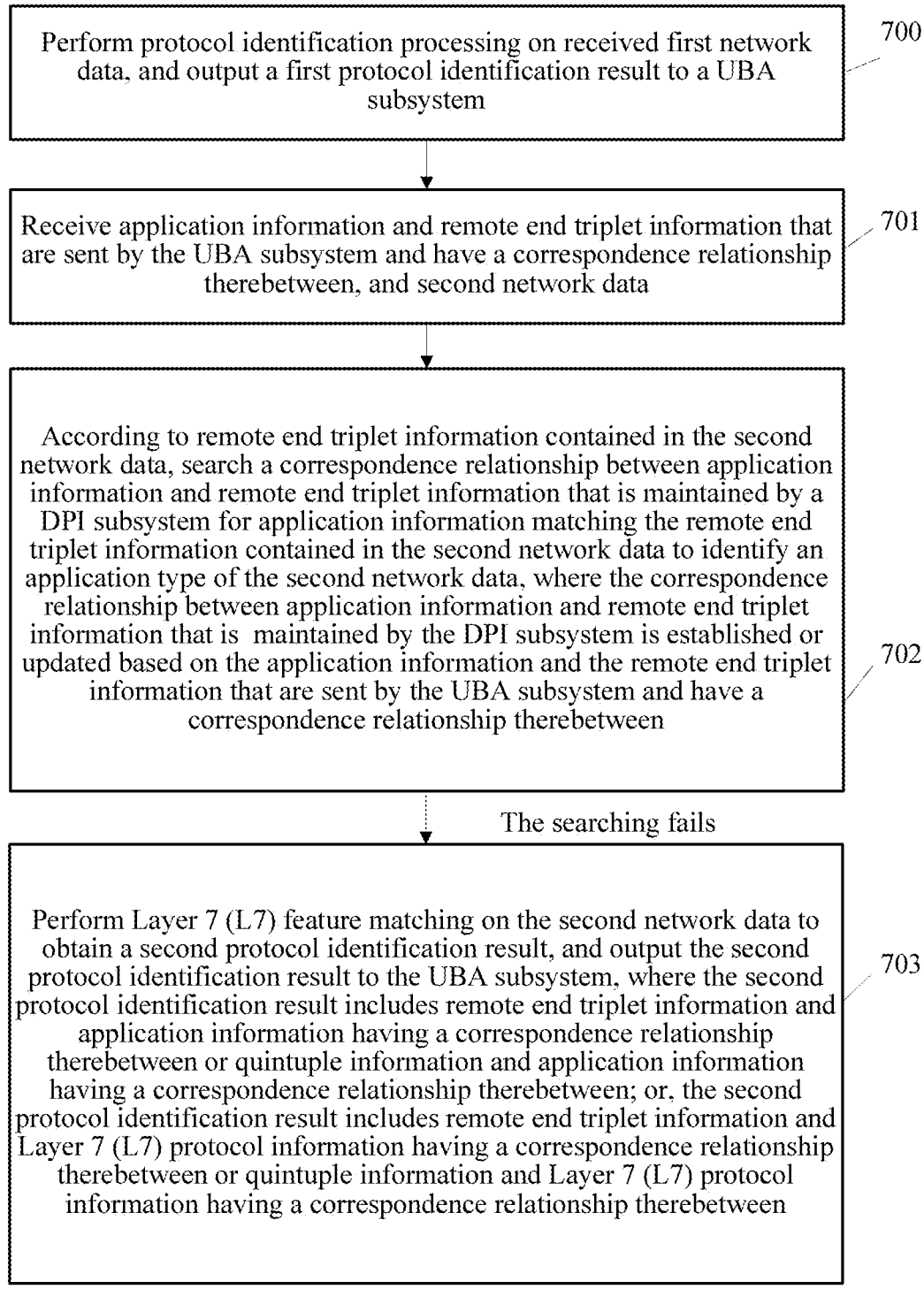
FIG. 8 is a schematic flow chart of another application identification method provided by an embodiment of the present invention.

Referring to FIG. 8, preferably, before S701, the method of the embodiment of the present invention further includes the following step:

S700: Perform protocol identification processing on received first network data, and output a first protocol identification result to the UBA subsystem, so that the UBA subsystem, according to a data source at least including the first protocol identification result, send remote end triplet information and application information having a correspondence relationship therebetween to the DPI subsystem, where the first protocol identification result includes the remote end triplet information, or the first protocol identification result includes quintuple information.

Preferably, the first protocol identification result includes quintuple information and L7 protocol information. It should be understood that, the protocol identification processing herein includes Layer 2 feature matching, Layer 3 feature matching, and simple L7 feature matching (such as: an IP address, a port, a transmission protocol, a TCP frame header, and a short substring of a fixed position).

It should be noted that, the DPI subsystem may directly or indirectly transfer the protocol identification result of the network data to the UBA subsystem, and the UBA subsystem obtains an application feature set meeting a condition by using methods such as data mining, clustering, and converging, and synchronizes the application feature set to the DPI subsystem. It should be understood that, this is a continuously cyclical process. That is, a protocol identification result of the received network data (especially a protocol identification result with no application information being identified) triggers the UBA subsystem to feed back an application feature set, and the application feature set can be used by the DPI subsystem to rapidly identify application information of subsequent network data.

It should be noted that, the first network data and the second network data herein may be different network data packets under a same network application, and may also be different network data packets under different network applications.

When the searching in S702 fails, the method of the embodiment of the present invention further includes the following step:

S703: Perform L7 feature matching on the second network data to obtain a second protocol identification result, and output the second protocol identification result to the UBA subsystem, where the second protocol identification result includes remote end triplet information and application information having a correspondence relationship therebetween or quintuple information and application information having a correspondence relationship therebetween; or, the second protocol identification result includes remote end triplet information and L7 protocol information having a correspondence relationship therebetween or quintuple information and L7 protocol information having a correspondence relationship therebetween.

Preferably, after S701, the method of the embodiment of the present invention further includes: according to the remote end triplet information and the application information that are sent by the UBA subsystem and have correspondence relationship therebetween, establishing or updating the correspondence relationship between the application information and the remote end triplet information that is maintained by the DPI subsystem, and storing the established or updated correspondence between the application information and the remote end triplet information, or storing the remote end triplet information and the application information that are sent by the UBA subsystem and have correspondence relationship therebetween.

It should be understood that, for the latter situation after the "or", generally, when a signature database maintained by the DPI subsystem is empty, after the remote end triplet information and the application information that are sent by the UBA subsystem and have correspondence relationship therebetween are received, the remote end triplet information and the application information that are sent by the UBA subsystem and have correspondence relationship therebetween are directly stored.

It can be seen that, in the application identification method provided by the embodiment of the present invention, after the UBA subsystem sends/synchronizes the remote end triplet information and application information having a correspondence relationship therebetween to the DPI subsystem, a data mining analysis result of the UBA subsystem is synchronously transmitted to the DPI subsystem, in other words, the UBA subsystem feeds back the data mining analysis result of the UBA subsystem to the DPI subsystem, that is, the correspondence relationship between the application information and the remote end triplet information that is maintained by the DPI subsystem is established or updated based on the application information and the remote end triplet information that are sent by the UBA subsystem; therefore, when receiving second network data, the DPI subsystem may rapidly, according to remote end triplet information contained in the second network data, search the correspondence between the application information and the remote end triplet information for the application information matching the remote end triplet information contained in the second network data, so as to greatly improve DPI-based identification performance and an application identification rate, especially dramatically improve an application identification rate of an encryption protocol, and dramatically improve an application identification rate of bearing protocols.

Further, the DPI subsystem performs protocol identification processing on the received first network data, and directly or indirectly outputs a first protocol identification result to the UBA subsystem; the UBA subsystem obtains to-be-processed data, where the to-be-processed data includes multiple records, each record at least includes application information and remote end triplet information having a correspondence relationship therebetween, and the to-be-processed data is generated according to a data source at least including the first protocol identification result; so that the input or output of the DPI subsystem and the input or output of the UBA subsystem can be transformed into each other to some extent.

result to a UBA server 55. In this embodiment, the protocol identification result herein is shown in Table A, and the protocol identification result includes a stream ID, quintuple information, and L7 protocol information.

TABLE A

| Stream ID | Source IP | Destination IP (server IP) | Source port | Destination port (server port) | Transmission protocol name | Identification result (Layer 7 (L7) protocol name) |
|---|---|---|---|---|---|---|
| 0 | 192.168.0.250 | 74.125.71.17 | 39677 | 443 | TCP | HTTPS |
| 1 | 192.168.0.250 | 202.96.134.133 | 1047 | 53 | UDP | DNS |
| 2 | 192.168.0.250 | 74.125.71.18 | 1045 | 443 | TCP | HTTPS |
| 3 | 192.168.0.250 | 202.96.134.133 | 1043 | 53 | UDP | DNS |
| 4 | 192.168.0.250 | 74.125.71.19 | 1041 | 443 | TCP | HTTPS |
| 5 | 192.168.0.250 | 202.96.134.133 | 1039 | 53 | UDP | DNS |
| 6 | 192.168.0.250 | 74.125.71.19 | 1041 | 443 | TCP | HTTPS |
| 7 | 192.168.0.250 | 202.96.134.133 | 1035 | 53 | UDP | DNS |
| 8 | 192.168.0.250 | 74.125.71.17 | 1033 | 443 | TCP | HTTPS |
| 9 | 192.168.0.250 | 74.125.71.17 | 1031 | 443 | TCP | HTTPS |
| 10 | 192.168.0.250 | 202.96.134.133 | 1029 | 53 | UDP | DNS |
| 11 | 192.168.0.250 | 74.125.71.17 | 1027 | 443 | TCP | HTTPS |
| 12 | 192.168.0.250 | 74.125.71.17 | 1025 | 443 | TCP | HTTPS |
| 13 | 192.168.0.250 | 202.96.134.133 | 1023 | 53 | UDP | DNS |
| 14 | 192.168.0.250 | 74.125.71.83 | 1021 | 443 | TCP | Gmail_SSL |
| 15 | 192.168.0.250 | 74.125.71.125 | 1026 | 80 | TCP | HTTP |

Further, in the communications system provided by the embodiment of the present invention, the UBA subsystem feeds back the data mining analysis result of the UBA subsystem to the DPI subsystem, that is, the correspondence relationship between the application information and the remote end triplet information that is maintained by the DPI subsystem is established or updated based on the application information and the remote end triplet information that are sent by the UBA subsystem and have correspondence relationship therebetween, so as to solve the problems in the prior art that fixed configurations incur maintenance costs and cannot adapt to changes, thereby realizing adaptive update or maintenance of the correspondence between the application information and the remote end triplet information, resulting in reduction in maintenance work.

That an operator performs accounting on video traffic by using the method of the embodiment of the present invention is introduced below in detail with reference to an actual application in which a user uses a browser through a user terminal to access an online video service provider website to view a video clip. Description is provided below for the scenario.

Figure 9:
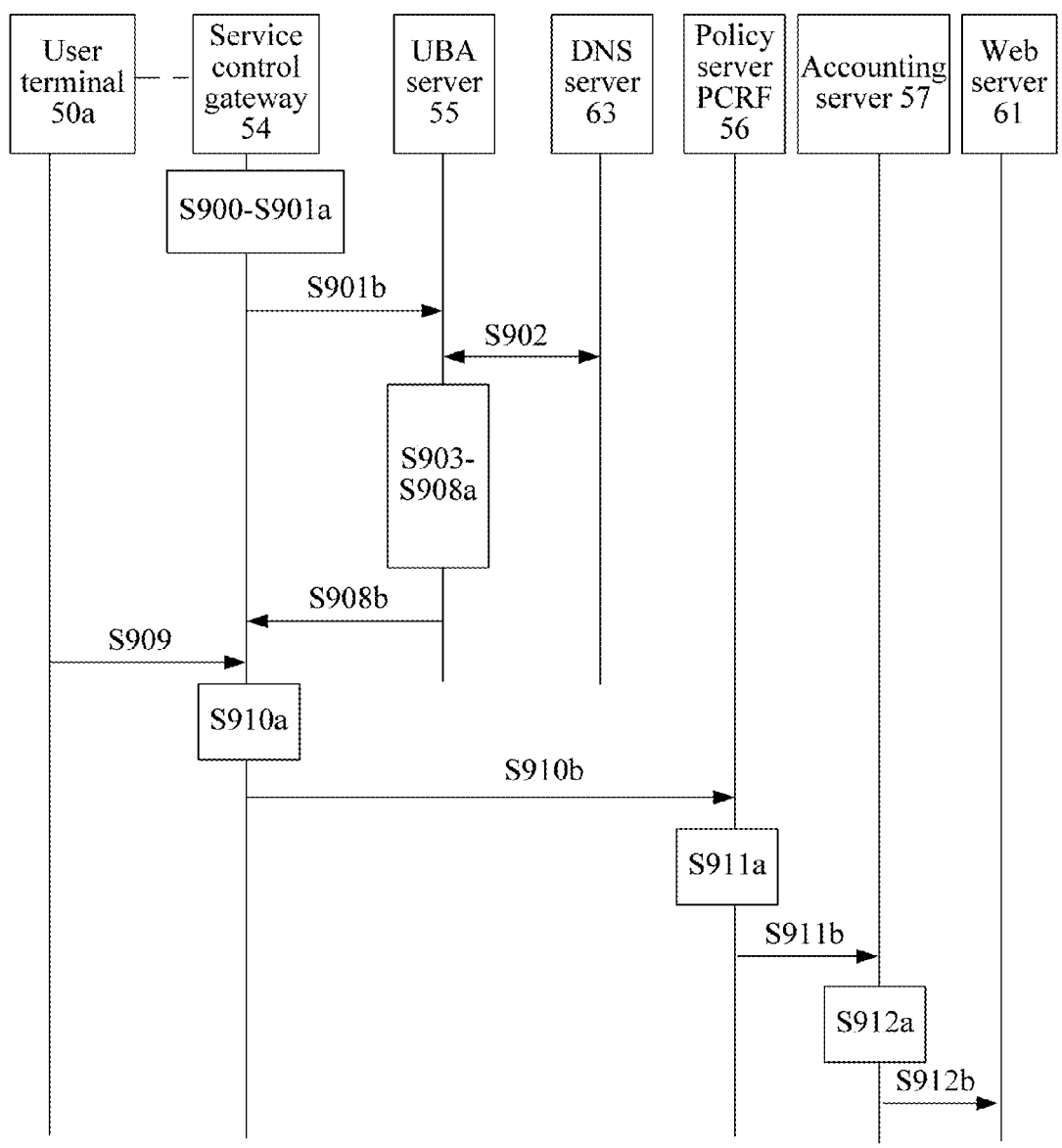
FIG. 9 is a schematic flow chart of another UBA-based data mining method according to an embodiment of the present invention.

Referring to FIG. 9, FIG. 9 is a schematic flow chart of another UBA-based data mining method according to an embodiment of the present invention, which is applied in a network environment shown in FIG. 5, and as shown in FIG. 9, the method includes the following steps:

S900: In the initial state, in which correspondence (called a DPI application association table for short), between application information and remote end triplet information that is maintained by a service control gateway 54 is empty, configure a destination domain name list (such as mail.google.com and t.sina.com). The service control gateway 54 herein is provided with a DPI subsystem of the present invention.

S901a-S901b: After network data enters the service control gateway 54 (the service control gateway 54 is provided with the DPI subsystem), the service control gateway 54 performs protocol identification processing on the network data, and outputs a corresponding protocol identification S902: The UBA server 55 interacts with a crawling server group 60-63.

For each type of application, according to a configured domain name list of the application, a corresponding IP address list is crawled to obtain a crawling result including application information, domain name information, and IP address information having a correspondence relationship therebetween (for example, each application corresponds to a list, as show in Table B). It should be understood that S901 and S902 may be executed in parallel or in sequence.

For example, the UBA server 55 may interact with a DNS server 63 in the following two manners:

1) active manner—interaction is performed through a DNS protocol; and 2) passive manner—a DNS packet is intercepted in a network, and parsing is performed to obtain a relationship table of domain name and IP, which is of the prior art and is not repeated herein.

TABLE B (the first four columns are given in advance)

| Application | Domain name | Transmission protocol | Application port | IP |
|---|---|---|---|---|
| GMAIL | MAIL.GOOGLE.COM | | | 74.125.71.17 |
| | | | | 74.125.71.18 |
| | | | | 74.125.71.19 |
| | | | | 74.125.71.83 |

S903: The UBA server 55 uses the server IP address of Table A and Table B as a foreign key to associate the two tables to create Table C. The IP in the record with the stream ID being 14 in Table A is 74.125.71.83, and matches the IP address in the GMAIL item in Table B, and an identification result in Table A is GMAIL_SSL and is also consistent with the GMAIL in Table B, so that the transmission protocol and the port in Table A are used to fill Table B to obtain Table C, which schematically is:

TABLE C

| Application | Domain name | Transmission protocol | Application port | IP |
|---|---|---|---|---|
| GMAIL | MAIL.GOOGLE.COM | TCP | 443 | 74.125.71.17 |
| | | | | 74.125.71.18 |
| | | | | 74.125.71.19 |
| | | | | 74.125.71.83 |

S904: The UBA server 55 matches a remote end triplet in Table A according to Table C; if a remote end triplet matches, fills Table A with an application name from Table C, accumulates load lengths of all data packets of a same stream, and fills a traffic field with an accumulation result, to create table E. It should be understood that, quintuple information is used to identify a stream, and in other words, is used to identify a connection. At this point, classification is completed.

TABLE E

| Stream ID | Source IP | Destination IP | Source port | Destination port | Transmission protocol name | Identification result | Traffic |
|---|---|---|---|---|---|---|---|
| 0 | 192.168.0.250 | 74.125.71.17 | 39677 | 443 | TCP | Gmail_SSL | 94562 |
| 1 | 192.168.0.250 | 202.96.134.133 | 1047 | 53 | UDP | DNS | 46 |
| 2 | 192.168.0.250 | 74.125.71.18 | 1045 | 443 | TCP | Gmail_SSL | 945 |
| 3 | 192.168.0.250 | 202.96.134.133 | 1043 | 53 | UDP | DNS | 46 |
| 4 | 192.168.0.250 | 74.125.71.19 | 1041 | 443 | TCP | Gmail_SSL | 7815 |
| 5 | 192.168.0.250 | 202.96.134.133 | 1039 | 53 | UDP | DNS | 46 |
| 6 | 192.168.0.250 | 74.125.71.19 | 1037 | 443 | TCP | Gmail_SSL | 17653 |
| 7 | 192.168.0.250 | 202.96.134.133 | 1035 | 53 | UDP | DNS | 46 |
| 8 | 192.168.0.250 | 74.125.71.17 | 1033 | 443 | TCP | Gmail_SSL | 18645 |
| 9 | 192.168.0.250 | 74.125.71.17 | 1031 | 443 | TCP | Gmail_SSL | 15664 |
| 10 | 192.168.0.250 | 202.96.134.133 | 1029 | 53 | UDP | DNS | 46 |
| 11 | 192.168.0.250 | 74.125.71.17 | 1027 | 443 | TCP | Gmail_SSL | 65465 |
| 12 | 192.168.0.250 | 74.125.71.17 | 1025 | 443 | TCP | Gmail_SSL | 4582 |
| 13 | 192.168.0.250 | 202.96.134.133 | 1023 | 53 | UDP | DNS | 46 |
| 14 | 192.168.0.250 | 74.125.71.83 | 1021 | 443 | TCP | Gmail_SSL | 3567 |
| 15 | 192.168.0.250 | 74.125.71.125 | 1026 | 80 | TCP | HTTP | 2164 |

S905: The UBA server 55 performs clustering on Table E according to the transmission protocol, the server IP address, and the server port, and makes statistics on a traffic aggregate amount under each set of the transmission protocol, the server IP address, and the server port, to create Table F1, where Table F1 includes: a destination IP, a destination port, a transmission protocol, an application protocol type (that is, an identification result in the following table), and a traffic aggregate amount having a correspondence relationship therebetween. It should be noted that, an example of the service load amount is a traffic aggregate amount, and herein the traffic aggregate amount under each set of the transmission protocol, the destination IP, and the destination port may be understood as a traffic aggregate amount under each set of the transmission protocol, a server IP address, and a server port.

Preferably, Table F1 is sorted according to a traffic aggregate amount field in descending order.

TABLE F1

| Destination IP | Destination port | Transmission protocol name | Identification result (application protocol type) | Traffic aggregate amount |
|---|---|---|---|---|
| 74.125.71.17 aggregate | 443 | TCP | GMAIL_SSL | 198918 |
| 74.125.71.19 aggregate | 443 | TCP | GMAIL_SSL | 25468 |
| 74.125.71.83 aggregate | 443 | TCP | GMAIL_SSL | 3567 |
| 74.125.71.125 aggregate | 80 | TCP | HTTP | 2164 |
| 74.125.71.18 aggregate | 443 | TCP | GMAIL_SSL | 945 |

TABLE F1-continued

| Destination IP | Destination port | Transmission protocol name | Identification result (application protocol type) | Traffic aggregate amount |
|---|---|---|---|---|
| 202.96.134.133 aggregate | 53 | UDP | DNS | 276 |

S906: The UBA server 55 makes statistics on a traffic percentage according to data in the column of the traffic aggregate amount in Table F1, and preferably makes statics on a cumulative traffic percentage, and the process is repeated to create Table G1, where the traffic percentage herein is a proportion of the traffic aggregate amount to all traffic.

TABLE G1

| Destination IP | Destination port | Transmission protocol name | Identification result | Traffic aggregate amount | Traffic percentage | Cumulative traffic percentage |
|---|---|---|---|---|---|---|
| 74.125.71.17 aggregate | 443 | TCP | GMAIL_SSL | 198918 | 85.99% | 85.99% |
| 74.125.71.19 aggregate | 443 | TCP | GMAIL_SSL | 25468 | 11.01% | 96.99% |
| 74.125.71.83 aggregate | 443 | TCP | GMAIL_SSL | 3567 | 1.54% | 98.54% |
| 74.125.71.125 aggregate | 80 | TCP | HTTP | 2164 | 0.94% | 99.47% |
| 74.125.71.18 aggregate | 443 | TCP | GMAIL_SSL | 945 | 0.41% | 99.88% |

TABLE G1-continued

| Destination IP | Destination port | Transmission protocol name | Identification result | Traffic aggregate amount | Traffic percentage | Cumulative traffic percentage |
|---|---|---|---|---|---|---|
| 202.96.134.133 | 53 | UDP | DNS | 276 | 0.12% | 100.00% |
| aggregate | | | | | | |

S907: A second traffic proportion threshold is set to 80%, data in the column of the traffic percentage is compared with the second traffic proportion threshold, and remote end triplet information and application information in a record, where the value in the column of the traffic percentage is greater than or equal to the second traffic proportion threshold, is selected from Table G1. In this embodiment, the traffic percentage, corresponding to the selected remote end triplet information and application information, in a first row of data in Table G1 is 85.99% and is greater than or equal to the second traffic proportion threshold being 80%.

Alternatively, in another implementation manner, if step S906 is a step of making statistics on the cumulative traffic percentage, the second traffic proportion threshold is set to 90%, and data in the column of the traffic aggregate amount in Table F1 or Table G1 is sorted in descending order, the data in the column of the cumulative traffic percentage is compared with the second traffic proportion threshold, and remote end triplet information and application information having a correspondence relationship therebetween in a record, where the data in the column of the cumulative traffic percentage is greater than or equal to the second traffic proportion threshold, is selected from Table G1, where the cumulative traffic percentage in the record, where the selected remote end triplet information and application information having a correspondence relationship therebetween are located, is greater than or equal to a smallest value among all values of the cumulative traffic percentage greater than or equal to the second traffic proportion threshold.

Preferably, in this embodiment, the data in the column of the traffic aggregate amount in Table F1 or Table G1 is sorted in descending order, objects in the column of the cumulative traffic percentage in Table G1 are compared with the second traffic proportion threshold in a from-top-to-bottom direction until a first object that is in the column of the cumulative traffic percentage and is greater than or equal to 90% is found (that is, the second row of data in this embodiment, that is, 96.99%), statistics are made until when the cumulative traffic percentage is greater than or equal to 90%, the number of compared objects (that is, the first and second rows) is found, so as to obtain a convergence weight being 2. Specifically, if Table F1 is sorted in descending order according to the traffic aggregate amount field, a direction for comparison is from top to bottom; if the Table F1 is sorted in ascending order according to the traffic aggregate amount field, the direction for comparison is from bottom to top.

Further, a convergence threshold is set to 5, and the UBA server 55 checks the convergence weight, which includes: determining whether the convergence weight is smaller than or equal to the convergence threshold, and when the convergence weight is smaller than or equal to the convergence threshold, allowing information shown in following Table H1 to be sent or synchronized to the service control gateway 54. It should be understood that, the step of checking the convergence weight is optional, and the step may also be saved.

S908a-S908b: The UBA server 55 outputs or synchronizes remote end triplet information and application information, which are shown in following Table H1 and have correspondence relationship therebetween, to the service control gateway 54, so that the service control gateway 54, based on the remote end triplet information and the application information that are synchronized by the UBA server 55 and have correspondence relationship therebetween, establishes or updates locally maintained correspondence between the application information and the remote end triplet information.

TABLE H1

| Destination IP | Destination port | Transmission protocol | Application name |
|---|---|---|---|
| 74.125.71.17 | 443 | TCP | GMAIL |
| 74.125.71.19 | 443 | TCP | GMAIL |

S909: When the authentication of user terminals 50a-50b used by a user is passed, and the user terminals 50a-50b access a radio access network, network data initiated by the user terminals 50a-50b passes through the base station 51 and a base station controller RNC 52 and reaches a GGSN 53, and the GGSN 53 routes the network data to the service control gateway 54.

S910a-S910b: The service control gateway 54, according to remote end triplet information contained in the network data, searches the locally maintained correspondence between the application information and the remote end triplet information for application information matching the remote end triplet information contained in the network data; if it is found successfully, sends the matching application information to a policy server PCRF 56. It should be noted that, in this embodiment, according to the application information, it can be learned that the user is watching a video.

S911a-S911b: The policy server PCRF 56, according to the transmitted application information, learns that the user is watching a video; according to a subscription profile found in a SPR database 58 and registered by a user terminal 50a/50b to an operator network, determines that accounting needs to be performed on incurred video traffic, and then sends accounting information to the accounting server 57 to perform accounting processing.

S912a-S912b: After determining to start accounting, the accounting server 57 forwards network data (for example, a video access request) to a server of a service provider website, for example, a web server 61.

In the above embodiment, the traffic aggregate amount is used as the example to describe the whole processing process in detail. In a situation in which the service load amount is the number of connections, persons skilled in the art may make reference to the principle and details in the above embodiment for implementation. For different implementation contents, for example, using following Table F2 to replace Table F1 in the embodiment shown in FIG. 9, using following Table G2 to replace Table G1 in the embodiment shown in FIG. 9, and using following Table H2 to replace Table H1 in the embodiment shown in FIG. 9, most contents are the same or similar, and are therefore not repeated herein.

TABLE F2

| Destination IP | Destination port | Transmission protocol name | Identification result (application protocol type) | The number of connections |
|---|---|---|---|---|
| 74.125.71.17 aggregate | 443 | TCP | Gmail_SSL | 5 |
| 202.96.134.133 aggregate | 53 | UDP | DNS | 6 |
| 74.125.71.18 aggregate | 443 | TCP | Gmail_SSL | 1 |
| 74.125.71.19 aggregate | 443 | TCP | Gmail_SSL | 2 |
| 74.125.71.83 aggregate | 443 | TCP | Gmail_SSL | 1 |
| 74.125.71.125 aggregate | 80 | TCP | HTTP | 1 |

TABLE G2

| Destination IP | Destination port | Transmission protocol name | Identification result (application protocol type) | The number of connections | The-number-of-connections Connection number percentage | The-number-of-connections Connection number cumulative percentage |
|---|---|---|---|---|---|---|
| 74.125.71.17 aggregate | 443 | TCP | Gmail_SSL | 5 | 31.25% | 31.25% |
| 202.96.134.133 aggregate | 53 | UDP | DNS | 6 | 37.5% | 68.75% |
| 74.125.71.18 aggregate | 443 | TCP | Gmail_SSL | 1 | 6.25% | 75% |
| 74.125.71.19 aggregate | 443 | TCP | Gmail_SSL | 2 | 12.5% | 87.5% |
| 74.125.71.83 aggregate | 443 | TCP | Gmail_SSL | 1 | 6.25% | 93.75 |
| 74.125.71.125 aggregate | 80 | TCP | HTTP | 1 | 6.25% | 100% |

TABLE H2

| Destination IP | Destination port | Transmission protocol | Application name |
|---|---|---|---|
| 74.125.71.17 | 443 | TCP | Gmail_SSL |
| 202.96.134.133 | 53 | UDP | DNS |

Embodiments of the present invention further provide a related device and system.

Figure 10:
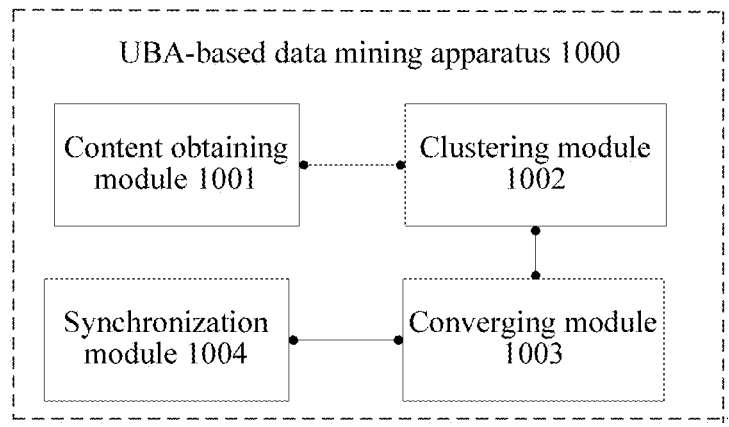
FIG. 10 is a schematic structural diagram of a UBA-based data mining apparatus provided by an embodiment of the present invention.

Referring to FIG. 10, an embodiment of the present invention provides a UBA-based data mining apparatus 1000, which may include: a content obtaining module 1001, a clustering module 1002, a converging module 1003, and a synchronization module 1004.

The content obtaining module 1001 is configured to obtain to-be-processed data, where the to-be-processed data includes multiple records, each record includes application information and remote end triplet information having a correspondence relationship therebetween, the remote end triplet information includes a transmission protocol, a server IP address, and a server port; preferably, each record includes application information and quintuple information having a correspondence relationship therebetween, and the quintuple information herein includes a client IP address, a client port, the transmission protocol, the server IP address, and the server port.

The clustering module 1002 is connected to the content obtaining module 1001, and is configured to perform clustering processing on records with same remote end triplet information and same application information in the to-be-processed data, and according to the records with the same remote end triplet information and the same application information in the to-be-processed data, calculate a service load amount corresponding to the remote end triplet information and the application information to obtain a clustering result including the remote end triplet information, the application information, and the service load amount that have a correspondence relationship therebetween.

The service load amount herein includes, but not limited to, any one or combination of a traffic aggregate amount and the number of connections. The traffic aggregate amount herein refers to an aggregate amount of traffic of network data transmitted on each connection of the connections, and in other words, the quintuple information can uniquely identify a connection. The number of connections herein in the present invention indicates the number of connections with same remote end triplet information in the quintuple information.

The converging module 1003 is connected to the clustering module 1002, and is configured to, according to the service load amount or a proportion of the service load amount, select remote end triplet information and application information that have high reliability and have correspondence relationship therebetween from the clustering result.

In an implementation manner, the converging module 1003 is specifically configured to, according to a result of comparing the service load amount with a first threshold, select remote end triplet information and application information having a correspondence relationship therebetween from the clustering result, where the service load amount corresponding to the selected remote end triplet information and application information is greater than or equal to the first threshold; or, according to a result of comparing the proportion of the service load amount with a second threshold, select remote end triplet information and application information having a correspondence relationship therebetween from the clustering result, where the proportion of the service load amount corresponding to the selected remote end triplet information and application information is greater than or equal to the second threshold. It should be noted that, the first threshold and the second threshold herein may be flexibly set according to an actual application or an empirical value, which is not limited in the embodiment of the present invention.

The synchronization module 1004 is connected to the converging module 1003, and is configured to send the remote end triplet information and application information that have high reliability and have correspondence relationship therebetween to a DPI subsystem.

In a situation in which the service load amount is the number of connections, in an implementation manner, the content obtaining module 1001 is specifically configured to: for each type of application, according to domain name information corresponding to the application, crawl IP address information corresponding to the domain name information to obtain a crawling result including the application information, the domain name information, and the IP address information that have a correspondence relationship therebetween; obtain a first protocol identification result output by the DPI subsystem, where the first protocol identification result includes the remote end triplet information; according to the crawling result and the first protocol identification result, by using a same IP address in the crawling result and in the first protocol identification result as an association condition, associatedly generate the to-be-processed data, where the to-be-processed data includes multiple records, and each record includes application information and remote end triplet information having a correspondence relationship therebetween.

In another implementation manner, the content obtaining module 1001 is specifically configured to: obtain a first protocol identification result output by the DPI subsystem and a crawling result output by a crawling subsystem, where the first protocol identification result includes the remote end triplet information, the crawling result includes application information, domain name information, and IP address information having a correspondence relationship therebetween; according to the crawling result and the first protocol identification result, by using a same IP address in the crawling result and in the first protocol identification result as an association condition, associatedly generate the to-be-processed data, where the to-be-processed data includes multiple records, and each record includes application information and remote end triplet information having a correspondence relationship therebetween.

Correspondingly, the clustering module 1002 is specifically configured to perform clustering processing on records with same remote end triplet information and same application information in the to-be-processed data, and accumulate the number of the records with the same remote end triplet information and the same application information in the to-be-processed data, where the number of the records is used as the number of connections corresponding to the remote end triplet information and the application information, to obtain a clustering result including the remote end triplet information, the application information, and the number of connections having a correspondence relationship therebetween.

Correspondingly, the converging module 1003 is specifically configured to, according to a result of comparing the number of the connections with a first connection number threshold, select remote end triplet information and application information having a correspondence relationship therebetween from the clustering result, where the number of connections corresponding to the selected remote end triplet information and application information is greater than or equal to the first connection number threshold; or, according to a result of comparing a proportion of the number of connections to the number of all connections with a second connection number proportion threshold, select remote end triplet information and application information having a correspondence relationship therebetween from the clustering result, where the proportion of the number of connections corresponding to the remote end triplet information and application information to the number of all connections is greater than or equal to the second connection number proportion threshold.

It should be noted that, the first connection number threshold and the second connection number proportion threshold herein may be flexibly set according to an actual application or an empirical value, for example, the first connection number threshold may be determined according to network size, and the values thereof are not limited herein. The second connection number proportion threshold may be, for example, 90% or in a range of 85%-90%, and in some application scenarios, the second connection number proportion threshold may also be set to more than 30%.

In a situation in which the service load amount is the traffic aggregate amount, each record in the to-be-processed data may further include: a client IP address, a client port, and traffic that corresponds to the application information and the quintuple information, and the client IP address, the client port, and the remote end triplet information form the quintuple information. Correspondingly, in an implementation manner, the content obtaining module 1001 is specifically configured to: receive first network data, where the first network data includes one or more data streams, and each of the data streams includes one or more data packets; for each type of application, according to domain name information corresponding to the application, crawl IP address information corresponding to the domain name information to obtain a crawling result including the application information, the domain name information, and the IP address information that have a correspondence relationship therebetween; obtain a first protocol identification result, output by the DPI subsystem, for the first network data, where the first protocol identification result includes quintuple information; according to the crawling result, the first protocol identification result, and the first network data, by using a same IP address in the crawling result and in the first protocol identification result as an association condition, associatedly generate the to-be-processed data, where the to-be-processed data includes multiple records, each record includes the application information, the quintuple information, and the traffic having a correspondence relationship therebetween, and the traffic corresponding to the quintuple information is an accumulated value of load lengths of one or more data packets in the first network data that include the quintuple information.

In another implementation manner, the content obtaining module 1001 is specifically configured to: receive first network data, where the first network data includes one or more data streams, and each of the data streams includes one or more data packets; obtain a crawling result output by a crawling subsystem and a first protocol identification result that is output by the DPI subsystem for the first network data, where the first protocol identification result includes quintuple information, and the crawling result includes application information, domain name information, and IP address information having a correspondence relationship therebetween; according to the crawling result, the first protocol identification result, and the first network data, by using a same IP address in the crawling result and in the first protocol identification result as an association condition, associatedly generate the associatedly generate, where the to-be-processed data includes multiple records, each record includes the application information, the quintuple information, and the traffic having a correspondence relationship therebetween, and the traffic corresponding to the quintuple information is an accumulated value of load lengths of one or more data packets in the first network data that include the quintuple information.

Corresponding, the clustering module 1002 is specifically configured to perform clustering processing on records with same remote end triplet information and same application information but with different client IP addresses and different client ports in the to-be-processed data, and obtain a traffic aggregate amount corresponding to the remote end triplet information and the application information by accumulating traffic in records with same remote end triplet information and same application information in the to-be-processed data, to obtain a clustering result including the remote end triplet information, the application information, and the traffic aggregate amount having a correspondence relationship therebetween.

Corresponding, the converging module 1003 is specifically configured to, according to a result of comparing the traffic aggregate amount with a first traffic threshold, select remote end triplet information and application information having a correspondence relationship therebetween from the clustering result, where the traffic aggregate amount corresponding to the selected remote end triplet information and application information is greater than or equal to the first traffic threshold; or, according to a result of comparing a proportion of the traffic aggregate amount to all traffic with a second traffic proportion threshold, select remote end triplet information and application information having a correspondence relationship therebetween from the clustering result, where the proportion of the traffic aggregate amount corresponding to the selected remote end triplet information and application information to all traffic is greater than or equal to the second traffic proportion threshold.

It should be noted that, the first traffic threshold and the second traffic proportion threshold herein may be flexibly set according to an actual application or an empirical value. For example, the first traffic threshold may be determined according to a type of an application. Different applications correspond to different first traffic thresholds. For example, the first traffic threshold corresponding to network videos is above G, and the first traffic threshold corresponding to mail is hundreds of megabytes, for example, 300M or in a range of 300M-500M. The second traffic proportion threshold may be, for example, 90% or in a range of 80%-90%, which is not limited by the present invention.

It can be seen from the above that, in the embodiment of the present invention, a UBA-based data mining apparatus obtains to-be-processed data, where the to-be-processed data includes multiple records, and each record includes application information and remote end triplet information having a correspondence relationship therebetween; performs clustering processing on records with same remote end triplet information and same application information in the to-be-processed data, and according to the records with the same remote end triplet information and the same application information in the to-be-processed data, calculates a service load amount corresponding to the remote end triplet information and the application information to obtain a clustering result including the remote end triplet information, the application information, and the service load amount that have a correspondence relationship therebetween; according to the service load amount or a proportion of the service load amount, selects remote end triplet information and application information that have high reliability and have correspondence relationship therebetween from the clustering result, and sends the remote end triplet information and application information that have high reliability and have correspondence relationship therebetween to a DPI subsystem, so that a data mining analysis result of the UBA-based data mining apparatus is synchronously transmitted to the DPI subsystem, in other words, the UBA-based data mining apparatus feeds back the data mining analysis result of the UBA subsystem to the DPI subsystem, that is, the correspondence relationship between the application information and the remote end triplet information that is maintained by the DPI subsystem is established or updated based on the application information and the remote end triplet information that are sent by the UBA-based data mining apparatus; therefore, when receiving second network data, the DPI subsystem may rapidly, according to remote end triplet information contained in the second network data, search the correspondence between the application information and the remote end triplet information for the application information matching the remote end triplet information contained in the second network data, so as to greatly improve DPI-based identification performance and an application identification rate, especially dramatically improve an application identification rate of an encryption protocol, and dramatically improve an application identification rate of bearing protocols.

Further, the DPI subsystem performs protocol identification processing on the received first network data, and directly or indirectly outputs a first protocol identification result to the UBA-based data mining apparatus; the UBA-based data mining apparatus obtains to-be-processed data, where the to-be-processed data includes multiple records, each record at least includes application information and remote end triplet information having a correspondence relationship therebetween, and the to-be-processed data is generated according to a data source at least including the first protocol identification result; so that input or output of the DPI subsystem and input or output of the UBA-based data mining apparatus can be transformed into each other to some extent.

Figure 11:
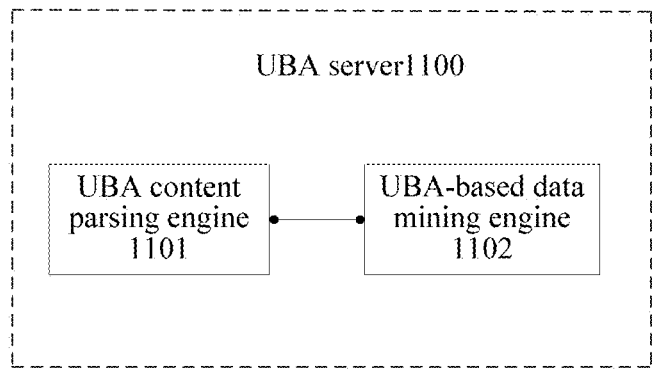
FIG. 11 is a schematic structural diagram of a UBA server provided by an embodiment of the present invention.

Referring to FIG. 11, an embodiment of the present invention provides a UBA server 1100, which may include: a UBA content parsing engine 1101, configured to execute user behavior analysis or user interest analysis; and a UBA-based data mining engine 1102 coupled to the UBA content parsing engine 1101, where the UBA-based data mining engine 1102 is the UBA-based data mining apparatus described in the above embodiment.

The UBA content parsing engine 1101 of the embodiment of the present invention may be implemented by adopting the prior art. For example, the UBA content parsing engine extracts a keyword from browsed contents of a web page through data parsing, and performs user interest modeling according to the keyword to obtain a user interest, so as to support that a service is recommended according to the user interest. It should be noted that, the UBA content parsing engine 1101 and the UBA-based data mining engine 1102 are coupled to each other, that is, during user interest mining, the UBA content parsing engine 1101 may call the UBA-based data mining engine 1102 to perform data clustering or converging and so on.

The UBA-based data mining engine 1102 provided by this embodiment may be configured to execute the part correspondingly executed by the UBA server or the UBA subsystem in the technical solution of the above method embodiment, and implementation principles and technical effects thereof are similar, and are not repeated herein.

It can be seen from the above that, in the embodiment of the present invention, a UBA server obtains to-be-processed data, where the to-be-processed data includes multiple records, and each record includes application information and remote end triplet information having a correspondence relationship therebetween; performs clustering processing on records with same remote end triplet information and same application information in the to-be-processed data, and according to the records with the same remote end triplet information and the same application information in the to-be-processed data, calculates a service load amount corresponding to the remote end triplet information and the application information to obtain a clustering result including the remote end triplet information, the application information, and the service load amount that have a correspondence relationship therebetween; according to the service load amount or a proportion of the service load amount, selects remote end triplet information and application information that have high reliability and have correspondence relationship therebetween from the clustering result, and sends the remote end triplet information and application information that have high reliability and have correspondence relationship therebetween to a DPI subsystem, so that a data mining analysis result of the UBA server is synchronously transmitted to the DPI subsystem, in other words, the UBA server feeds back the data mining analysis result of the UBA subsystem to the DPI subsystem, that is, the correspondence relationship between the application information and the remote end triplet information that is maintained by the DPI subsystem is established or updated based on the application information and the remote end triplet information that are sent by the UBA server; therefore, when receiving second network data, the DPI subsystem may rapidly, according to remote end triplet information contained in the second network data, search the correspondence between the application information and the remote end triplet information for the application information matching the remote end triplet information contained in the second network data, so as to greatly improve DPI-based identification performance and an application identification rate, especially dramatically improve an application identification rate of an encryption protocol, and dramatically improve an application identification rate of bearing protocols.

Further, the DPI subsystem performs protocol identification processing on the received first network data, and directly or indirectly outputs a first protocol identification result to the UBA server; the UBA server obtains to-be-processed data, where the to-be-processed data includes multiple records, each record at least includes application information and remote end triplet information having a correspondence relationship therebetween, and the to-be-processed data is generated according to a data source at least including the first protocol identification result; so that input or output of the DPI subsystem and input or output of the UBA server can be transformed into each other to some extent.

Figure 12A:
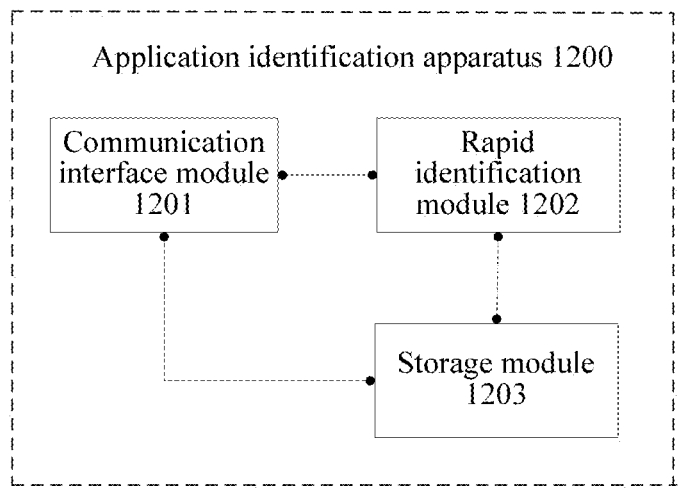
FIG. 12A is a schematic structural diagram of an application identification apparatus provided by an embodiment of the present invention.

Referring to FIG. 12A, an embodiment of the present invention provides an application identification apparatus 1200, which may include a communication interface module 1201 and a rapid identification module 1202.

The communication interface module 1201 is configured to receive application information and remote end triplet information that are sent by a UBA subsystem and have correspondence relationship therebetween, and second network data, where the remote end triplet information includes a transmission protocol, a server IP address, and a server port.

It should be understood that, if the application identification apparatus is externally deployed, the communication interface module 1201 is configured to receive mirrored second network data; if the application identification apparatus is connected in series in a network architecture, for example, connected in series between a GGSN and a service control gateway in a mobile network, connected in series between a broadband access server and a service control gateway in a fixed network, or integrated/built in a network element device, the communication interface module 1201 is configured to receive the second network data itself. It should be noted that the first network data and/or the second network data mentioned in the embodiment of the present invention contains the aforementioned two situations.

The rapid identification module 1202 is connected to the communication interface module 1201, and is configured to, according to remote end triplet information contained in the second network data, search correspondence relationship between the application information and the remote end triplet information that is maintained by the application identification apparatus 1200 for application information matching the remote end triplet information contained in the second network data to identify an application type of the second network data, where the correspondence relationship between the application information and the remote end triplet information that is maintained by the application identification apparatus 1200 is established or updated based on the application information and the remote end triplet information that are sent by the UBA subsystem and have correspondence relationship therebetween.

In an implementation manner, the correspondence relationship between the application information and the remote end triplet information that is maintained by the application identification apparatus may be stored in a storage module of the application identification apparatus, and may also be stored in an external database having a communication connection to the application identification apparatus. For the former situation, the application identification apparatus of the embodiment of the present invention further includes a storage module 1203 that is configured to store the correspondence between the application information and the remote end triplet information.

Figure 12B:
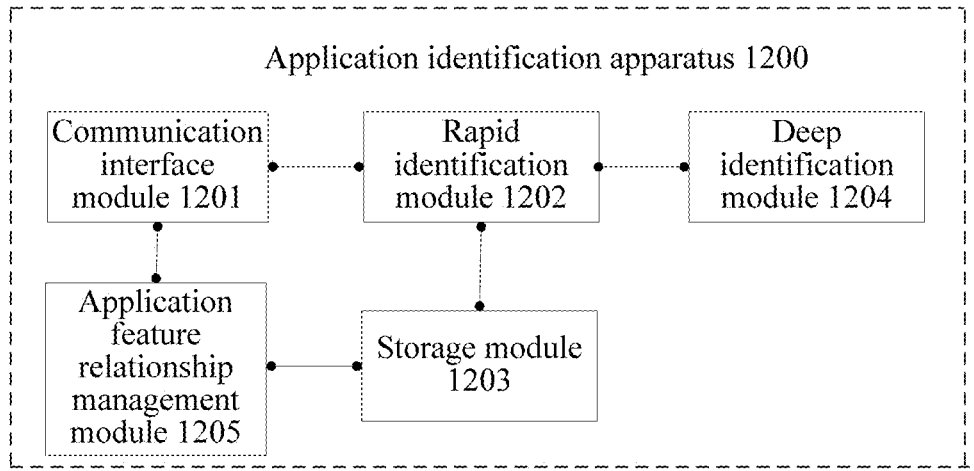
FIG. 12B is a schematic structural diagram of another application identification apparatus 1200 provided by an embodiment of the present invention.

It should be noted that, the rapid identification module 1202 may directly or indirectly transfer a protocol identification result of network data to the UBA subsystem, and the UBA subsystem obtains an application feature set that satisfies a condition by using methods such as data mining, clustering, and converging, synchronizes the application feature set to the application identification apparatus, and may specifically synchronize the application feature set to the rapid identification module 1202 and/or a deep identification module 1204 in the application identification apparatus (as shown in FIG. 12B). It should be understood that, this is a continuously cyclical process. That is, a protocol identification result of the received network data (especially a protocol identification result with no application information being identified) triggers the UBA subsystem to feed back an application feature set, and the application feature set can be used to rapidly identify application information of subsequent network data.

Correspondingly, the communication interface module 1201 is further configured to receive the first network data. It should be noted that the first network data and the second network data herein may be different network data packets under a same network application, and may also be different network data packets under different network applications.

Correspondingly, the rapid identification module 1202 is further configured to perform protocol identification processing on the received first network data, and output a first protocol identification result to the UBA subsystem, where the first protocol identification result includes the remote end triplet information, or the first protocol identification result includes quintuple information. Preferably, the first protocol identification result includes quintuple information and L7 protocol information, so that the UBA subsystem, according to a data source at least including the first protocol identification result, obtains remote end triplet information and application information having a correspondence relationship therebetween, and returns the remote end triplet information and the application information having a correspondence relationship therebetween to the application identification apparatus, and therefore, the application identification apparatus, especially the rapid identification module 1202, can rapidly identify application information of subsequent network data. Preferably, the first protocol identification result includes quintuple information and L7 protocol information. It should be understood that, the protocol identification processing herein includes Layer 2 feature matching, Layer 3 feature matching, and simple L7 feature matching (such as: an IP address, a port, a transmission protocol, a TCP frame header, and a short substring of a fixed position).

It can be seen from the above that, in the embodiment of the present invention, after the UBA subsystem sends/synchronizes the remote end triplet information and application information having a correspondence relationship therebetween to the application identification apparatus, a data mining analysis result of the UBA subsystem is synchronously transmitted to the application identification apparatus, in other words, the UBA subsystem feeds back the data mining analysis result of the UBA subsystem to the application identification apparatus, that is, the correspondence relationship between the application information and the remote end triplet information that is maintained by the application identification apparatus is established or updated based on the application information and the remote end triplet information that are sent by the UBA subsystem; therefore, when receiving subsequent second network data, the application identification apparatus may rapidly, according to remote end triplet information contained in the second network data, search the correspondence relationship between the application information and the remote end triplet information for the application information matching the remote end triplet information contained in the second network data, so as to greatly improve DPI-based identification performance and an application identification rate, especially dramatically improve an application identification rate of an encryption protocol, and dramatically improve an application identification rate of bearing protocols.

Referring to FIG. 12B, an embodiment of the present invention provides another application identification apparatus 1200, and on the basis of the structure of the device shown in FIG. 12A, an application identification apparatus of the embodiment of the present invention further includes a deep identification module 1204.

The rapid identification module 1202 is further configured to, when application information matching the remote end triplet information contained in the second network data cannot be found, transfer the second network data to the deep identification module.

The deep identification module 1204 is configured to perform L7 feature matching on the second network data to obtain a second protocol identification result, and output the second protocol identification result to the UBA subsystem, where the second protocol identification result includes remote end triplet information and application information having a correspondence relationship therebetween or quintuple information and application information having a correspondence relationship therebetween; or, the second protocol identification result includes remote end triplet information and L7 protocol information having a correspondence relationship therebetween or quintuple information and L7 protocol information having a correspondence relationship therebetween.

It should be noted that, the deep identification module 1204 may also directly or indirectly transfer a second protocol identification result to the UBA subsystem, and the UBA subsystem obtains an application feature set meeting a condition by using methods such as data mining, clustering, and converging, synchronizes the application feature set to the application identification apparatus, and may specifically synchronize the application feature set to the rapid identification module 1202 and/or the deep identification module 1204 in the application identification apparatus.

It should be understood that, the rapid identification module 1202 is responsible for performing Layer 2 feature matching, Layer 3 feature matching, and simple L7 feature matching (such as: an IP address, a port, a transmission protocol, a TCP frame header, and a short substring of a fixed position), and the deep identification module 1204 is responsible for performing complex feature matching and bearing-feature matching.

The application identification apparatus of the embodiment of the present invention further includes: an application feature relationship management module 1205, configured to, according to the remote end triplet information and the application information that are sent by the UBA subsystem and have correspondence relationship therebetween, establish or update the correspondence relationship between the application information and the remote end triplet information; and a storage module 1203, configured to store the established or updated correspondence relationship between the application information and the remote end triplet information; or, configured to store the remote end triplet information and the application information that are sent by the UBA subsystem and have correspondence relationship therebetween.

It can be seen from the above that, in the embodiment of the present invention, the application identification apparatus performs protocol identification processing on the received first network data, and directly or indirectly outputs the first protocol identification result to the UBA subsystem; the UBA subsystem obtains to-be-processed data, where the to-be-processed data includes multiple records, each record includes application information and remote end triplet information having a correspondence relationship therebetween, and the to-be-processed data is generated according to a data source at least including the first protocol identification result; performs clustering processing on records with same remote end triplet information and same application information in the to-be-processed data, and according to the records with the same remote end triplet information and the same application information in the to-be-processed data, calculates a service load amount corresponding to the remote end triplet information and the application information to obtain a clustering result including the remote end triplet information, the application information, and the service load amount that have a correspondence relationship therebetween; according to the service load amount or a proportion of the service load amount, selects remote end triplet information and application information that have high reliability and have correspondence relationship therebetween from the clustering result, and sends the remote end triplet information and application information that have high reliability and have correspondence relationship therebetween to the application identification apparatus, so that a data mining analysis result of the UBA subsystem is synchronously transmitted to the application identification apparatus, in other words, the UBA subsystem feeds back the data mining analysis result of the UBA subsystem to the application identification apparatus, that is, the correspondence relationship between the application information and the remote end triplet information that is maintained by the application identification apparatus is established or updated based on the application information and the remote end triplet information that are sent by the UBA subsystem; therefore, when receiving second network data, the application identification apparatus may rapidly, according to remote end triplet information contained in the second network data, search the correspondence relationship between the application information and the remote end triplet information for the application information matching the remote end triplet information contained in the second network data, so as to greatly improve DPI-based identification performance and an application identification rate, especially dramatically improve an application identification rate of an encryption protocol, and dramatically improve an application identification rate of bearing protocols.

Further, the application identification apparatus performs protocol identification processing on the received first network data, and directly or indirectly outputs a first protocol identification result to the UBA subsystem; the UBA subsystem obtains to-be-processed data, where the to-be-processed data includes multiple records, each record at least includes application information and remote end triplet information having a correspondence relationship therebetween, and the to-be-processed data is generated according to a data source at least including the first protocol identification result; so that input or output of the application identification apparatus and input or output of the UBA subsystem can be transformed into each other to some extent.

The correspondence relationship between the application information and the remote end triplet information that is maintained through the application identification apparatus of the embodiment of the present invention is established or updated based on the application information and the remote end triplet information that are sent by the UBA subsystem and have correspondence relationship therebetween, so as to solve the problems in the prior art that fixed configurations incur maintenance costs and cannot adapt to changes, thereby realizing adaptive update or maintenance of the correspondence relationship between the application information and the remote end triplet information, resulting in reduction in maintenance work.

Figure 13:
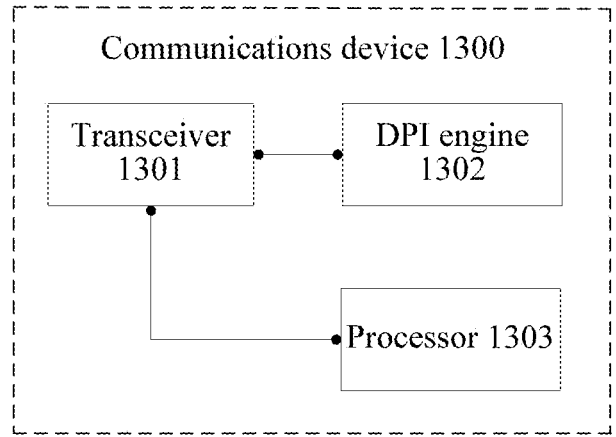
FIG. 13 is a schematic structural diagram of a communications device provided by an embodiment of the present invention.

Referring to FIG. 13, an embodiment of the present invention provides a communications device 1300, which may include a transceiver 1301 and a processor 1303 that is coupled to the transceiver 1301 and is configured to perform network communication. The communications device 1300 further includes a DPI engine 1302 coupled to the transceiver 1301. The DPI engine 1302 is the application identification apparatus described in the above embodiment. It should be understood that, the transceiver 1301 is configured to receive network data, and is further configured to send the network data or application information output by the DPI engine.

The communications device provided by the embodiment of the present invention is a network element device having a DPI function, and a product form thereof may be a router, a gateway device, an RNC, a GGSN, an SCG, or a PDSN, and so on. It should be understood that, the application identification apparatus described in the above embodiment may be built in a network element device of an existing network through, for example, plugging or software integration.

The DPI engine 1302 provided by this embodiment may be configured to execute the part correspondingly executed by the DPI subsystem in the technical solution of the above method embodiment, and implementation principles and technical effects thereof are similar. For other detailed implementation details, reference may be made to the above method and device embodiments, which are not repeated herein.

It can be seen that, in the embodiment of the present invention, after the UBA subsystem sends/synchronizes the remote end triplet information and application information having a correspondence relationship therebetween to a network element device having a DPI function, a data mining analysis result of the UBA subsystem is synchronously transmitted to the network element device having the DPI function, in other words, the UBA subsystem feeds back the data mining analysis result of the UBA subsystem to the network element device having the DPI function, that is, the correspondence relationship between the application information and the remote end triplet information that is maintained by the network element device having the DPI function is established or updated based on the application information and the remote end triplet information that are sent by the UBA subsystem; therefore, when receiving second network data, the network element device having the DPI function may rapidly, according to remote end triplet information contained in the second network data, search the correspondence relationship between the application information and the remote end triplet information for the application information matching the remote end triplet information contained in the second network data, so as to greatly improve DPI-based identification performance and an application identification rate, especially dramatically improve an application identification rate of an encryption protocol, and dramatically improve an application identification rate of bearing protocols.

Further, the network element device having the DPI function performs protocol identification processing on the received first network data, and directly or indirectly outputs a first protocol identification result to the UBA subsystem; the UBA subsystem obtains to-be-processed data, where the to-be-processed data includes multiple records, each record at least includes application information and remote end triplet information having a correspondence relationship therebetween, and the to-be-processed data is generated according to a data source at least including the first protocol identification result; so that input or output of the network element device having the DPI function and input or output of the UBA subsystem can be transformed into each other to some extent.

The correspondence relationship between the application information and the remote end triplet information that is maintained through the network element device having the DPI function and provided by the embodiment of the present invention is established or updated based on the application information and the remote end triplet information that are sent by the UBA subsystem and have correspondence relationship therebetween, so as to solve the problems in the prior art that fixed configurations incur maintenance costs and cannot adapt to changes, thereby realizing adaptive update or maintenance of the correspondence relationship between the application information and the remote end triplet information, resulting in reduction in maintenance work.

Figure 14:
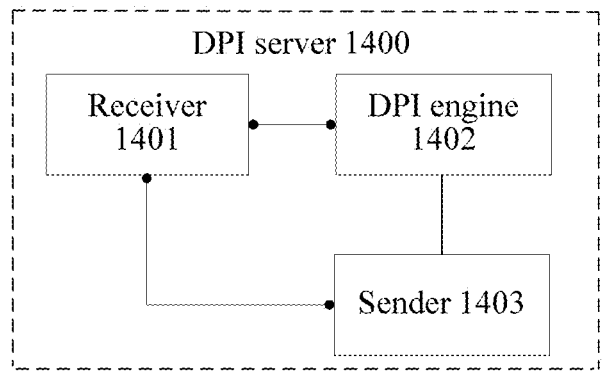
FIG. 14 is a schematic structural diagram of a DPI server provided by an embodiment of the present invention.

Referring to FIG. 14, an embodiment of the present invention provides a DPI server 1400, which may include: a receiver 1401, configured to receive network data or a mirror of the network data; a DPI engine 1402, coupled to the receiver 1401; and a sender 1403, configured to send application information that is output by the DPI engine 1402 or the network data, where the DPI engine 1402 is the application identification apparatus described in the above embodiment.

Further, the DPI server 1400 of the embodiment of the present invention may further include a memory, which is not illustrated in FIG. 14. The memory is configured to store correspondence relationship between application information and remote end triplet information.

The receiver 1401 is specifically configured to receive application information and remote end triplet information that are sent by a UBA subsystem and have correspondence relationship therebetween, and second network data, where the remote end triplet information includes a transmission protocol, a server IP address, and a server port.

The DPI engine 1402 is specifically configured to, when receiving the second network data, search, according to remote end triplet information contained in the second network data, the correspondence relationship between the application information and the remote end triplet information, stored in the memory for application information matching the remote end triplet information contained in the second network data to identify an application type of the second network data.

The receiver 1401 is further configured to receive the first network data. It should be noted that the first network data and the second network data herein may be different network data packets under a same network application, and may also be different network data packets under different network applications.

The DPI engine 1402 is further configured to perform protocol identification processing on the received first network data, and output a first protocol identification result to the UBA subsystem, where the first protocol identification result includes the remote end triplet information, or the first protocol identification result includes quintuple information.

It should be noted that, the DPI engine 1402 may directly or indirectly transfer the protocol identification result of the network data to the UBA subsystem, and the UBA subsystem obtains an application feature set meeting a condition by using methods such as data mining, clustering, and converging, and synchronizes the application feature set to the DPI engine 1402. It should be understood that, this is a continuously cyclical process. That is, a protocol identification result of the received network data (especially a protocol identification result with no application information being identified) triggers the UBA subsystem to feed back an application feature set, and the application feature set can be used by the DPI engine 1402 to rapidly identify application information of subsequent network data.

Further, the DPI engine 1402 is further configured to, when application information matching the remote end triplet information contained in the second network data cannot be found, perform L7 feature matching on the second network data to obtain a second protocol identification result, and output the second protocol identification result to the UBA subsystem, where the second protocol identification result includes remote end triplet information and application information having a correspondence relationship therebetween or quintuple information and application information having a correspondence relationship therebetween; or, the second protocol identification result includes remote end triplet information and L7 protocol information having a correspondence relationship therebetween or quintuple information and L7 protocol information having a correspondence relationship therebetween.

It should be noted that, the DPI engine 1402 may also directly or indirectly transfer the second protocol identification result to the UBA subsystem, and the UBA subsystem obtains an application feature set meeting a condition by using methods such as data mining, clustering, and converging, and synchronizes the application feature set to the DPI engine 1402.

It should be understood that, the DPI engine 1402 not only can perform Layer 2 feature matching, Layer 3 feature matching, and simple L7 feature matching, but also can perform complex feature matching and bearing-feature matching.

The DPI server 1400 provided by this embodiment may be configured to execute the part correspondingly executed by the DPI subsystem in the technical solution of the above method embodiment, and implementation principles and technical effects thereof are similar. For other detailed implementation details, reference may be made to the above method and device embodiments, which are not repeated herein.

It can be seen from the above that, in the embodiment of the present invention, after the UBA subsystem sends/synchronizes remote end triplet information and application information that have high reliability and have correspondence relationship therebetween to the DPI server, a data mining analysis result of the UBA subsystem is synchronously transmitted to the DPI server, in other words, the UBA subsystem feeds back the data mining analysis result of the UBA subsystem to the DPI server, that is, the correspondence relationship between the application information and the remote end triplet information that is maintained by the DPI server is established or updated based on the application information and the remote end triplet information that are sent by the UBA subsystem; therefore, when receiving second network data, the DPI server may rapidly, according to remote end triplet information contained in the second network data, search the correspondence relationship between the application information and the remote end triplet information for the application information matching the remote end triplet information contained in the second network data, so as to greatly improve DPI-based identification performance and an application identification rate, especially dramatically improve an application identification rate of an encryption protocol, and dramatically improve an application identification rate of bearing protocols.

Further, the DPI server performs protocol identification processing on the received first network data, and directly or indirectly outputs a first protocol identification result to the UBA subsystem; the UBA subsystem obtains to-be-processed data, where the to-be-processed data includes multiple records, each record at least includes application information and remote end triplet information having a correspondence relationship therebetween, and the to-be-processed data is generated according to a data source at least including the first protocol identification result; so that input or output of the DPI server and input or output of the UBA subsystem can be transformed into each other to some extent.

Further, in the communications system provided by the embodiment of the present invention, the UBA subsystem feeds back the data mining analysis result of the UBA subsystem to the DPI server, that is, the correspondence relationship between the application information and the remote end triplet information that is maintained by the DPI server is established or updated based on the application information and the remote end triplet information that are sent by the UBA subsystem and have correspondence relationship therebetween, so as to solve the problems in the prior art that fixed configurations incur maintenance costs and cannot adapt to changes, thereby realizing adaptive update or maintenance of the correspondence relationship between the application information and the remote end triplet information, resulting in reduction in maintenance work.

Figure 15:
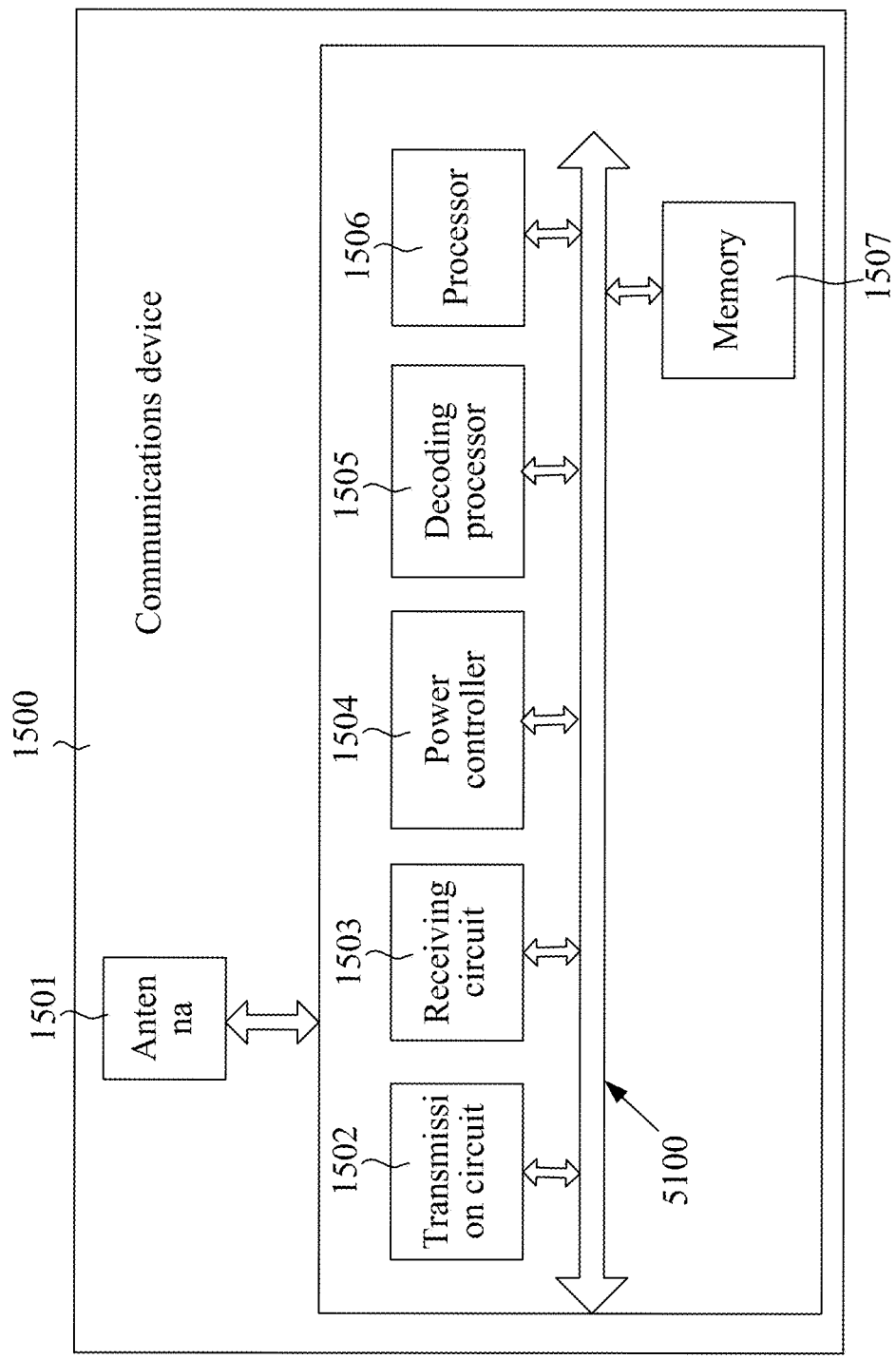
FIG. 15 is a schematic structural diagram of another communications device provided by an embodiment of the present invention.

The embodiments of the present invention further provide device embodiments for implementing steps and methods in the above method embodiments. The embodiments of the present invention can be applied to communications devices in various communications systems. FIG. 15 illustrates an embodiment of a communications device, and in this embodiment, a communications device 1500 includes a transmission circuit 1502, a receiving circuit 1503, a power controller 1504, a decoding processor 1505, a processor 1506, a memory 1507, and an antenna 1501. The processor 1506 controls operating of the communications device 1500. The memory 1507 may include a read-only memory and a random access memory, and provide an instruction and data for the processor 1506. A part of the memory 1507 may also include a nonvolatile random access memory (NVRAM). In a specific application, the communications device 1500 may be embedded in or may be a communications device such as a service control gateway, and may further include a carrier for accommodating the transmission circuit 1502 and the receiving circuit 1503, so as to allow data to be transmitted and received between the communications device 1500 and a remote location. The transmission circuit 1502 and the receiving circuit 1503 may be coupled to the antenna 1501. Components of the communications device 1500 are coupled together through a bus system 5100. The bus system 5100 further includes a power bus, a control bus, and a status signal bus besides a data bus. For clearness of illustration, all the buses in the drawing are represented by the bus system 5100. The communications device 1500 may further include the processor 1506 configured to process a signal, and additionally include the power controller 1504 and the decoding processor 1505.

The methods disclosed by the above embodiments of the present invention can be applied to the decoding processor 1505, and in other words, can be implemented through the decoding processor 1505. The decoding processor 1505 may be an integrated circuit chip, and can process a signal. During implementation, the steps of the above method may be performed through instructions of an integrated logic circuit of hardware or software in the decoding processor 1505. The instructions may be implemented and controlled through the processor 1506. To be configured to execute the method disclosed by the embodiment of the present invention, the decoding processor may be a general-purpose processor, a digital signal processor (DSP), an application-specific integrated circuit (ASIC), a field-programmable gate array (FPGA), or other programmable logic device and discrete gate, or transistor logic device and discrete hardware component. The methods, steps, and logic diagrams disclosed in the embodiments of the present invention can be implemented or executed. The general-purpose processor may be a microprocessor or the processor may also be any conventional processor, decoder, and so on. The steps of the methods disclosed in the embodiments of the present invention can be directly executed by a hardware decoding processor or executed by using a combination of hardware and a software module in a decoding processor. The software module may be located in a mature storage medium in the art, such as a random access memory, a flash memory, a read-only memory, a programmable read-only memory, or an electrically erasable programmable memory, and a register. The storage medium is located in the memory 1507, and the decoding processor 1505 reads information in the memory 1507, and performs the steps of the above method with reference to hardware thereof.

Figure 16:
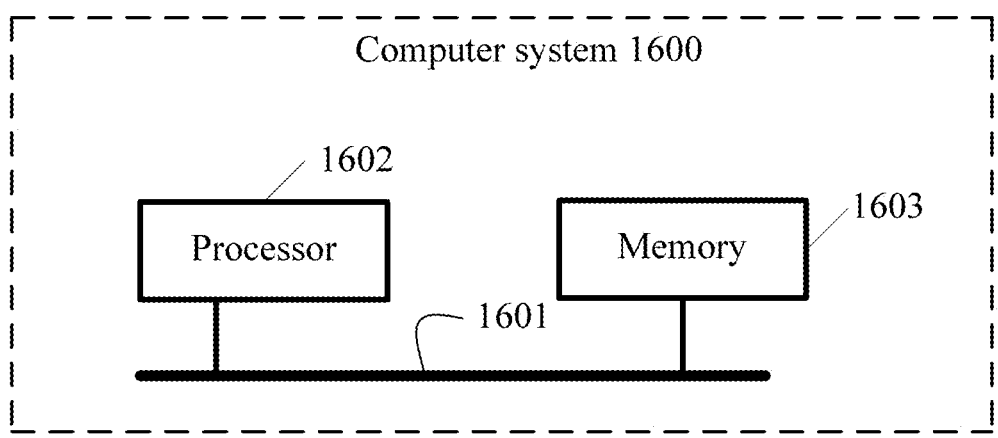
FIG. 16 is a schematic structural diagram of a computer system provided by an embodiment of the present invention.

FIG. 16 is a schematic diagram of a computer system 1600 provided by the present invention. As shown in FIG. 16, the computer system of this embodiment includes at least one bus 1601, at least one processor 1602 connected to the bus 1601, and at least one memory 1603 connected to the bus 1601. The processor 1602, through the bus 1601, calls codes stored in the memory 1603 to: obtain to-be-processed data, where the to-be-processed data, each record includes application information and remote end triplet information having a correspondence relationship therebetween, and the remote end triplet information includes a transmission protocol, a server IP address, and a server port; perform clustering processing on records with same remote end triplet information and same application information in the to-be-processed data, and according to the records with the same remote end triplet information and the same application information in the to-be-processed data, calculate a service load amount corresponding to the remote end triplet information and the application information to obtain a clustering result including the remote end triplet information, the application information, and the service load amount that have a correspondence relationship therebetween; according to the service load amount or a proportion of the service load amount, select remote end triplet information and application information that have high reliability and have correspondence relationship therebetween from the clustering result; and send the remote end triplet information and application information that have high reliability and have correspondence relationship therebetween to a DPI subsystem.

The computer system provided by this embodiment may be configured to execute the part that shall be executed by the UBA subsystem or the UBA server in the technical solution of the above method embodiment, and implementation principles and technical effects thereof are similar, and are not repeated herein. FIG. 16 is only a schematic diagram of a structure of the computer system provided by the present invention, and the specific structure may be adjusted according to actual needs.

It can be understood that, functions of apparatuses in the computer system 1600 of this embodiment may be specifically implemented according to the method in the above method embodiment, and for a specific implementation process thereof, reference may be made to related description in the above method embodiment, which is not repeated herein.

Figure 17:
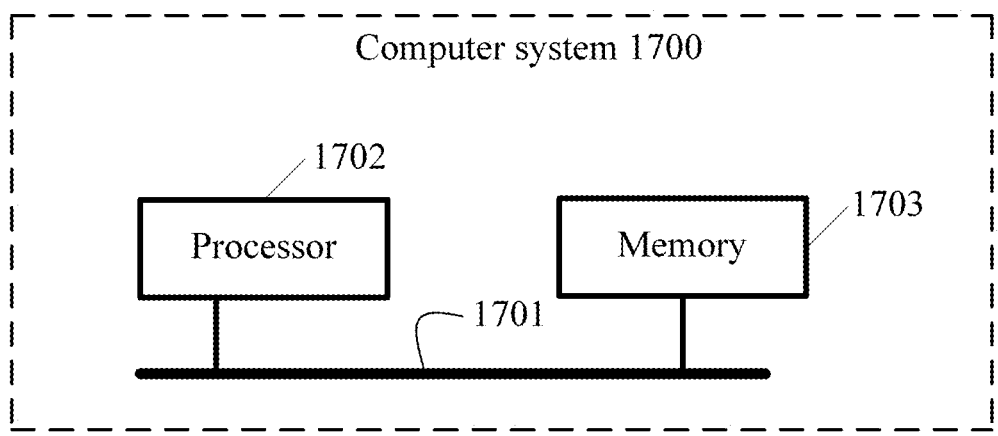
FIG. 17 is a schematic structural diagram of a computer system provided by an embodiment of the present invention.

FIG. 17 is a schematic structural diagram of a computer system provided by the present invention. As shown in FIG. 17, a computer system 1700 of this embodiment includes at least one bus 1701, at least one processor 1702 connected to the bus 1701, and at least one memory 1703 connected to the bus 1701. The processor 1702, through the bus 1701, calls codes stored in the memory 1703 to: receive application information and remote end triplet information that are sent by a UBA subsystem and have correspondence relationship therebetween, and second network data, where the remote end triplet information includes a transmission protocol, a server IP address, and a server port; according to remote end triplet information contained in the second network data, search correspondence relationship between application information and remote end triplet information that is maintained by the computer system 1700 for application information matching the remote end triplet information contained in the second network data to identify an application type of the second network data, where the correspondence relationship between the application information and the remote end triplet information that is maintained by the computer system 1700 is established or updated based on the application information and the remote end triplet information that are sent by the UBA subsystem and have correspondence relationship therebetween.

The computer system provided by this embodiment may be configured to execute the part correspondingly executed by the DPI subsystem or the DPI server or the network element device having the DPI function in the technical solution of the above method embodiment, and implementation principles and technical effects thereof are similar, and are not repeated herein. FIG. 17 is only a schematic diagram of a structure of the computer system provided by the present invention, and the specific structure may be adjusted according to actual needs.

It can be understood that, functions of apparatuses in the computer system 1700 of this embodiment may be specifically implemented according to the method in the above method embodiment, and for a specific implementation process thereof, reference may be made to related description in the above method embodiment, which is not repeated herein.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The storage medium may be a magnetic disc, an optical disc, a read-only memory (ROM), or a random access memory (RAM).

The objectives, technical solutions, and advantages of the present invention are further illustrated above in detail through the exemplary embodiments, but it should be understood that the above descriptions are merely exemplary embodiments of the present invention, but are not intended to limit the present invention. Any modification, equivalent replacement, or improvement made without departing from the spirit and principle of the present invention should fall within the protection scope of the present invention.

What is claimed is:

1. A user behavior analysis (UBA)-based data mining method, comprising:
    obtaining to-be-processed data that comprises a plurality of records, wherein each of the records comprise an application information and a remote end triplet information having a correspondence relationship therebetween, and wherein the remote end triplet information comprises a transmission protocol, an Internet Protocol (IP) address of a server, and a port of the server;
    performing a clustering processing on the records with the same remote end triplet information and the same application information in the to-be-processed data;
    calculating, according to the records with the same remote end triplet information and the same application information in the to-be-processed data, a service load amount corresponding to the remote end triplet information and the application information to obtain a clustering result including the remote end triplet information, the application information, and the service load amount that have a correspondence relationship therebetween;
    selecting, according to the service load amount or a proportion of the service load amount, the remote end triplet information and the application information that have high reliability and have a correspondence relationship therebetween from the clustering result; and
    sending the remote end triplet information and the application information that have high reliability and have a correspondence relationship therebetween to a deep packet inspection (DPI) subsystem.

2. The method according to claim 1, wherein obtaining to-be-processed data comprises:
    for each type of application, crawling, according to domain name information corresponding to the application, IP address information corresponding to the domain name information to obtain a crawling result including the application information, the domain name information, and the IP address information that have the correspondence relationship therebetween;
    obtaining a first protocol identification result output by the DPI subsystem, wherein the first protocol identification result comprises the remote end triplet information; and
    associatively generating the to-be-processed data according to the crawling result and the first protocol identification result, by using a same IP address in the crawling result and in the first protocol identification result as an association condition.

3. The method according to claim 1, wherein obtaining to-be-processed data comprises:
    obtaining a first protocol identification result output by the DPI subsystem and a crawling result output by a crawling subsystem, wherein the first protocol identification result comprises the remote end triplet information, and wherein the crawling result includes application information, domain name information, and IP address information having a correspondence relationship therebetween; and
    associatively generating the to-be-processed data according to the crawling result and the first protocol identification result, by using a same IP address in the crawling result and in the first protocol identification result as an association condition.

4. The method according to claim 1, wherein performing the clustering processing on the records and calculating the service load amount to obtain a clustering result comprises performing clustering processing on the records with the same remote end triplet information and the same application information in the to-be-processed data, and accumulating the number of the records with the same remote end triplet information and the same application information in the to-be-processed data, wherein the number of the records is used as the number of connections corresponding to the remote end triplet information and the application information, to obtain a clustering result including the remote end triplet information, the application information, and the number of connections having a correspondence relationship therebetween, and wherein
  selecting the remote end triplet information and the application information that have high reliability from the clustering result comprises:
  either selecting the remote end triplet information and the application information having a correspondence relationship therebetween from the clustering result according to a result of comparing the number of the connections with a first connection number threshold, wherein the number of connections corresponding to the selected remote end triplet information and application information is greater than or equal to the first connection number threshold; or
  selecting the remote end triplet information and the application information having a correspondence relationship therebetween from the clustering result according to a result of comparing a proportion of the number of connections to the number of all connections with a second connection number proportion threshold, wherein the proportion of the number of connections corresponding to the remote end triplet information and application information to the number of all connections is greater than or equal to the second connection number proportion threshold.

5. The method according to claim 1, wherein each of the records further comprise a client IP address, a client port, and a traffic that corresponds to the application information and a quintuple information, wherein the client IP address, the client port, and the remote end triplet information form the quintuple information, and wherein obtaining to-be-processed data comprises:
  receiving first network data, wherein the first network data comprises one or more data streams, and each of the data streams comprises one or more data packets;
  for each type of application, crawling, according to a domain name information corresponding to the application, the IP address information corresponding to the domain name information to obtain a crawling result including the application information, the domain name information, and the IP address information that have a correspondence relationship therebetween;
  obtaining a first protocol identification result, output by the DPI subsystem, for the first network data, wherein the first protocol identification result comprises quintuple information; and
  generating the to-be-processed data according to the crawling result, the first protocol identification result, and the first network data, by using a same IP address in the crawling result and in the first protocol identification result as an association condition, wherein each of the records comprise the application information, the quintuple information, and the traffic having a correspondence relationship therebetween, and wherein the traffic corresponding to the quintuple information is an accumulated value of load lengths of one or more data packets in the first network data that comprise the quintuple information.

6. The method according to claim 1, wherein each of the records further comprise a client IP address, a client port, and a traffic that corresponds to the application information and a quintuple information, and the client IP address, the client port, wherein the remote end triplet information form the quintuple information, and wherein obtaining to-be-processed data comprises:
  receiving first network data, wherein the first network data comprises one or more data streams, wherein each of the data streams comprises one or more data packets;
  obtaining a crawling result output by a crawling subsystem and a first protocol identification result that is output by the DPI subsystem for the first network data, wherein the first protocol identification result comprises quintuple information, and the crawling result includes application information, domain name information, and IP address information having a correspondence relationship therebetween; and
  associatedly generating the to-be-processed data according to the crawling result, the first protocol identification result, and the first network data, by using a same IP address in the crawling result and in the first protocol identification result as an association condition, wherein each of the records comprise the application information, the quintuple information, and the traffic having a correspondence relationship therebetween, and wherein the traffic corresponding to the quintuple information is an accumulated value of load lengths of one or more data packets in the first network data that comprise the quintuple information.

7. The method according to claim 5, wherein performing the clustering processing on the records and calculating the service load amount to obtain a clustering result comprises performing clustering processing on records with same remote end triplet information and same application information but with different client IP addresses and different client ports in the to-be-processed data, and obtaining a traffic aggregate amount corresponding to the remote end triplet information and the application information by accumulating traffic in the records with the same remote end triplet information and the same application information in the to-be-processed data, to obtain a clustering result including the remote end triplet information, the application information, and the traffic aggregate amount having a correspondence relationship therebetween, wherein selecting the remote end triplet information and the application information that have high reliability from the clustering result comprises:
  either selecting the remote end triplet information and the application information having a correspondence relationship therebetween from the clustering result according to a result of comparing the traffic aggregate amount with a first traffic threshold, wherein the traffic aggregate amount corresponding to the selected remote end triplet information and the application information is greater than or equal to the first traffic threshold; or
  selecting the remote end triplet information and the application information having a correspondence relationship therebetween from the clustering result according to a result of comparing a proportion of the traffic aggregate amount to all traffic with a second traffic proportion threshold, and wherein the proportion of the traffic aggregate amount corresponding to the selected remote end triplet information and application information to all traffic is greater than or equal to the second traffic proportion threshold.

8. The method according to claim 6, wherein the performing clustering processing on the records and calculating the service load amount to obtain a clustering result comprises performing clustering processing on records with same remote end triplet information and same application information but with different client IP addresses and different client ports in the to-be-processed data, and obtaining a traffic aggregate amount corresponding to the remote end triplet information and the application information by accumulating traffic in the records with the same remote end triplet information and the same application information in the to-be-processed data, to obtain a clustering result including the remote end triplet information, the application information, and the traffic aggregate amount having a correspondence relationship therebetween, wherein selecting the remote end triplet information and the application information that have high reliability from the clustering result comprises:

either selecting the remote end triplet information and the application information having a correspondence relationship therebetween from the clustering result according to a result of comparing the traffic aggregate amount with a first traffic threshold, wherein the traffic aggregate amount corresponding to the selected remote end triplet information and application information is greater than or equal to the first traffic threshold; or selecting the remote end triplet information and the application information having a correspondence relationship therebetween from the clustering result according to a result of comparing a proportion of the traffic aggregate amount to all traffic with a second traffic proportion threshold, and wherein the proportion of the traffic aggregate amount corresponding to the selected remote end triplet information and the application information to all traffic is greater than or equal to the second traffic proportion threshold.

9. The method according to claim 1, wherein selecting the remote end triplet information and the application information that have high reliability and have correspondence relationship therebetween from the clustering result according to the service load amount or a proportion of the service load amount comprises:

selecting the remote end triplet information and the application information having a correspondence relationship therebetween from the clustering result according to a result of comparing a proportion of the traffic aggregate amount to all traffic with a second traffic proportion threshold, wherein the service load amount corresponding to the selected remote end triplet information and application information is greater than or equal to the first threshold; or selecting the remote end triplet information and the application information having a correspondence relationship therebetween from the clustering result according to a result of comparing the proportion of the service load amount with a second threshold, wherein the proportion of the service load amount corresponding to the selected remote end triplet information and application information is greater than or equal to the second threshold.

10. An application identification method, comprising:

receiving an application information and a remote end triplet information that are sent by a user behavior analysis (UBA) subsystem and have correspondence relationship therebetween, and a second network data, wherein the remote end triplet information comprises a transmission protocol, a server IP address, and a server port;

searching correspondence relationship between the application information and the remote end triplet information that is maintained by a deep packet inspection (DPI) subsystem for application information matching the remote end triplet information contained in the second network data to identify an application type of the second network data according to the remote end triplet information contained in the second network data, wherein the correspondence relationship between the application information and the remote end triplet information that is maintained by the DPI subsystem is established or updated based on the application information and the remote end triplet information that are sent by the UBA subsystem and have correspondence relationship therebetween.

11. The method according to claim 10, further comprising performing a protocol identification processing on a received first network data, and outputting a first protocol identification result to the UBA subsystem, wherein the first protocol identification result comprises either the remote end triplet information or a quintuple information.

12. The method according to claim 10, further comprising performing a Layer 7 (L7) feature matching on the second network data to obtain a second protocol identification result and outputting the second protocol identification result to the UBA subsystem when the searching fails, wherein the second protocol identification result comprises: the remote end triplet information and the application information having a correspondence relationship therebetween, or the second protocol identification result comprises: a quintuple information and the application information having a correspondence relationship therebetween, or the second protocol identification result comprises: the remote end triplet information and the L7 protocol information having a correspondence relationship therebetween, or the second protocol identification result comprises: quintuple information and L7 protocol information having a correspondence relationship therebetween.

13. The method according to claim 10, further comprising:

establishing or updating the correspondence relationship between the application information and the remote end triplet information that is maintained by the DPI subsystem according to the remote end triplet information and the application information that are sent by the UBA subsystem and have correspondence relationship therebetween; and either storing the established or updated correspondence between the application information and the remote end triplet information; or storing the remote end triplet information and the application information that are sent by the UBA subsystem and have correspondence relationship therebetween.

14. A user behavior analysis (UBA) server, comprising:

a processor and a memory coupled to the processor, wherein the processor is configured to:

obtain to-be-processed data, wherein the to-be-processed data comprises a plurality of records, wherein each of the records comprise an application information and a remote end triplet information having a correspondence relationship therebetween, and the remote end triplet information comprises a transmission protocol, an IP address of a server, and a port of a server;

perform clustering processing on the records with the same remote end triplet information and the same application information in the to-be-processed data; and calculate a service load amount corresponding to the remote end triplet information and the application information to obtain a clustering result including the remote end triplet information, the application information, and the service load amount that have a correspondence relationship therebetween according to the records with the same remote end triplet information and the same application information in the to-be-processed data;

select the remote end triplet information and the application information that have high reliability and have a correspondence relationship therebetween from the clustering result according to the service load amount or a proportion of the service load amount; and send the remote end triplet information and the application information that have high reliability and have a correspondence relationship therebetween to a deep packet inspection (DPI) subsystem.

15. The UBA server according to claim 14, wherein in the obtaining to-be-processed data, the processor is further configured to:

for each type of application, crawl, according to domain name information corresponding to the application, an internet protocol (IP) address information corresponding to the domain name information to obtain a crawling result including the application information, the domain name information, and the IP address information that have a correspondence relationship therebetween;

obtain a first protocol identification result output by the DPI subsystem, wherein the first protocol identification result comprises the remote end triplet information; and associately generate the to-be-processed data according to the crawling result and the first protocol identification result, by using a same IP address in the crawling result and in the first protocol identification result as an association condition.

16. The UBA server according to claim 14, wherein in obtaining to-be-processed data, the processor is further configured to:

obtain a first protocol identification result output by the DPI subsystem and a crawling result output by a crawling subsystem, wherein the first protocol identification result comprises the remote end triplet information, and wherein the crawling result includes application information, domain name information, and IP address information having a correspondence relationship therebetween; and associately generate the to-be-processed data according to the crawling result and the first protocol identification result, by using a same IP address in the crawling result and in the first protocol identification result as an association condition.

17. The UBA server according to claim 14, wherein in performing clustering processing on the records and calculating a service load amount corresponding to the remote end triplet information and the application information to obtain a clustering result, the processor is further configured to: perform clustering processing on the records with the same remote end triplet information and the same application information in the to-be-processed data, and accumulate the number of the records with the same remote end triplet information and the same application information in the to-be-processed data, wherein the number of the records is used as the number of connections corresponding to the remote end triplet information and the application information, to obtain a clustering result including the remote end triplet information, the application information, and the number of connections having a correspondence relationship therebetween, and wherein in selecting the remote end triplet information and the application information that have high reliability from the clustering result, the processor is further configured to: either select the remote end triplet information and the application information having a correspondence relationship therebetween from the clustering result according to a result of comparing the number of the connections with a first connection number threshold, wherein the number of connections corresponding to the selected remote end triplet information and application information is greater than or equal to the first connection number threshold; or select the remote end triplet information and the application information having a correspondence relationship therebetween from the clustering result according to a result of comparing a proportion of the number of connections to the number of all connections with a second connection number proportion threshold, wherein the proportion of the number of connections corresponding to the remote end triplet information and application information to the number of all connections is greater than or equal to the second connection number proportion threshold.

18. The UBA server according to claim 14, wherein each of the records further comprise a client IP address, a client port, and a traffic that corresponds to the application information and quintuple information, wherein the client IP address, the client port, and the remote end triplet information form the quintuple information, wherein in the obtaining to-be-processed data, the processor is further configured to:

receive first network data, wherein the first network data comprises one or more data streams, and each of the data streams comprises one or more data packets;

for each type of application, crawl, according to domain name information corresponding to the application, an IP address information corresponding to the domain name information to obtain a crawling result including the application information, the domain name information, and the IP address information that have a correspondence relationship therebetween;

obtain a first protocol identification result, output by the DPI subsystem, for the first network data, wherein the first protocol identification result comprises quintuple information; and generate the to-be-processed data according to the crawling result, the first protocol identification result, and the first network data, by using a same IP address in the crawling result and in the first protocol identification result as an association condition, wherein the to-be-processed data comprises multiple records, each record comprises the application information, the quintuple information, and the traffic having a correspondence relationship therebetween, and wherein the traffic corresponding to the quintuple information is an accumulated value of load lengths of one or more data packets in the first network data that comprise the quintuple information.

19. The UBA server according to claim 14, wherein each of the records further comprise a client IP address, a client port, and a traffic that corresponds to the application information and quintuple information, wherein the client IP address, the client port, and the remote end triplet information form the quintuple information,
  wherein in the obtaining to-be-processed data, the processor is further configured to:
    receive a first network data, wherein the first network data comprises one or more data streams, wherein each of the data streams comprises one or more data packets;
    obtain a crawling result output by a crawling subsystem and a first protocol identification result that is output by the DPI subsystem for the first network data, wherein the first protocol identification result comprises quintuple information, and the crawling result includes application information, domain name information, and IP address information having a correspondence relationship therebetween; and
    associatedly generate the to-be-processed data according to the crawling result, the first protocol identification result, and the first network data, by using a same IP address in the crawling result and in the first protocol identification result as an association condition, and wherein the to-be-processed data comprises multiple records, each record comprises the application information, the quintuple information, and the traffic having a correspondence relationship therebetween, and the traffic corresponding to the quintuple information is an accumulated value of load lengths of one or more data packets in the first network data that comprise the quintuple information.

20. The UBA server according to claim 18, wherein performing clustering processing on the records and calculating a service load amount to obtain a clustering result, the processor is further configured to: perform clustering processing on records with same remote end triplet information and same application information but with different client IP addresses and different client ports in the to-be-processed data, and obtain a traffic aggregate amount corresponding to the remote end triplet information and the application information by accumulating traffic in the records with the same remote end triplet information and the same application information in the to-be-processed data, to obtain a clustering result including the remote end triplet information, the application information, and the traffic aggregate amount having a correspondence relationship therebetween, wherein in selecting the remote end triplet information and the application information that have high reliability from the clustering result, the processor is further configured to: either select remote end triplet information and application information having a correspondence relationship therebetween from the clustering result according to a result of comparing the traffic aggregate amount with a first traffic threshold, wherein the traffic aggregate amount corresponding to the selected remote end triplet information and application information is greater than or equal to the first traffic threshold; or select remote end triplet information and application information having a correspondence relationship therebetween from the clustering result, wherein the proportion of the traffic aggregate amount corresponding to the selected remote end triplet information and application information to all traffic is greater than or equal to the second traffic proportion threshold according to a result of comparing a proportion of the traffic aggregate amount to all traffic with a second traffic proportion threshold.

21. The UBA server according to claim 19, wherein in performing clustering processing on the records and calculating a service load amount to obtain a clustering result, the processor is further configured to: perform clustering processing on records with same remote end triplet information and same application information but with different client IP addresses and different client ports in the to-be-processed data, and obtain a traffic aggregate amount corresponding to the remote end triplet information and the application information by accumulating traffic in the records with the same remote end triplet information and the same application information in the to-be-processed data, to obtain a clustering result including the remote end triplet information, the application information, and the traffic aggregate amount having a correspondence relationship therebetween, wherein in selecting the remote end triplet information and the application information that have high reliability from the clustering result, the processor is further configured to:
  either select remote end triplet information and application information having a correspondence relationship therebetween from the clustering result according to a result of comparing the traffic aggregate amount with a first traffic threshold, wherein the traffic aggregate amount corresponding to the selected remote end triplet information and application information is greater than or equal to the first traffic threshold; or
  select remote end triplet information and application information having a correspondence relationship therebetween from the clustering result according to a result of comparing a proportion of the traffic aggregate amount to all traffic with a second traffic proportion threshold, wherein the proportion of the traffic aggregate amount corresponding to the selected remote end triplet information and application information to all traffic is greater than or equal to the second traffic proportion threshold.

22. The UBA server according to claim 14, wherein selecting the remote end triplet information and the application information that have high reliability and have correspondence relationship therebetween from the clustering result according to the service load amount or a proportion of the service load amount, the processor is further configured to:
  either select the remote end triplet information and the application information having a correspondence relationship therebetween from the clustering result according to a result of comparing the service load amount with a first threshold, wherein the service load amount corresponding to the selected remote end triplet information and application information is greater than or equal to the first threshold; or
  select remote end triplet information and application information having a correspondence relationship therebetween from the clustering result according to a result of comparing the proportion of the service load amount with a second threshold, wherein the proportion of the service load amount corresponding to the selected remote end triplet information and application information is greater than or equal to the second threshold.

23. A user behavior analysis (UBA) server, wherein the UBA server comprises: a UBA content parsing engine configured to execute user behavior analysis or user interest analysis; and a UBA-based data mining engine coupled to the UBA content parsing engine; wherein the UBA-based data mining engine is configured to:
  obtain to-be-processed data that comprises a plurality of records, wherein each of the records comprise an application information and a remote end triplet information having a correspondence relationship therebetween, and wherein the remote end triplet information comprises a transmission protocol, an IP address of a server, and a port of a server;

perform clustering processing on records with the same remote end triplet information and the same application information in the to-be-processed data;

calculate a service load amount corresponding to the remote end triplet information and the application information to obtain a clustering result including the remote end triplet information, the application information, and the service load amount that have a correspondence relationship therebetween according to the records with the same remote end triplet information and the same application information in the to-be-processed data;

select remote end triplet information and application information that have high reliability and have a correspondence relationship therebetween from the clustering result according to the service load amount or a proportion of the service load amount; and send the remote end triplet information and the application information that have high reliability and have a correspondence relationship therebetween to a deep packet inspection (DPI) subsystem.

24. A deep packet inspection (DPI) server, wherein the DPI server comprises:
a receiver configured to receive network data or a minor of the network data;
a DPI engine, coupled to the receiver; and
a sender configured to send application information that is output by the DPI engine or the network data,
wherein the DPI engine is configured to:
receive an application information and a remote end triplet information that are sent by a user behavior analysis (UBA) subsystem and have correspondence relationship therebetween, and a second network data, wherein the remote end triplet information comprises a transmission protocol, a server IP address, and a server port;
search correspondence relationship between application information and remote end triplet information that is maintained by a DPI subsystem for application information matching the remote end triplet information contained in the second network data to identify an application type of the second network data according to the remote end triplet information contained in the second network data,
wherein the correspondence relationship between application information and remote end triplet information that is maintained by the DPI subsystem is established or updated based on the application information and the remote end triplet information that are sent by the UBA subsystem and have correspondence relationship therebetween.

25. The DPI server according to claim 24, wherein the DPI engine is further configured to:
perform protocol identification processing on received first network data and output a first protocol identification result to the UBA subsystem, and wherein the first protocol identification result comprises either the remote end triplet information, or a quintuple information.

26. The DPI server according to claim 24, wherein when the searching fails, the DPI engine is further configured to:
perform Layer 7 (L7) feature matching on the second network data to obtain a second protocol identification result, and output the second protocol identification result to the UBA subsystem, wherein the second protocol identification result comprises the remote end triplet information and the application information having a correspondence relationship therebetween, or the second protocol identification result comprises: a quintuple information and the application information having a correspondence relationship therebetween, or the second protocol identification result comprises: the remote end triplet information and L7 protocol information having a correspondence relationship therebetween, or the second protocol identification result comprises: the quintuple information and L7 protocol information having a correspondence relationship therebetween.

27. The DPI server according to claim 24, wherein the DPI engine is further configured to:
provide the correspondence relationship between the application information and the remote end triplet information that is maintained by the DPI subsystem according to the remote end triplet information and the application information that are sent by the UBA subsystem and have correspondence relationship therebetween; and
either store the provided correspondence between the application information and the remote end triplet information; or
store the remote end triplet information and the application information that are sent by the UBA subsystem and have correspondence relationship therebetween.

28. A communications device, comprising:
a transceiver; and
a processor that is coupled to the transceiver and is configured to perform network communication,
wherein the communications device further comprises a deep packet inspection (DPI) engine coupled to the transceiver, and
wherein the DPI engine is configured to:
receive an application information and a remote end triplet information that are sent by a user behavior analysis (UBA) subsystem and have correspondence relationship therebetween, and second network data, wherein the remote end triplet information comprises a transmission protocol, a server IP address, and a server port;
search correspondence relationship between application information and remote end triplet information that is maintained by a DPI subsystem for application information matching the remote end triplet information contained in the second network data to identify an application type of the second network data according to the remote end triplet information contained in the second network data, wherein the correspondence relationship between application information and remote end triplet information that is maintained by the DPI subsystem is established or updated based on the application information and the remote end triplet information that are sent by the UBA subsystem and have correspondence relationship therebetween.

29. The communications device according to claim 28, the DPI engine is further configured to perform protocol identification processing on a received first network data, and output a first protocol identification result to the UBA subsystem, wherein the first protocol identification result comprises the remote end triplet information, or the first protocol identification result comprises quintuple information.

30. The communications device according to claim 28, wherein the DPI engine is further configured to:

perform Layer 7 (L7) feature matching on the second network data to obtain a second protocol identification result and output the second protocol identification result to the UBA subsystem when the searching fails, wherein the second protocol identification result comprises the remote end triplet information and the application information having a correspondence relationship therebetween, or the second protocol identification result comprises: a quintuple information and the application information having a correspondence relationship therebetween, or the second protocol identification result comprises: the remote end triplet information and the L7 protocol information having a correspondence relationship therebetween, or the second protocol identification result comprises: the quintuple information and the L7 protocol information having a correspondence relationship therebetween.

31. The communications device according to claim 28, wherein the DPI engine is further configured to:

establish or update the correspondence relationship between the application information and the remote end triplet information that is maintained by the DPI subsystem according to the remote end triplet information and the application information that are sent by the UBA subsystem and have correspondence relationship therebetween; and either store the established or updated correspondence between the application information and the remote end triplet information; or store the remote end triplet information and the application information that are sent by the UBA subsystem and have correspondence relationship therebetween.

32. A communications system, comprising:

a deep packet inspection (DPI) subsystem and a user behavior analysis (UBA) subsystem, wherein the UBA subsystem is configured to:

obtain to-be-processed data that comprises a plurality of records, wherein each of the records comprise an application information and a remote end triplet information having a correspondence relationship therebetween;

perform clustering processing on records with the same remote end triplet information and the same application information in the to-be-processed data;

calculate, according to the records with the same remote end triplet information and the same application information, a service load amount corresponding to the remote end triplet information and the application information to obtain a clustering result including the remote end triplet information, the application information, and the service load amount that have a correspondence relationship therebetween;

select remote end triplet information and application information that have high reliability and have correspondence relationship therebetween from the clustering result according to the service load amount or a proportion of the service load amount; and send the remote end triplet information and the application information that have high reliability and have correspondence relationship therebetween to the DPI subsystem, wherein the remote end triplet information comprises: a server IP address, a server port, and a transmission protocol, wherein the DPI subsystem is configured to search, according to remote end triplet information contained in the second network data, correspondence relationship between application information and remote end triplet information that is maintained by the DPI subsystem for application information matching the remote end triplet information contained in the second network data to identify an application type of the second network data when receiving second network data, wherein the correspondence relationship between the application information and the remote end triplet information that is maintained by the DPI subsystem is established or updated based on the remote end triplet information and application information that are sent by the UBA subsystem and have correspondence relationship therebetween.

33. The system according to claim 32, wherein the DPI subsystem is further configured to perform protocol identification processing on received first network data and output a first protocol identification result to the UBA subsystem, wherein the first protocol identification result comprises the remote end triplet information, wherein the UBA subsystem is configured to:

for each type of application, crawl, according to domain name information corresponding to the application, an Internet Protocol (IP) address information corresponding to the domain name information to obtain a crawling result including application information, the domain name information, and the IP address information having a correspondence relationship therebetween;

obtain the first protocol identification result output by the DPI subsystem; associately generate the to-be-processed data according to the crawling result and the first protocol identification result, by using a same IP address in the crawling result and in the first protocol identification result as an association condition, wherein the to-be-processed data comprises multiple records, and each record comprises the application information and the remote end triplet information having a correspondence relationship therebetween;

perform clustering processing on the records with the same remote end triplet information and the same application information in the to-be-processed data;

accumulate the number of records with the same remote end triplet information and the same application information in the to-be-processed data, wherein the number of the records is used as the number of connections corresponding to the remote end triplet information and the application information, to obtain a clustering result including the remote end triplet information, the application information, and the number of the connections having a correspondence relationship therebetween;

either select remote end triplet information and application information having a correspondence relationship therebetween from the clustering result, wherein the number of connections corresponding to the selected remote end triplet information and application information is greater than or equal to the first connection number threshold according to a result of comparing the number of the connections with a first connection number threshold; or select remote end triplet information and application information having a correspondence relationship therebetween from the clustering result according to a result of comparing a proportion of the number of the connections to the number of all connections with a second connection number proportion threshold, wherein the proportion of the number of connections corresponding to the selected remote end triplet information and application information to the number of all connections is greater than or equal to the second connection number proportion threshold, and send the selected remote end triplet information and application information having a correspondence relationship therebetween to the DPI subsystem.

34. The system according to claim 32, further comprising a crawling subsystem configured to, for each type of application, crawl, according to domain name information corresponding to the application, an IP address information corresponding to the domain name information to obtain a crawling result including the application information, the domain name information, and the IP address information that have a correspondence relationship therebetween, wherein the DPI subsystem is further configured to perform protocol identification processing on received first network data and output a first protocol identification result to the UBA subsystem, wherein the first protocol identification result comprises the remote end triplet information; and wherein the UBA subsystem is configured to:
  obtain the first protocol identification result output by the DPI subsystem;
  generate the to-be-processed data according to the crawling result and the first protocol identification result, by using a same IP address in the crawling result and in the first protocol identification result as an association condition;
  perform clustering processing on the records with the same remote end triplet information and the same application information in the to-be-processed data;
  accumulate the number of the records with the same remote end triplet information and the same application information in the to-be-processed data, wherein the number of the records is used as the number of connections corresponding to the remote end triplet information and the application information, to obtain a clustering result including the remote end triplet information, the application information, and the number of the connections having a correspondence relationship therebetween; and
  either select remote end triplet information and application information having a correspondence relationship therebetween from the clustering result according to a result of comparing the number of the connections with a first connection number threshold, wherein the number of connections corresponding to the selected remote end triplet information and application information is greater than or equal to the first connection number threshold; or
  select remote end triplet information and application information having a correspondence relationship therebetween from the clustering result according to a result of comparing a proportion of the number of the connections to the number of all connections with a second connection number proportion threshold, wherein the proportion of the number of connections corresponding to the selected remote end triplet information and application information to the number of all connections is greater than or equal to the second connection number proportion threshold; and
  send the selected remote end triplet information and application information having a correspondence relationship therebetween to the DPI subsystem.

35. The system according to claim 32, wherein each record further comprises a client IP address, a client port, and traffic that corresponds to the application information and a quintuple information, and the client IP address, the client port, and the remote end triplet information form the quintuple information, wherein the DPI subsystem is further configured to:
  perform protocol identification processing on received first network data and output a first protocol identification result to the UBA subsystem, wherein the first protocol identification result comprises quintuple information, and wherein the UBA subsystem is configured to: receive a first network data, wherein the first network data comprises one or more data streams, wherein each of the data streams comprises one or more data packets; for each type of application, according to domain name information corresponding to the application, crawl IP address information corresponding to the domain name information to obtain a crawling result including application information, the domain name information, and the IP address information having a correspondence relationship therebetween;
  obtain a first protocol identification result output by the DPI subsystem;
  generate the to-be-processed data according to the crawling result, the first protocol identification result, and the first network data, by using a same IP address in the crawling result and in the first protocol identification result as an association condition, wherein the to-be-processed data comprises multiple records, each record comprises: the application information, the quintuple information, and the traffic having a correspondence relationship therebetween, wherein the traffic corresponding to the quintuple information is an accumulated value of load lengths of one or more data packets in the first network data that comprise the quintuple information;
  perform clustering processing on records with same remote end triplet information and same application information but with different client IP addresses and different client ports in the to-be-processed data;
  obtain a traffic aggregate amount corresponding to the remote end triplet information and the application information by accumulating traffic in records with same remote end triplet information and same application information in the to-be-processed data, to obtain a clustering result including the remote end triplet information, the application information, and the traffic aggregate amount having a correspondence relationship therebetween;
  either select remote end triplet information and application information having a correspondence relationship therebetween from the clustering result according to a result of comparing the traffic aggregate amount with a first traffic threshold, wherein the traffic aggregate amount corresponding to the selected remote end triplet information and application information is greater than or equal to the first traffic threshold; or
  select remote end triplet information and application information having a correspondence relationship therebetween from the clustering result, according to a result of comparing a proportion of the traffic aggregate amount to all traffic with a second traffic proportion threshold, wherein the proportion of the traffic aggregate amount corresponding to the selected remote end triplet information and application information to all traffic is greater than or equal to the second traffic proportion threshold; and send the selected remote end triplet information and application information having a correspondence relationship therebetween to the DPI subsystem.

36. The system according to claim 32, wherein each record further comprises a client IP address, a client port, and traffic that corresponds to the application information and quintuple information, wherein the client IP address, the client port, and the remote end triplet information form a quintuple information, wherein the system further comprises a crawling subsystem configured to, for each type of application crawl, according to domain name information corresponding to the application, an IP address information corresponding to the domain name information to obtain a crawling result including the application information, the domain name information, and the IP address information that have a correspondence relationship therebetween, wherein the DPI subsystem is further configured to perform protocol identification processing on received first network data and output a first protocol identification result to the UBA subsystem, wherein the first protocol identification result comprises quintuple information, and wherein the UBA subsystem is configured to:

receive first network data, wherein the first network data comprises one or more data streams, wherein each of the data streams comprises one or more data packets;

obtain the first protocol identification result output by the DPI subsystem and a crawling result output by the crawling subsystem;

generate the to-be-processed data according to the crawling result, the first protocol identification result, and the first network data, by using a same IP address in the crawling result and in the first protocol identification result as an association condition, wherein the to-be-processed data comprises multiple records, each record comprises: the application information, the quintuple information, and the traffic having a correspondence relationship therebetween, the traffic corresponding to the quintuple information is an accumulated value of load lengths of one or more data packets in the first network data that comprise the quintuple information;

perform clustering processing on records with same remote end triplet information and same application information but with different client IP addresses and different client ports in the to-be-processed data;

obtain a traffic aggregate amount corresponding to the remote end triplet information and the application information by accumulating traffic in records with same remote end triplet information and same application information in the to-be-processed data, to obtain a clustering result including the remote end triplet information, the application information, and the traffic aggregate amount having a correspondence relationship therebetween;

either select the remote end triplet information and the application information having a correspondence relationship therebetween from the clustering result according to a result of comparing the traffic aggregate amount with a first traffic threshold, wherein the traffic aggregate amount corresponding to the selected remote end triplet information and application information is greater than or equal to the first traffic threshold; or select remote end triplet information and application information having a correspondence relationship therebetween from the clustering result according to a result of comparing a proportion of the traffic aggregate amount to all traffic with a second traffic proportion threshold, wherein the proportion of the traffic aggregate amount corresponding to the selected remote end triplet information and application information to all traffic is greater than or equal to the second traffic proportion threshold; and send the selected remote end triplet information and application information having a correspondence relationship therebetween to the DPI subsystem.

37. The system according to claim 32, the system further comprises a service control subsystem, wherein the DPI subsystem is further configured to provide the application information for the service control subsystem, wherein the service control subsystem is configured to, according to the application information provided by the DPI subsystem, provide application-based services, and wherein the services comprise accounting, blocking, traffic limiting, redirection, or service optimization.

* * * * *